United States Patent
Takahashi

[11] 3,832,035
[45] Aug. 27, 1974

[54] WIDE ANGLE, RETROFOCUS-TYPE PHOTO-TAKING LENS

[75] Inventor: Tomowaki Takahashi, Kawasaki, Japan

[73] Assignee: Nippon Kogaku K.K., Tokyo, Japan

[22] Filed: Aug. 21, 1972

[21] Appl. No.: 282,172

[30] Foreign Application Priority Data

| Aug. 21, 1971 | Japan | 46-63366 |
| Oct. 30, 1971 | Japan | 46-86,634 |
| Dec. 27, 1971 | Japan | 46-1264 |
| Dec. 27, 1971 | Japan | 46-1265 |
| Dec. 27, 1971 | Japan | 46-1266 |
| Dec. 27, 1971 | Japan | 46-1267 |
| Dec. 27, 1971 | Japan | 46-1268 |

[52] U.S. Cl. .................. 350/189, 350/214
[51] Int. Cl. ............................ G02b 9/64
[58] Field of Search ............ 350/189, 198, 214

[56] References Cited
UNITED STATES PATENTS

| 3,037,426 | 6/1962 | Hugues | 350/214 X |
| 3,572,901 | 3/1971 | Mori | 350/214 X |

*Primary Examiner*—John K. Corbin
*Attorney, Agent, or Firm*—Fitzpatrick, Cella, Harper & Scinto

[57] ABSTRACT

A wide angle, substantially distortion-free inverted telephoto-type photo-taking lens system comprises a forward divergent group, a forward convergent group preceding a diaphragm, and a rearward convergent group succeeding the diaphragm. Any one surface in the forward divergent group may be a non-spherical surface whose non-sphericity is within a predetermined range. The lens system satisfies a predetermined condition of the center thicknesses of lenses or the air spaces between lenses.

18 Claims, 84 Drawing Figures

FIG. 2A
SPHERICAL ABERRATION
--- SINE CONDITION

F/3.5
F/5

-0.5mm   0   0.5mm

FIG. 2B
ASTIGMATISM

M  S 50.00°
40.83°
29.94°
9.80°

-1.0mm   0   0.8mm

FIG. 2C
DISTORTION 50.00°
40.83°
29.94°
9.80°

-4%   0   4%

FIG. 2D
COMA 0.020mm
-0.020mm

------ LATERAL SPHERICAL ABERRATION
—·— COMA FOR INCIDENT ANGLE 50°
——— COMA FOR INCIDENT ANGLE 45°
—··— COMA FOR INCIDENT ANGLE 30°

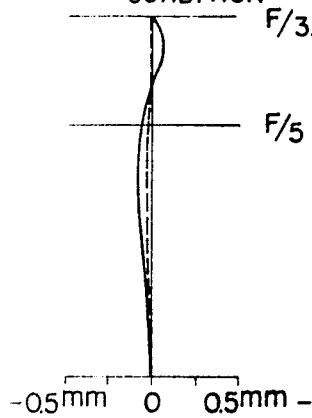
FIG. 4A
—— SPHERICAL ABERRATION
---- SINE CONDITION
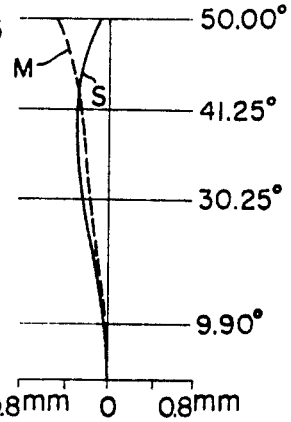
FIG. 4B
ASTIGMATISM
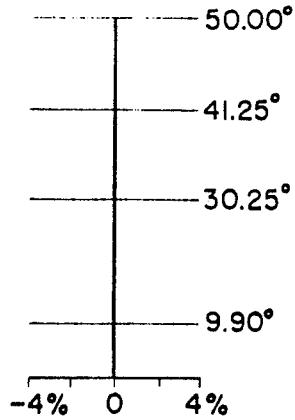
FIG. 4C
DISTORTION
FIG. 4D
COMA
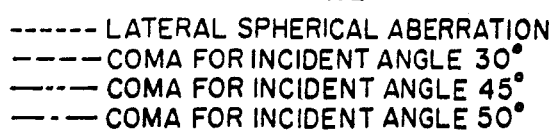
------ LATERAL SPHERICAL ABERRATION
——— COMA FOR INCIDENT ANGLE 30°
—··— COMA FOR INCIDENT ANGLE 45°
—·— COMA FOR INCIDENT ANGLE 50°
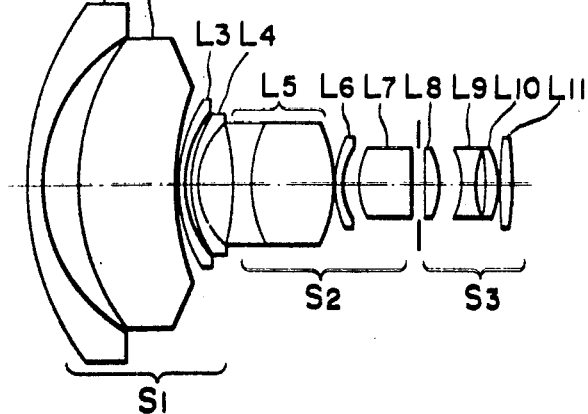
FIG. 5

——— SPHERICAL ABERRATION
---- SINE CONDITION

ASTIGMATISM

DISTORTION

COMA

------ LATERAL SPHERICAL ABERRATION
——— COMA FOR INCIDENT ANGLE 30°
——— COMA FOR INCIDENT ANGLE 45°
— — COMA FOR INCIDENT ANGLE 50°

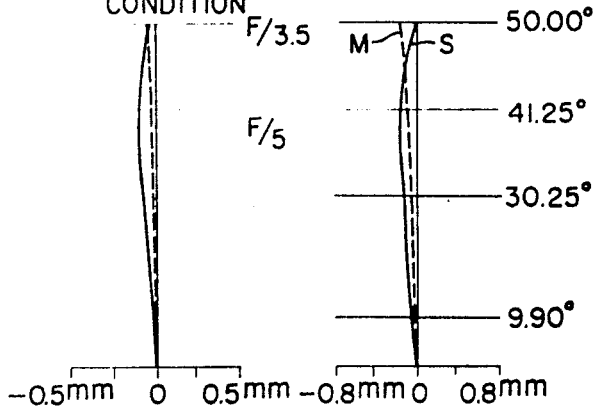
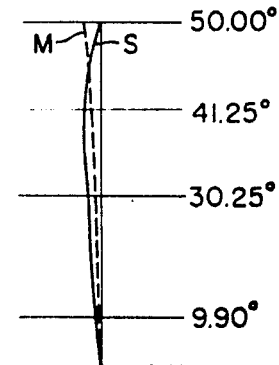
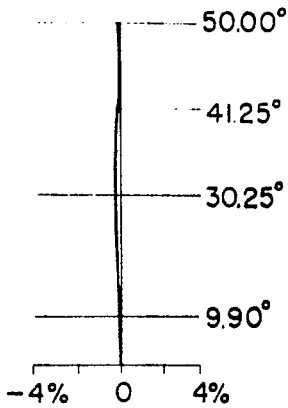
FIG. 7A — SPHERICAL ABERRATION / SINE CONDITION
FIG. 7B — ASTIGMATISM
FIG. 7C — DISTORTION
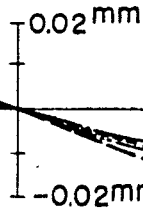
FIG. 7D — COMA
------ LATERAL SPHERICAL ABERRATION
—--— COMA FOR INCIDENT ANGLE 30°
—---— COMA FOR INCIDENT ANGLE 45°
—--—COMA FOR INCIDENT ANGLE 50°

FIG. 8A
— SPHERICAL ABERRATION
--- SINE CONDITION
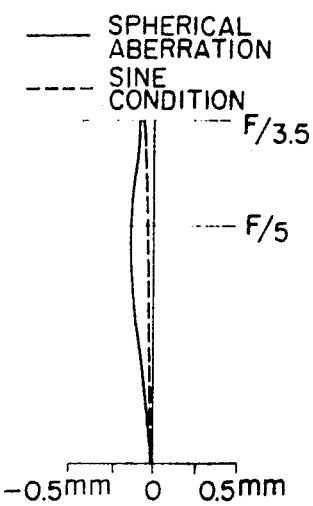
FIG. 8B
ASTIGMATISM
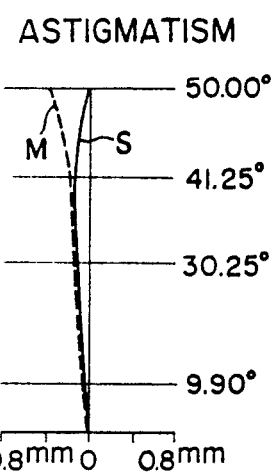
FIG. 8C
DISTORTION
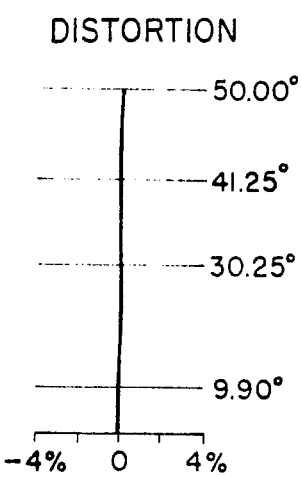
COMA
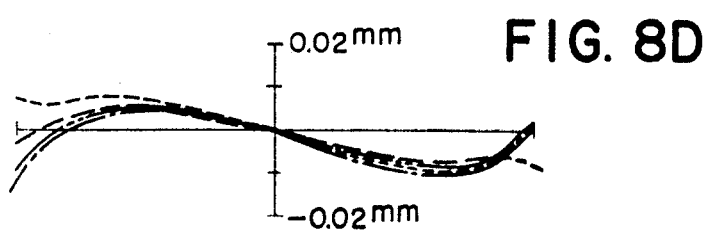
FIG. 8D
------ LATERAL SPHERICAL ABERRATION
---- COMA FOR INCIDENT ANGLE 30°
——— COMA FOR INCIDENT ANGLE 45°
—·— COMA FOR INCIDENT ANGLE 50°

SPHERICAL ABERRATION
---- SINE CONDITION

-0.5mm  0  0.5mm

ASTIGMATISM

-0.8mm  0  0.8mm

DISTORTION

-4%  0  4%

COMA

------ LATERAL SPHERICAL ABERRATION
―――― COMA FOR INCIDENT ANGLE 30°
― ・― COMA FOR INCIDENT ANGLE 45°
― ・ ― COMA FOR INCIDENT ANGLE 50°

SPHERICAL ABERRATION
SINE CONDITION

ASTIGMATISM

DISTORTION

COMA

------ LATERAL SPHERICAL ABERRATION
———— COMA FOR INCIDENT ANGLE 30°
— — — COMA FOR INCIDENT ANGLE 45°
—·— COMA FOR INCIDENT ANGLE 50°

SPHERICAL ABERRATION
SINE CONDITION

ASTIGMATISM

DISTORTION

COMA
- - - - LATERAL SPHERICAL ABERRATION
——— COMA FOR INCIDENT ANGLE 30°
— - — COMA FOR INCIDENT ANGLE 45°
— - - — COMA FOR INCIDENT ANGLE 50°

FIG. 13
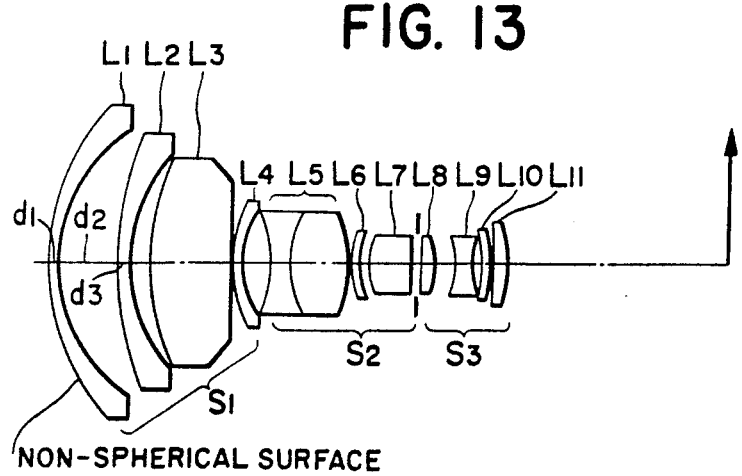
NON-SPHERICAL SURFACE
FIG. 14A
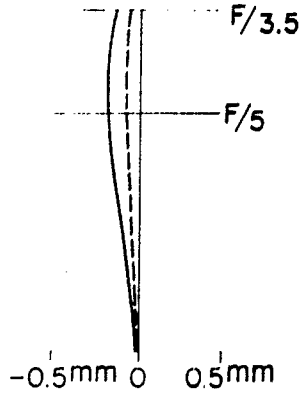
—— SPHERICAL ABERRATION
---- SINE CONDITION
FIG. 14B
ASTIGMATISM
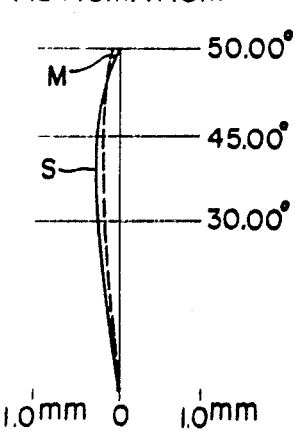
FIG. 14C
DISTORTION
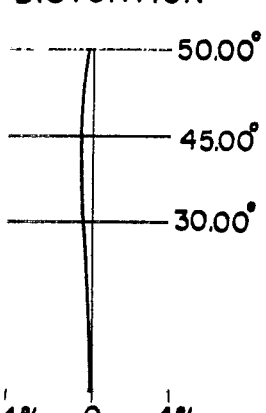
COMA
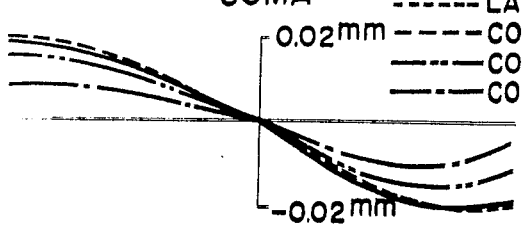
------ LATERAL SPHERICAL ABERRATION
---- COMA FOR INCIDENT ANGLE 30°
——— COMA FOR INCIDENT ANGLE 45°
—·—· COMA FOR INCIDENT ANGLE 50°
FIG. 14D

— SPHERICAL ABERRATION
---- SINE CONDITION

ASTIGMATISM

DISTORTION

COMA
----- LATERAL SPHERICAL ABERRATION
---- COMA FOR INCIDENT ANGLE 30°
—·— COMA FOR INCIDENT ANGLE 45°
— — COMA FOR INCIDENT ANGLE 50°

FIG. 19A
— SPHERICAL ABERRATION
---- SINE CONDITION
FIG. 19B
ASTIGMATISM
FIG. 19C
DISTORTION
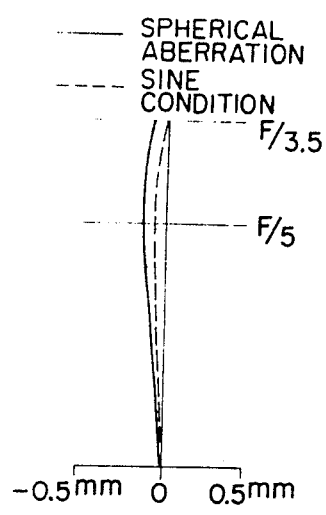
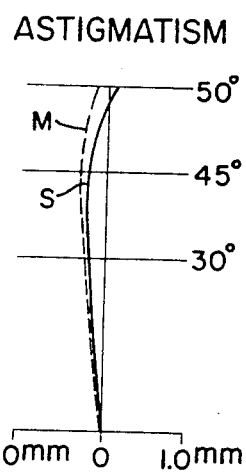
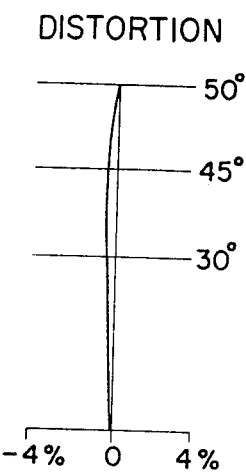
FIG. 19D
COMA
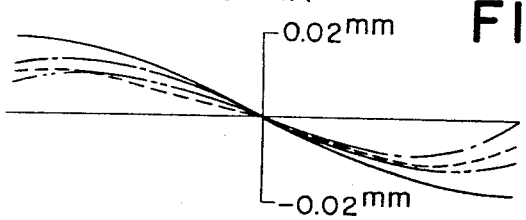
------ LATERAL SPHERICAL ABERRATION
—·— COMA FOR INCIDENT ANGLE 30°
——— COMA FOR INCIDENT ANGLE 45°
—··— COMA FOR INCIDENT ANGLE 50°

SPHERICAL ABERRATION
---- SINE CONDITION

F/4

−0.5mm  0  0.5mm

ASTIGMATISM

−1.0mm  0  0.5mm

DISTORTION

−4.0%  0  2.0%

COMA

------ LATERAL SPHERICAL ABERRATION
——— COMA FOR INCIDENT ANGLE 30°
——— COMA FOR INCIDENT ANGLE 50°

DISTORTION

ASTIGMATISM

—— BEFORE CORRECTION
--- AFTER CORRECTION

DISTORTION

ASTIGMATISM
(MERIDIONAL M)

—— BEFORE CORRECTION
--- AFTER CORRECTION

— SPHERICAL ABERRATION
---- SINE CONDITION

ASTIGMATISM

DISTORTION

COMA

----- LATERAL SPHERICAL ABERRATION
——— COMA FOR INCIDENT ANGLE 30°
—·—· COMA FOR INCIDENT ANGLE 45°
—··— COMA FOR INCIDENT ANGLE 55°

SPHERICAL ABERRATION
---- SINE CONDITION

ASTIGMATISM

DISTORTION

COMA

---- LATERAL SPHERICAL ABERRATION
—— COMA FOR INCIDENT ANGLE 30°
—·— COMA FOR INCIDENT ANGLE 45°
—··— COMA FOR INCIDENT ANGLE 55°

SPHERICAL ABERRATION
--- SINE CONDITION

ASTIGMATISM

DISTORTION

COMA

----LATERAL SPHERICAL ABERRATION
—— COMA FOR INCIDENT ANGLE 30°
---- COMA FOR INCIDENT ANGLE 45°
—--— COMA FOR INCIDENT ANGLE 55°

— SPHERICAL ABERRATION
--- SINE CONDITION

ASTIGMATISM

DISTORTION

------ LATERAL SPHERICAL ABERRATION
——— COMA FOR INCIDENT ANGLE 30°
—·—· COMA FOR INCIDENT ANGLE 45°
—··— COMA FOR INCIDENT ANGLE 55°

WIDE ANGLE, RETROFOCUS-TYPE PHOTO-TAKING LENS

BACKGROUND OF THE INVENTION

1. Field of the Invention

This invention relates to lens systems, and more particularly to an ultra-wide angle, inverted telephototype lens system which is free of distortion, and which has a back-focus longer than its total focal length and an angle of view as wide as 100° or more, and in which distortion is corrected to a remarkable degree by the use of a non-spherical optical system while desirable limits of other aberrations, such as coma and astigmatism, are well maintained.

2. Description of the Prior Art

Generally in a single-lens reflex camera, the back-focus of its objective suffers from limitations attributable to the operation of its mirror. In a 35mm still camera, for example, its back-focus must be longer than the order of 35mm.

Under such limitations, inverted telephoto-type objectives have been used to provide wide angle lenses whose focal length is relatively short. The inverted telephoto-type lens, which has been employed with cameras since about 1920, is advantageous in that it has a wide angle of view and long back-focus and that it has a relatively great aperture ratio over the extra-axial angle in spite of its wide angle, that is, the marginal image portion is brighter than the central one.

Because of its physical properties, however, such lenses are undeniably bulky and complex in structure and expensive to manufacture. In addition, the lens system, itself, is of the asymmetric-type which allows aberrations, particularly, distortion and coma to be increased with an increase in the angle of view, thus causing curvature of the meridional plane. Furthermore, since correction of distortion to a certain extent causes astigmatism and coma to be increased to provide curvature of the meridional plane, these various aberrations must be corrected simultaneously to maintain desirable conditions, but this is exceedingly difficult to achieve. Correction of distortion is especially difficult, and such correction is quite different from the correction of distortion in a symmetrical-type lens, typically a topogon or the like, although the latter type is a wide angle lens as well.

An attempt to correct distortion in the inverted telephoto-type lens was disclosed by H. W. Lee (U.S. Pat. No. 1,955,590 issued 1930), who corrected distortion as much as possible by the use of a spherical optical system. Another attempt was made by E. Hugues (U.S. Pat. No. 3,037,426 issued 1960), who eliminated distortion by applying a non-spherical surface to the inner side of the forward negative lens. Nevertheless, the formation of a concave surface into a non-spherical shape is still very difficult with present-day lens making techniques.

It would generally be possible completely to eliminate distortion if any desired one of the surfaces in the forward divergent lens group was made non-spherical. However, the attempt to eliminate distortion by the use of a non-spherical surface would result in increased astigmatism produced in the intermediate zone of the view field, thus resulting in curvature of the meridional plane. For example, in the case of a lens whose half angle of view is 50°, the astigmatism in the image plane area in the vicinity of 30° to 40° (i.e., the intermediate zone of the view field) would be greater in the negative direction than the astigmatism in the image plane area in the vicinity of 50° (i.e., the marginal area of the view field), thus causing curvature of the astigmatism. It is extremely difficult to eliminate such curvature, and this curvature would, in turn, produce an increased coma in the intermediate zone of the view field, thereby aggravating image formation.

The reason why the elimination of distortion by the use of a non-spherical surface accompanies an increased astigmatism will be described hereunder.

In the inverted telephoto-type lens, correction of distortion is usually made difficult in the intermediate zone of the view field than in the marginal area, and the amount of residual distortion is unavoidably greater in the intermediate zone. In order to eliminate the distortion throughout the entire view field by using a non-spherical surface, the distortion in the intermediate zone must be corrected more than that in the marginal area. Unfortunately, however, the nature of the divergent group of the inverted telephoto lens is such that distortion and astigmatism therein vary in opposite directions. Thus, the correction of distortion would cause an increase in astigmatism. As a result, the amount of residual astigmatism would be greater in an area subjected to a greater correction of distortion and such residual astigmatism would appear in the form of a curvature in the intermediate zone of the view field.

SUMMARY OF THE INVENTION

I have conceived a lens system of the class described by which I am able to eliminate the above-described disadvantages.

Thus, I contribute, by the present invention, a system which provides a retrofocus-type lens in which distortion is substantially completely eliminated and spherical aberration, coma and astigmatism are fully corrected.

To achieve these objects, the present invention, in a first embodiment, provides a wide angle, distortion-free, retrofocus-type photo-taking lens system which comprises, as viewed from an object, a first negative meniscus lens having a first non-spherical surface which is revolution-symmetric about the optical axis of the lens system, a second positive meniscus lens, a third and a fourth negative meniscus lens, a fifth positive doublet, a sixth negative meniscus lens, a seventh positive lens, a diaphragm, an eighth positive lens, a ninth negative lens, a tenth and an eleventh positive lens, the non-spherical shape of said first surface being within the range:

| | |
|---|---|
| $y_0/f = 0.0$ | $Z_0/f = 0.0$ |
| $y_1/f = 0.272$ | $0.0 < Z_1/f < 0.005$ |
| $y_2/f = 0.543$ | $0.0 < Z_2/f < 0.016$ |
| $y_3/f = 0.815$ | $0.0 < Z_3/f < 0.033$ |
| $y_4/f = 1.087$ | $0.005 < Z_4/f < 0.054$ |
| $y_5/f = 1.359$ | $0.011 < Z_5/f < 0.092$ | where $f$ is the total focal length of the entire lens system, $y$ the distance from the optical axis, and $z$ the amount of deviation from the approximately spherical surface, said system satisfying the relations:

$$0.8f < d_9 + d_{10} < 1.5f,$$
$$0.3f < d_{14} < 1.0f,$$

where $d$ represents the lens thickness or the air space between lenses.

A second embodiment of the present invention provides an ultra-wide angle, distortion-free, retrofocus-type lens system which comprises, as viewed from an object, a first negative meniscus lens, a second positive meniscus lens, third and fourth negative meniscus lenses, said four lenses constituting a divergent group, a fifth positive doublet, a sixth negative meniscus lens, a seventh positive lens, said fifth to seventh lenses constituting a forward convergent group preceding a diaphragm, an eight positive lens, a ninth negative lens, tenth and eleventh positive lenses, said eighth to eleventh lenses constituting a rearward convergent group succeeding the diaphragm, any desired surface in said divergent lens group being made non-spherical, said system satisfying the relation:

$$d_3 + d_{9+10} + d_{14} > 1.6f,$$

where $d_3$, $d_{9+10}$ and $d_{14}$ represent the center thicknesses of said second, fifth and seventh lenses.

A third embodiment of the present invention provides an ultra-wide angle, distortion-free, retrofocus-type photo-taking lens system which comprises, as viewed from an object, a first negative meniscus lens, a second negative meniscus lens, a third positive lens, a fourth negative menisucs lens, said four lenses constituting a forward divergent system, a fifth positive doublet, a sixth negative meniscus lens, a seventh positive lens, said fifth to seventh lenses constituting a forward convergent group preceding a diaphragm, an eighth positive lens, a ninth negative lens, tenth and eleventh positive lenses, said eighth to eleventh lenses constituting a rearward covergent group succeeding the disphragm, any desired surface in said forward divergent lens group being made non-spherical said system satisfying the relation:

$$3.7f > d_5 + d_{9+10} + d_14 > 1.5f,$$

where $d_5$, $d_{9+10}$ and $d_{14}$ represent the center thicknesses of said third, fifth and seventh lenses.

In a fourth embodiment, the present invention provides an ultra-wide angle, distortion-free, retrofocus-type phototaking lens system which comprises, as viewed from an object, first and second negative meniscus lenses, a third positive lens, fourth and fifth negative menisucs lenses, said five lenses constituting a forward divergent group, a sixth positive cemented triplet, a seventh negative meniscus lens, an eighth positive doublet, said sixth to eighth lenses constituting a forward convergent group preceding a diaphragm, a ninth positive lens, a tenth negative lens, and eleventh and twelfth positive lenses, said ninth to twelfth lenses constituting a rearward convergent group succeeding the diaphragm, any desired surface in said forward divergent lens group being made non-spherical, said system satisfying the relation:

$$4.0f > d_5 + d_{13+14+15} + d_{19+20} > 1.8f,$$

where $d_5$, $d_{13+14+15}$ and $d_{19+20}$ represent the center thicknesses of said third, sixth and eighth lenses.

In a fifth embodiment, the present invention provides an ultra-wide angle, distortion-free, retrofocus-type photo-taking lens system which comprises, as viewed from an object, a first negative meniscus lens, a second positive meniscus lens, third, fourth and fifth negative meniscus lenses, said five lenses constituting a forward divergent group, a sixth positive doublet, a seventh negative meniscus lens, an eighth positive doublet, said sixth to eighth lenses constituting a forward convergent group preceding a diaphram, a ninth positive lens, a tenth negative lens, and eleventh and twelfth positive lenses, said ninth to twelfth lenses constituting a rearward convergent group, any desired surface in said forward divergent lens group being made nonspherical, said system satisfying the relation:

$$4.1f > d_3 + d_{13+14} + d_{18+19} > 1.9f,$$

where $d_3$, $d_{13+14}$ and $d_{18+19}$ represent the center thicknesses of said second, sixth and eighth lenses.

A sixth embodiment of the invention provides an ultra-wide angle, distortion-free, retrofocus-type phototaking lens system which comprises, as viewed from an object, first, second and third negative meniscus lenses, a fourth positive meniscus lens, a fifth negative meniscus lens, said five lenses constituting a forward divergent group, a sixth positive cemented triplet, a seventh negative meniscus lens, an eighth positive doublet, said sixth to eighth lenses constituting a forward convergent group preceding a diaphragm, a ninth positive lens, a tenth negative lens, and eleventh and twelfth positive lenses, said ninth to twelfth lenses constituting a rearward convergent group succeeding the diaphragm, any desired surface in said forward divergent lens group being made non-spherical, said system satisfying the relation:

$$4.2f > d_7 + d_{11+12+13} + d_{17+18} > 2.0f,$$

where $d_7$, $d_{11+12+13}$ and $d_{17+18}$ represent the center thicknesses of said fourth, sixth and eighth lenses.

In a seventh embodiment of the invention, I provide an ultra-wide angle, distortion-free, retrofocus-type phototaking lens system which comprises, as viewed from an object, a first negative meniscus lens, a second positive meniscus lens, a third negative meniscus lens, said three lenses constituting a forward divergent group, a fourth positive doublet, a fifth negative meniscus lens, a sixth positive lens, said fourth to sixth lenses constituting a forward convergent group preceding a diaphragm, a seventh positive lens, an eighth negative lens, and ninth and tenth positive lenses, said seventh to tenth lenses constituting a rearward convergent group, any desired surface in said forward divergent lens group being made non-spherical, said system satisfying the relation:

$$4.1f > d_3 + d_{7+8} + d_{12} > 1.9f,$$

where $d_3$, $d_{7+8}$ and $d_{12}$ represent the center thicknesses of said second, fourth and sixth lenses.

According to the present invention, distortion is substantially completely eliminated and spherical aberration, coma and astigmatism are substantially corrected.

Further, according to the present invention, a substantially longer back-focus can be achieved than that provided by the same type of spherical optical system.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein:

FIGS. 2A, 2B, 2C and 2D graphically illustrate various aberrations in Example 1 of the present invention;

FIGS. 4A, 4B, 4C and 4D graphically illustrate aberrations therein;

FIG. 5 is a longitudinal sectional view showing the lens arrangement according to Example 5;

FIGS. 7A, 7B, 7C, 7D; 8A, 8B, 8C, 8D; 9A, 9B, 9C, 9D; and 10A, 10B, 10C and 10D. are graphs illustrating aberrations in respect of Examples 6, 7, 8 and 9 of the present invention;

FIG. 13 is a longitudinal section of the lens arrangement according to Example 10, of the present invention;

FIGS. 14A, 14B, 14C and 14D graphically illustrate aberrations therein;

FIGS. 19A, 19B, 19C and 19D graphically illustrate aberrations in Example 13;

DESCRIPTION OF THE PREFERRED EMBODIMENTS

Figure 1:
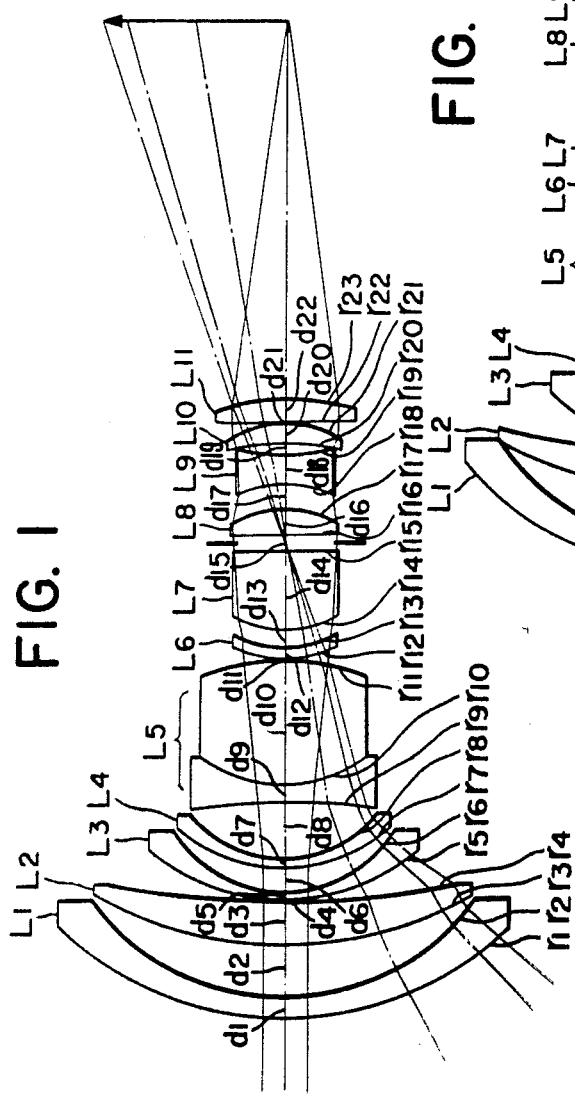
FIG. 1 is a longitudinal sectional view showing the lens arrangement according to a first embodiment of the present invention.

Referring to FIG. 1, there is shown a first embodiment of the lens system according to the present invention. In the lens system, a first lens L1 is a negative meniscus lens having a first non-spherical, revolution-symmetric surface facing the object, i.e., to the left, as viewed; a second lens L2 is a positive meniscus lens; third and fourth lenses L3 and L4 are negative meniscus lenses; a fifth lens L5 is a positive meniscus lens comprising a doublet; a sixth lens L6 is a negative meniscus lens; a seventh lens L7 is a positive lens; an eighth lens L8 is a positive lens, a diaphragm is interposed between the lenses L7 and L8; a ninth lens L9 is a negative lens; and tenth and eleventh lenses L10 and L11 are positive meniscus lenses or positive lenses.

Let $y_i$ be the distance from the optical axis in the direction normal thereto, $B.f.$ the back-focus, $f$ the total focal length, $Z_i$ the amount of deviation in the direction from curved surface $r_1$ of lens L1 toward the optical axis with respect to the distance $y_i$, the amount of deviation $Z_i$ determining the back-focus and the total focal length $f$. Also assume that the direction toward the object is negative. Then, the first non-spherical surface is revolution-symmetric within the following range, with the subscript $i$ being an interger ranging from 0 to 5:

(1)  $y_0 = 0.0$ (mm)　　$Z_0 = 0.0$ (mm)
　　　$y_1 = 5.0$　　　　$0.0 < Z_1 < 0.1$
　　　$y_2 = 10.0$　　　 $0.0 < Z_2 < 0.3$
　　　$y_3 = 15.0$　　　 $0.0 < Z_3 < 0.6$
　　　$y_4 = 20.0$　　　 $0.1 < Z_4 < 1.0$
　　　$y_5 = 25.0$　　　 $0.2 < Z_5 < 1.7$

Such a non-spherical shape is essentially determined by the distortion of the lens system, but actually other optical factors such as curvature radii and inter-vertex distances of lenses, in addition to the non-spherical shape, contribute to correction of the distortion, and thus correction will be possible if condition (1) is satisfied. The distortion may also be corrected by any non-spherical surface which is out of the above-shown range, whereas in such cases other various aberrations than distortion would be adversely affected to such an extent that they would exceed their limit of correction determined by other optical factors than the non-spherical surface, thus failing to provide acceptable aberrations. This is the reason why the non-spherical shape of the first surface must be within the range given by condition (1) above.

Although distortion can be eliminated by the use of such a non-spherical surface, astigmatism and coma will be increased for the reason set forth above, thereby adversely affecting image formation. To solve this problem, the following conditions are added:

$$0.80f < d_9 + d_{10} < 1.5f, \quad \text{(II)}$$

$$0.30f < d_{14} \; ; \; <_{1.0}f, \quad \text{(III)}$$

where $d$ represents the thickness of a lens or the air space between adjacent lenses.

Thus, the lenses L5 and L7, among the members preceding the diaphragm, have greater thicknesses to provide longer optical paths for oblique rays, thereby overcoming the aforesaid problem. Such longer optical paths are useful to eliminate the astigmatism, especially the curvature of the meridional plane, and thus flatten the meridional plane.

This will explain why the foregoing conditions (II) and (III) have been added. If the lower limits of these two conditions were exceeded, the intermediate zone of the view field would suffer from a great deal of residual astigmatism. Conversely, if their upper limits were exceeded, overcorrection would occur and no satisfactory correction could be provided throughout the entire field of view. If such conditions were assigned to a spherical surface, astigmatism would be overcorrected to increase the distortion in the negative direction. It will thus be noted that the conditions (ii) and (iii) are only compatible with the use of the non-spherical surfaces as defined by condition (1).

Several examples of the first embodiment of the present invention will be shown below.

In the tables appearing hereunder, various symbols have the following connotations:

$r$: curvature of radii of lens surfaces (mm)
$d$: lens thicknesses or air spaces between adjacent lenses
$n$: refractive indices of optical materials in use
$v$: Abbe numbers of optical materials in use
$y$: distance from the optical axis (mm)
$z$: amount of deviation from the approximately spherical surface

Example 1

Total focal length $f=18.4$ mm; Relative aperture F/3.5;
Angle of view 100°; Back-focus $B.f=41.926$ mm.

| | | | | | | | | |
|---|---|---|---|---|---|---|---|---|
| $r_1$ | ≈ | 40.14 | (non-spherical) | | | | | |
| | | | $d_1$ | = | 2.2 | $n_1 = 1.713$ | $v_1$ | = 53.9 |
| $r_2$ | = | 26.4 | | | | | | |
| | | | $d_2$ | = | 6 | | | |
| $r_3$ | = | 44.2 | | | | | | |
| | | | $d_3$ | = | 4.8 | $n_2 = 1.64006$ | $v_2$ | = 60.0 |
| $r_4$ | = | 114.6 | | | | | | |
| | | | $d_4$ | = | 0.1 | | | |
| $r_5$ | = | 23.55 | | | | | | |
| | | | $d_5$ | = | 1.0 | $n_3 = 1.713$ | $v_3$ | = 53.9 |
| $r_6$ | = | 14.53 | | | | | | |
| | | | $d_6$ | = | 2.7 | | | |
| $r_7$ | = | 19.8 | | | | | | |
| | | | $d_7$ | = | 1.0 | $n_4 = 1.713$ | $v_4$ | = 53.9 |
| $r_8$ | = | 13.845 | | | | | | |
| | | | $d_8$ | = | 6.2 | | | |
| $r_9$ | = | −74.4 | | | | | | |
| | | | $d_9$ | = | 2.2 | $n_5 = 1.77279$ | $v_5$ | = 49.5 |
| $r_{10}$ | = | 16.12 | | | | | | |
| | | | $d_{10}$ | = | 14.1 | $n_6 = 1.56013$ | $v_6$ | = 47.0 |
| $r_{11}$ | = | −27.169 | | | | | | |
| | | | $d_{11}$ | = | 0.1 | | | |
| $r_{12}$ | = | 24.6 | | | | | | |
| | | | $d_{12}$ | = | 0.9 | $n_7 = 1.67025$ | $v_7$ | = 57.5 |
| $r_{13}$ | = | 9.976 | | | | | | |
| | | | $d_{13}$ | = | 2.3 | | | |
| $r_{14}$ | = | 14.67 | | | | | | |
| | | | $d_{14}$ | = | 8.8 | $n_8 = 1.58065$ | $v_8$ | = 37.1 |
| $r_{15}$ | = | ∞ | | | | | | |
| | | | $d_{15}$ | = | 1.7 | | | |
| $r_{16}$ | = | ∞ | | | | | | |
| | | | $d_{16}$ | = | 2.7 | $n_9 = 1.58065$ | $v_9$ | = 37.1 |
| $r_{17}$ | = | −14.949 | | | | | | |
| | | | $d_{17}$ | = | 3.1 | | | |
| $r_{18}$ | = | −14.925 | | | | | | |
| | | | $d_{18}$ | = | 3.5 | $n_{10} = 1.86074$ | $v_{10}$ | = 23.1 |
| $r_{19}$ | = | 59.3 | | | | | | |
| | | | $d_{19}$ | = | 0.7 | | | |
| $r_{20}$ | = | −82 | | | | | | |
| | | | $d_{20}$ | = | 2.6 | $n_{11} = 1.51118$ | $v_{11}$ | = 50.9 |
| $r_{21}$ | = | −12.4 | | | | | | |
| | | | $d_{21}$ | = | 0.1 | | | |
| $r_{22}$ | = | −500 | | | | | | |
| | | | $d_{22}$ | = | 2.7 | $n_{12} = 1.56965$ | $v_{12}$ | = 49.5 |
| $r_{23}$ | = | −25.322 | | | | | | |

Non-spherical Shape

| | |
|---|---|
| $y_0 = 0.0$ | $Z_0 = 0.0$ |
| $y_1 = 5.0$ | $Z_1 = 0.00126$ |
| $y_2 = 10.0$ | $Z_2 = 0.01997$ |
| $y_3 = 15.0$ | $Z_3 = 0.09939$ |
| $y_4 = 20.0$ | $Z_4 = 0.30664$ |
| $y_5 = 25.0$ | $Z_5 = 0.72512$ |

Seidel Coefficients

|        | I       | II     | III    | IV     | V      |
|--------|---------|--------|--------|--------|--------|
| $r_1$  | 0.024   | 0.020  | 0.278  | 0.459  | −0.064 |
| $r_2$  | −0.186  | 0.019  | −0.296 | −0.292 | 0.030  |
| $r_3$  | 0.072   | 0.047  | 0.256  | 0.194  | 0.128  |
| $r_4$  | −0.001  | −0.004 | −0.133 | −0.086 | −0.494 |
| $r_5$  | 0.113   | 0.049  | 0.389  | 0.347  | 0.151  |
| $r_6$  | −1.278  | 0.213  | −0.634 | −0.563 | 0.094  |
| $r_7$  | 0.770   | 0.065  | 0.403  | 0.392  | 0.033  |
| $r_8$  | −2.927  | 0.411  | −0.726 | −0.611 | 0.086  |
| $r_9$  | 0.038   | 0.088  | 0.507  | 0.097  | 0.225  |
| $r_{10}$ | −3.171 | 0.318  | −0.183 | −0.120 | 0.92   |
| $r_{11}$ | 0.029  | −0.023 | 0.296  | 0.261  | −0.206 |
| $r_{12}$ | 3.928  | 0.683  | 0.656  | 0.419  | 0.073  |
| $r_{13}$ | −98.445 | 0.547 | −0.749 | −0.743 | 0.034  |
| $r_{14}$ | 67.283 | 2.213  | 0.679  | 0.534  | 0.078  |
| $r_{15}$ | −0.032 | −0.051 | −0.241 | −0.080 | −0.127 |
| $r_{16}$ | 0.033  | 0.052  | 0.244  | 0.081  | 0.128  |
| $r_{17}$ | 50.056 | −4.163 | 1.491  | 0.798  | −0.066 |
| $r_{18}$ | −42.838 | 2.829 | −1.131 | −0.757 | 0.050  |
| $r_{19}$ | −9.798 | −3.227 | −3.331 | −1.206 | −0.397 |
| $r_{20}$ | 1.172  | 0.725  | 1.271  | 0.373  | 0.231  |
| $r_{21}$ | 22.818 | −0.118 | 0.504  | 0.503  | −0.003 |
| $r_{22}$ | −0.007 | 0.015  | −0.110 | −0.045 | 0.100  |
| $r_{23}$ | 15.705 | −0.410 | 0.296  | 0.274  | −0.007 |
| Σ      | 3.354   | 0.300  | −0.264 | −0.004 | −0.002 |

Example 2

Total focal length f=18.4 mm; Relative aperture F/3.5;
Angle of view 100°; Back-focus B.f.=41.904 mm.

Non-spherical Shape

| | |
|---|---|
| $y_0 = 0.0$ | $Z_0 = 0.0$ |
| $y_1 = 5.0$ | $Z_1 = 0.00151$ |
| $y_2 = 10.0$ | $Z_2 = 0.02423$ |

| | | | | | | |
|---|---|---|---|---|---|---|
| $r_1$ | = | 37.14 (non spherical) | | | | |
| | | | $d_1$ = | 2.0 | $n_1 = 1.713$ | $\nu_1 = 53.9$ |
| $r_2$ | = | 25.96 | | | | |
| | | | $d_2$ = | 6.42 | | |
| $r_3$ | = | 44.55 | | | | |
| | | | $d_3$ = | 4.51 | $n_2 = 1.6425$ | $\nu_2 = 58.1$ |
| $r_4$ | = | 101.26 | | | | |
| | | | $d_4$ = | 0.1 | | |
| $r_5$ | = | 24.21 | | | | |
| | | | $d_5$ = | 1.0 | $n_3 = 1.713$ | $\nu_3 = 53.9$ |
| $r_6$ | = | 13.93 | | | | |
| | | | $d_6$ = | 2.97 | | |
| $r_7$ | = | 19.47 | | | | |
| | | | $d_7$ = | 0.87 | $n_4 = 1.717$ | $\nu_4 = 48.0$ |
| $r_8$ | = | 14.55 | | | | |
| | | | $d_8$ = | 5.91 | | |
| $r_9$ | = | −72.25 | | | | |
| | | | $d_9$ = | 3.55 | $n_5 = 1.77279$ | $\nu_5 = 49.5$ |
| $r_{10}$ | = | 17.11 | | | | |
| | | | $d_{10}$ = | 14.74 | $n_6 = 1.56013$ | $\nu_6 = 47.0$ |
| $r_{11}$ | = | −27.78 | | | | |
| | | | $d_{11}$ = | 0.1 | | |
| $r_{12}$ | = | 23.93 | | | | |
| | | | $d_{12}$ = | 0.92 | $n_7 = 1.67025$ | $\nu_7 = 57.5$ |
| $r_{13}$ | = | 9.96 | | | | |
| | | | $d_{13}$ = | 2.31 | | |
| $r_{14}$ | = | 14.81 | | | | |
| | | | $d_{14}$ = | 10.70 | $n_8 = 1.58065$ | $\nu_8 = 37.1$ |
| $r_{15}$ | = | ∞ | | | | |
| | | | $d_{15}$ = | 1.09 | | |
| $r_{16}$ | = | ∞ | | | | |
| | | | $d_{16}$ = | 2.51 | $n_9 = 1.58065$ | $\nu_9 = 37.1$ |
| $r_{17}$ | = | −14.67 | | | | |
| | | | $d_{17}$ = | 3.04 | | |
| $r_{18}$ | = | −14.99 | | | | |
| | | | $d_{18}$ = | 2.9 | $n_{10} = 1.86074$ | $\nu_{10} = 23.1$ |
| $r_{19}$ | = | 59.08 | | | | |
| | | | $d_{19}$ = | 0.57 | | |
| $r_{20}$ | = | −65.90 | | | | |
| | | | $d_{20}$ = | 2.39 | $n_{11} = 1.51454$ | $\nu_{11} = 54.6$ |
| $r_{21}$ | = | −12.42 | | | | |
| | | | $d_{21}$ = | 0.1 | | |
| $r_{22}$ | = | −492.23 | | | | |
| | | | $d_{22}$ = | 4.81 | $n_{12} = 1.56883$ | $\nu_{12} = 56.0$ |
| $r_{23}$ | = | −25.062 | | | | |

Non-spherical Shape

| | |
|---|---|
| $y_3 = 15.0$ | $Z_3 = 0.12319$ |
| $y_4 = 20.0$ | $Z_4 = 0.39784$ |
| $y_5 = 25.0$ | $Z_5 = 1.04193$ |

Example 3

Total focal length f=18.4 mm; Relative aperture F/3.5

Angle of view 100°; Back-focus B.f.=42.255 mm.

| | | | | | | |
|---|---|---|---|---|---|---|
| $r_1$ | ≈ | 39.71 | (non-spherical) | | | |
| | | | $d_1$ = 2.20 | $n_1 = 1.713$ | $\nu_1$ | = 53.9 |
| $r_2$ | = | 26.42 | | | | |
| | | | $d_2$ = 5.47 | | | |
| $r_3$ | = | 43.67 | | | | |
| | | | $d_3$ = 4.69 | $n_2 = 1.6425$ | $\nu_2$ | = 58.1 |
| $r_4$ | = | 116.49 | | | | |
| | | | $d_4$ = 0.10 | | | |
| $r_5$ | = | 22.83 | | | | |
| | | | $d_5$ = 0.04 | $n_3 = 1.713$ | $\nu_3$ | = 53.9 |
| $r_6$ | = | 14.54 | | | | |
| | | | $d_6$ = 2.60 | | | |
| $r_7$ | = | 21.0 | | | | |
| | | | $d_7$ = 1.00 | $n_4 = 1.717$ | $\nu_4$ | = 48.0 |
| $r_8$ | = | 13.87 | | | | |
| | | | $d_8$ = 5.91 | | | |
| $r_9$ | = | −80.46 | | | | |
| | | | $d_9$ = 2.80 | $n_5 = 1.77279$ | $\nu_5$ | = 49.5 |
| $r_{10}$ | = | 16.13 | | | | |
| | | | $d_{10}$ = 14.31 | $n_6 = 1.56013$ | $\nu_6$ | − 47.0 |
| $r_{11}$ | = | −27.35 | | | | |
| | | | $d_{11}$ = 0.1 | | | |
| $r_{12}$ | = | 25.10 | | | | |
| | | | $d_{12}$ = 0.95 | $n_7 = 1.67025$ | $\nu_7$ | = 57.5 |
| $r_{13}$ | = | 9.96 | | | | |
| | | | $d_{13}$ = 2.31 | | | |
| $r_{14}$ | = | 14.71 | | | | |
| | | | $d_{14}$ = 9.58 | $n_8 = 1.58065$ | $\nu_8$ | = 37.1 |
| $r_{15}$ | = | ∞ | | | | |
| | | | $d_{15}$ = 1.35 | | | |
| $r_{16}$ | = | ∞ | | | | |
| | | | $d_{16}$ = 2.41 | $n_9 = 1.58065$ | $\nu_9$ | = 37.1 |
| $r_{17}$ | = | −14.92 | | | | |
| | | | $d_{17}$ = 3.10 | | | |
| $r_{18}$ | = | −14.98 | | | | |
| | | | $d_{18}$ = 3.18 | $n_{10} = 1.86074$ | $\nu_{10}$ | = 23.1 |
| $r_{19}$ | = | 57.98 | | | | |
| | | | $d_{19}$ = 0.41 | | | |
| $r_{20}$ | = | −83.91 | | | | |
| | | | $d_{20}$ = 3.07 | | | |
| $r_{21}$ | = | −12.36 | | | | |
| | | | $d_{21}$ = 0.1 | $n_{11} = 1.51454$ | $\nu_{11}$ | = 54.6 |
| $r_{22}$ | = | −436.16 | | | | |
| | | | $d_{22}$ = 4.17 | | | |
| $r_{23}$ | = | − 25.54 | | | | |
| | | | | $n_{12} = 1.56883$ | $\nu_{12}$ | = 56.0 |

Non-spherical Shape

| | |
|---|---|
| $y_0 = 0.0$ | $Z_0 = 0.0$ |
| $y_1 = 5.0$ | $Z_1 = 0.00117$ |
| $y_2 = 10.0$ | $Z_2 = 0.01835$ |
| $y_3 = 15.0$ | $Z_3 = 0.08998$ |
| $y_4 = 20.0$ | $Z_4 = 0.27153$ |
| $y_5 = 25.0$ | $Z_5 = 0.62258$ |

Figure 3:
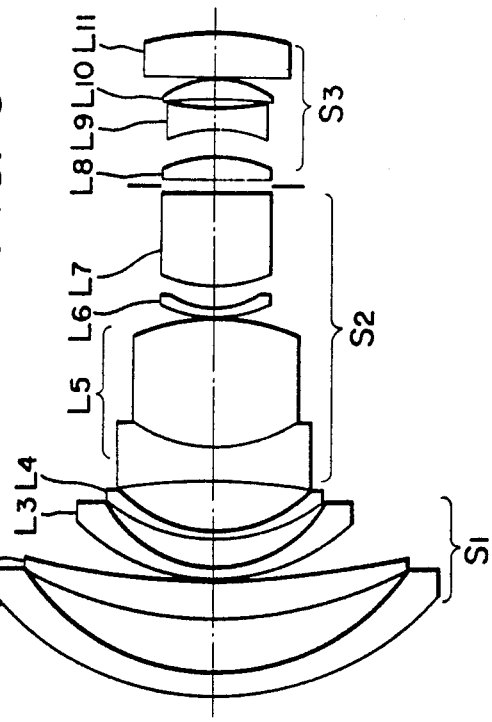
FIG. 3 is a longitudinal sectional view showing the lens arrangement according to Example 4 of the present invention.
Figure 6A:
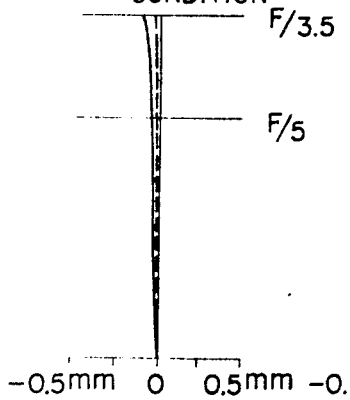
FIGS. 6A, 6B, 6C and 6D graphically illustrate aberrations therein.
Figure 6B:
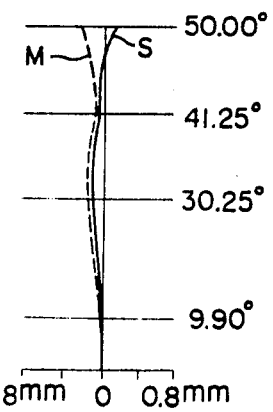
Figure 6C:
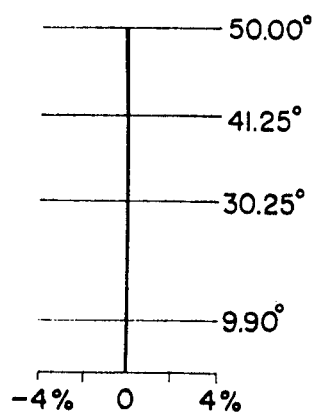
Figure 6D:
Figure 9A:
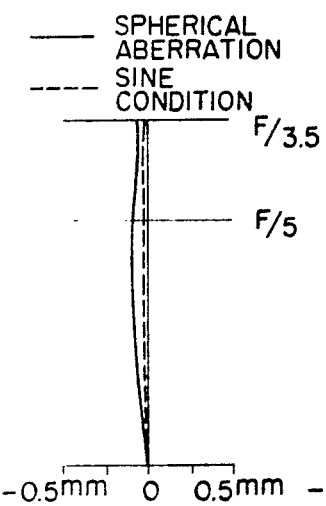
Figure 9B:
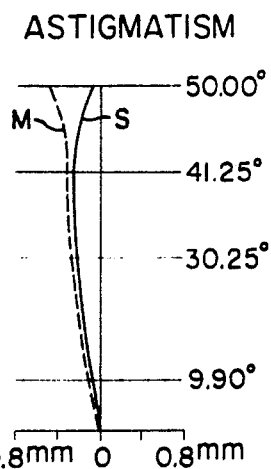
Figure 9C:
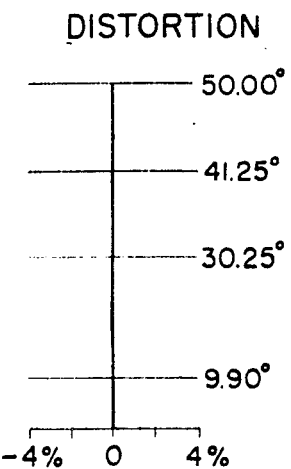
Figure 9D:
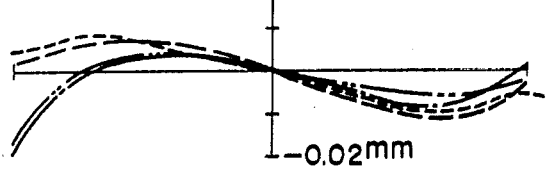
Figure 10A:
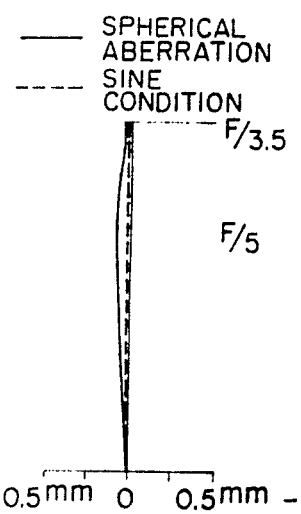
Figure 10B:
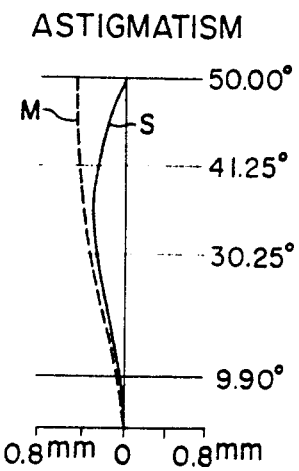
Figure 10C:
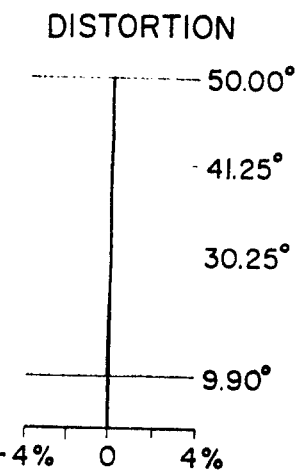
Figure 10D:
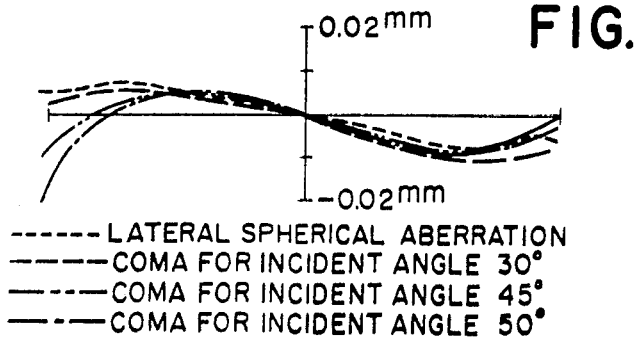

FIG. 3 shows an embodiment of the inverted telephoto lens system in which the first lens in the forward divergent group has a first non-spherical surface and which has a focal length 18.4 mm, a relative aperture F/3.5 and a field of view 100°. In this lens system, a first negative lens L1, a second positve lens L2, third and fourth negative lenses L3 and L4 together constitute a forward divergent group S1, a fifth cemented composite lens L5, a sixth negative lens L6 and a seventh positive lens L7 together constitute a forward convergent group S2 preceding the diaphragm; and a rearward convergent group S3 succeeding the diaphragm is constituted by an eighth positive lens L8, a ninth negative lens L9, a tenth positive lens L10 and an eleventh positive lens L11.

The embodiment shown in FIG. 5 is similar to that shown in FIG. 3 except that the third lens surfaces in the forward divergent group is non-spherical.

Figure 11:
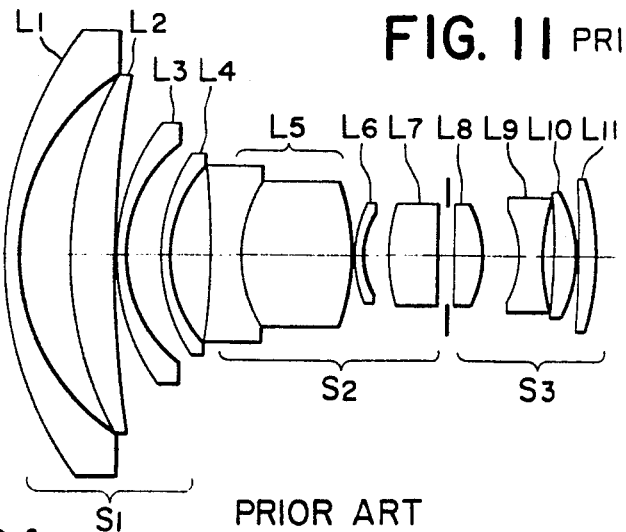
FIGS. 11, and 12A, 12B, 12C and 12D, respectively, show a longitudinal section of a known spherical optical system and graphs of aberrations therein.
Figure 12A:
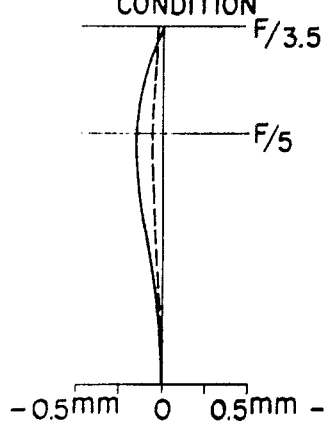
Figure 12B:
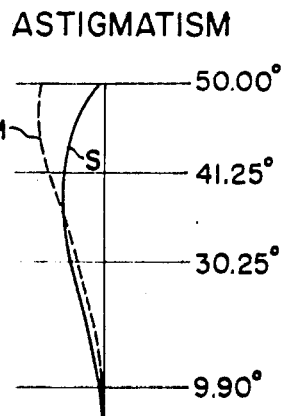
Figure 12C:
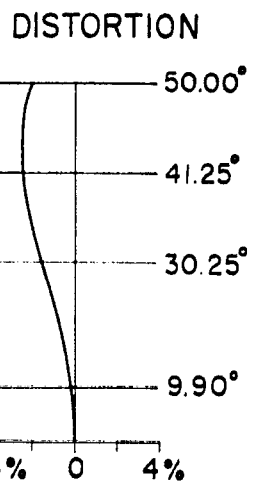
Figure 12D:
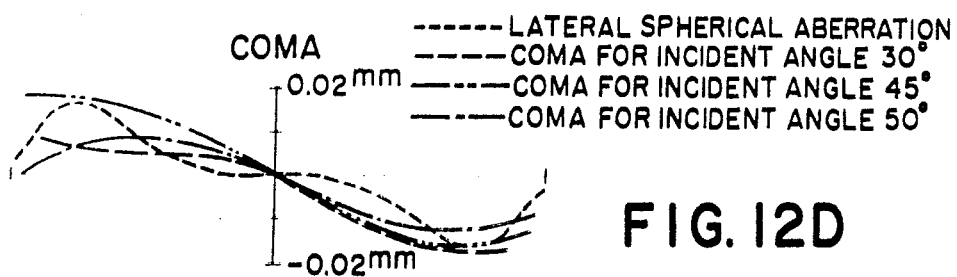

FIGS. 7A–D, 8A–D, 9A–D and 10A–D show various aberrations in respect of Examples 6, 7, 8 and 9 in which the fourth, the fifth, the seventh and the eighth lens surface are nonspherical, respectively. For comparison, FIGS. 11 and 12 show the arrangement of the spherical optical system according to the prior art and the aberrations therein, respectively.

In Examples 4 to 9 shown below, the following condition is provided to eliminate the curvature of astigmatism which tends to increase when distortion is corrected.

$$d_3 + d_{9+10} + d_{14} > 1.6f, \qquad (V)$$

where $d$ represents the lens center thickness and $f$ the total focal length.

According to this condition, the center thickness of the lens L2, L5, L7 is made greater to provide an increased length of optical path which is useful to correct the curvature of astigmatism and flatten the meridional plane.

If condition (V) is not satisfied, a great deal of astigmatism would remain in the intermediate zone, thus failing to provide a good image throughout the field of view. If such a condition is assigned to the spherical system, the astigmatism would be overcorrected and the distortion would increase in the negative sense. It will thus be seen that the present condition must be used only with a non-spherical system.

Incidentally, numerical values for condition (V) in Examples 4 to 9 and the numerical data of the spherical system will be given below for comparison.

Example 4

The first lens surface has been made non-spherical. $f=18.4$ mm; Relative aperture F/3.5; Angle of view 100°; Back-focus $B.f.=41.895$ mm.

The non-spherical surface provides the first surface of the divergent optical group.

| Factors of Non-sphericity | | |
|---|---|---|
| $K$ | = | 1.0 |
| $C_2$ | = | 0.0 |
| $C_4$ | = | $0.2407028 \times 10^{-5}$ |
| $C_6$ | = | $0.1303520 \times 10^{-11}$ |
| $C_8$ | = | $-0.1680348 \times 10^{-17}$ |
| $C_{10}$ | = | $0.1185509 \times 10^{-14}$ |

The above factors are those related to the following equation which represents the non-sphericity.

| Example | 4 | 5 | 6 | 7 | 8 | 9 | Spherical system |
|---|---|---|---|---|---|---|---|
| $d_3$ | 4.62 | 17.14 | 6.43 | 5.23 | 5.22 | 7.39 | 5.4 |
| $d_9 + 10$ | 18.40 | 18.22 | 18.16 | 19.11 | 20.61 | 19.46 | 15.9 |
| $d_{11}$ | 10.65 | 9.72 | 9.96 | 11.42 | 11.87 | 12.22 | 6.1 |
| $d_3 + d_{9+10} + d_{11}$ | 33.67 | 45.08 | 34.55 | 35.76 | 37.70 | 39.07 | 27.4 |
| $(d_3+d_{9+10}+d_{11})/f$ | 1.8299 | 2.45 | 1.8777 | 1.9435 | 2.0489 | 2.1234 | 1.4891 |

From the above table it will be apparent that any one of Examples 4 to 9 has been accomplished only by satisfying condition (V).

Various numerical values for Examples 4 to 9 will be shown below.

$$X = CY^2/1 + \sqrt{1-K(CY)^2} + C_2Y^2 + C_4Y^4 + C_6Y^6 + C_8Y^8 + C_{10}Y^{10} \qquad (IV)$$

where $Y$ is the distance from the optical axis, $X$ the distance from the tangential plane, and $1/c(=r_1)$ the curvature radius of the tangential spherical plane.

| | | | | | | | | | |
|---|---|---|---|---|---|---|---|---|---|
| $r_1$ | ≈ | 37.47 (non spherical) | | | | | | | |
| | | | $d_1$ | = | 2.00 | $n_1$ | = | 1.71300 | $\nu_1$ = 53.9 |
| $r_2$ | = | 26.07 | | | | | | | |
| | | | $d_2$ | = | 6.42 | | | | |
| $r_3$ | = | 44.55 | | | | | | | |
| | | | $d_3$ | = | 4.62 | $n_2$ | = | 1.6425 | $\nu_2$ = 58.1 |
| $r_4$ | = | 100.82 | | | | | | | |
| | | | $d_4$ | = | 0.10 | | | | |
| $r_5$ | = | 24.20 | | | | | | | |
| | | | $d_5$ | = | 1.00 | $n_3$ | = | 1.71300 | $\nu_3$ = 53.9 |
| $r_6$ | = | 13.93 | | | | | | | |
| | | | $d_6$ | = | 3.25 | | | | |
| $r_7$ | = | 19.43 | | | | | | | |
| | | | $d_7$ | = | 0.95 | $n_4$ | = | 1.71700 | $\nu_4$ = 48.0 |
| $r_8$ | = | 14.67 | | | | | | | |
| | | | $d_8$ | = | 5.91 | | | | |
| $r_9$ | = | −72.25 | | | | | | | |
| | | | $d_9$ | = | 3.63 | $n_5$ | = | 1.77279 | $\nu_5$ = 49.5 |
| $r_{10}$ | = | 17.06 | | | | | | | |
| | | | $d_{10}$ | = | 14.77 | $n_6$ | = | 1.56013 | $\nu_6$ = 47.0 |
| $r_{11}$ | = | −27.78 | | | | | | | |
| | | | $d_{11}$ | = | 0.10 | | | | |
| $r_{12}$ | = | 23.97 | | | | | | | |
| | | | $d_{12}$ | = | 0.93 | $n_7$ | = | 1.67025 | $\nu_7$ = 57.5 |
| $r_{13}$ | = | 9.96 | | | | | | | |
| | | | $d_{13}$ | = | 2.31 | | | | |
| $r_{14}$ | = | 14.80 | | | | | | | |
| | | | $d_{14}$ | = | 10.65 | $n_8$ | = | 1.58065 | $\nu_8$ = 37.1 |
| $r_{15}$ | = | ∞ | | | | | | | |
| | | | $d_{15}$ | = | 1.08 | | | | |
| $r_{16}$ | = | ∞ | | | | | | | |
| | | | $d_{16}$ | = | 2.40 | $n_9$ | = | 1.58065 | $\nu_9$ = 37.1 |
| $r_{17}$ | = | −14.65 | | | | | | | |
| | | | $d_{17}$ | = | 3.01 | | | | |
| $r_{18}$ | = | −14.99 | | | | | | | |
| | | | $d_{18}$ | = | 2.00 | $n_{10}$ | = | 1.86074 | $\nu_{10}$ = 23.1 |
| $r_{19}$ | = | 59.08 | | | | | | | |
| | | | $d_{19}$ | = | 0.57 | | | | |
| $r_{20}$ | = | −64.54 | | | | | | | |
| | | | $d_{20}$ | = | 2.40 | $n_{11}$ | = | 1.51454 | $\nu_{11}$ = 54.6 |
| $r_{21}$ | = | −12.42 | | | | | | | |
| | | | $d_{21}$ | = | 0.10 | | | | |
| $r_{22}$ | = | −489.25 | | | | | | | |
| | | | $d_{22}$ | = | 5.25 | $n_{12}$ | = | 1.56883 | $\nu_{12}$ = 56.0 |
| $r_{23}$ | = | −25.06 | | | | | | | |

Example 5

The third lens surface has been made non-spherical. $f=18.4$ mm; $F/3.5$; Angle of view 100°; $B.f.=39.497$ mm.

| | | | | | | | |
|---|---|---|---|---|---|---|---|
| $r_1 =$ | 47.42 | | | | | | |
| | | $d_1 =$ | 2.00 | $n_1 =$ | 1.713 | $\nu_1 =$ | 53.9 |
| $r_2 =$ | 27.53 | | | | | | |
| | | $d_2 =$ | 6.42 (non-spherical) | | | | |
| $r_3 =$ | 44.55 | | | | | | |
| | | $d_3 =$ | 17.14 | $n_2 =$ | 1.6425 | $\nu_2 =$ | 58.1 |
| $r_4 =$ | 62.82 | | | | | | |
| | | $d_4 =$ | 0.1 | | | | |
| $r_5 =$ | 26.51 | | | | | | |
| | | $d_5 =$ | 1.0 | $n_3 =$ | 1.713 | $\nu_3 =$ | 53.9 |
| $r_6 =$ | 15.88 | | | | | | |
| | | $d_6 =$ | 1.34 | | | | |
| $r_7 =$ | 19.56 | | | | | | |
| | | $d_7 =$ | 0.97 | $n_4 =$ | 1.719 | $\nu_4 =$ | 48.0 |
| $r_8 =$ | 14.01 | | | | | | |
| | | $d_8 =$ | 5.91 | | | | |
| $r_9 =$ | −72.25 | | | | | | |
| | | $d_9 =$ | 3.35 | $n_5 =$ | 1.77279 | $\nu_5 =$ | 49.5 |
| $r_{10}=$ | 24.30 | | | | | | |
| | | $d_{10}=$ | 14.87 | $n_6 =$ | 1.56013 | $\nu_6 =$ | 47.0 |
| $r_{11}=$ | −27.78 | | | | | | |
| | | $d_{11}=$ | 0.1 | | | | |
| $r_{12}=$ | 21.88 | | | | | | |
| | | $d_{12}=$ | 0.58 | $n_7 =$ | 1.67025 | $\nu_7 =$ | 57.5 |
| $r_{13}=$ | 9.96 | | | | | | |
| | | $d_{13}=$ | 2.31 | | | | |
| $r_{14}=$ | 14.54 | | | | | | |
| | | $d_{14}=$ | 9.72 | $n_8 =$ | 1.58065 | $\nu_8 =$ | 37.1 |
| $r_{15}=$ | ∞ | | | | | | |
| | | $d_{15}=$ | 0.92 | | | | |
| $r_{16}=$ | ∞ | | | | | | |
| | | $d_{16}=$ | 2.71 | $n_9 =$ | 1.58065 | $\nu_9 =$ | 37.1 |
| $r_{17}=$ | −15.14 | | | | | | |
| | | $d_{17}=$ | 3.57 | | | | |
| $r_{18}=$ | −14.99 | | | | | | |
| | | $d_{18}=$ | 2.90 | $n_{10}=$ | 1.86074 | $\nu_{10}=$ | 23.1 |
| $r_{19}=$ | 59.08 | | | | | | |
| | | $d_{19}=$ | 0.57 | | | | |
| $r_{20}=$ | −54.08 | | | | | | |
| | | $d_{20}=$ | 2.45 | $n_{11}=$ | 1.51454 | $\nu_{11}=$ | 54.6 |
| $r_{21}=$ | −12.42 | | | | | | |
| | | $d_{21}=$ | 0.1 | | | | |
| $r_{22}=$ | −775.62 | | | | | | |
| | | $d_{22}=$ | 1.91 | $n_{12}=$ | 1.56883 | $\nu_{12}=$ | 56.0 |
| $r_{23}=$ | −24.71 | | | | | | |

The non-spherical surface provides the third surface of the divergent optical group.

Factors of Non-sphericity

| | |
|---|---|
| $K$ | $= 1.0$ |
| $C_2$ | $= 0.0$ |
| $C_4$ | $= 0.3363777 \times 10^{-5}$ |
| $C_6$ | $= 0.2252592 \times 10^{-9}$ |
| $C_8$ | $= 0.1041002 \times 10^{-17}$ |
| $C_{10}$ | $= 0.1925956 \times 10^{-14}$ |

Example 6

The fourth lens surface has been made non-spherical. $f=18.4$ mm; $F/3.5$; Angle of view 100°; $B.f.=37.904$ mm.

| | | | | | | | |
|---|---|---|---|---|---|---|---|
| $r_1 =$ | 35.87 | | | | | | |
| | | $d_1 =$ | 2.00 | $n_1 =$ | 1.713 | $\nu_1 =$ | 53.9 |
| $r_2 =$ | 29.05 | | | | | | |
| | | $d_2 =$ | 6.42 | | | | |
| $r_3 =$ | 44.55 | | | | | | |
| | | $d_3 =$ | 6.43 (non spherical) | $n_2 =$ | 1.6425 | $\nu_2 =$ | 58.1 |
| $r_4 =$ | 151.55 | | | | | | |
| | | $d_4 =$ | 0.1 | | | | |
| $r_5 =$ | 25.14 | | | | | | |
| | | $d_5 =$ | 1.0 | $n_3 =$ | 1.713 | $\nu_3 =$ | 53.9 |
| $r_6 =$ | 14.45 | | | | | | |
| | | $d_6 =$ | 4.71 | | | | |
| $r_7 =$ | 27.15 | | | | | | |
| | | $d_7 =$ | 0.96 | $n_4 =$ | 1.717 | $\nu_4 =$ | 48.0 |
| $r_8 =$ | 14.29 | | | | | | |
| | | $d_8 =$ | 5.91 | | | | |
| $r_9 =$ | −72.25 | | | | | | |
| | | $d_9 =$ | 3.28 | $n_5 =$ | 1.77279 | $\nu_5 =$ | 49.5 |
| $r_{10}=$ | 25.79 | | | | | | |
| | | $d_{10}=$ | 14.88 | $n_6 =$ | 1.56013 | $\nu_6 =$ | 47.0 |
| $r_{11}=$ | −27.78 | | | | | | |
| | | $d_{11}=$ | 0.1 | | | | |
| $r_{12}=$ | 22.13 | | | | | | |
| | | $d_{12}=$ | 0.94 | $n_7 =$ | 1.67025 | $\nu_7 =$ | 57.5 |
| $r_{13}=$ | 9.96 | | | | | | |
| | | $d_{13}=$ | 2.31 | | | | |
| $r_{14}=$ | 14.42 | | | | | | |
| | | $d_{14}=$ | 9.96 | $n_8 =$ | 1.58065 | $\nu_8 =$ | 37.1 |

Example 6 — Continued

| | | | | | | | |
|---|---|---|---|---|---|---|---|
| $r_{15}=$ | $\infty$ | | | | | | |
| | | $d_{15}=$ | 1.00 | | | | |
| $r_{16}=$ | $\infty$ | | | | | | |
| | | $d_{16}=$ | 3.10 | $n_9=$ | 1.58065 | $\nu_9=$ | 37.1 |
| $r_{17}=$ | −15.27 | | | | | | |
| | | $d_{17}=$ | 3.77 | | | | |
| $r_{18}=$ | −14.99 | | | | | | |
| | | $d_{18}=$ | 2.9 | $n_{10}=$ | 1.86074 | $\nu_{10}=$ | 23.1 |
| $r_{19}=$ | 59.08 | | | | | | |
| | | $d_{19}=$ | 0.57 | | | | |
| $r_{20}=$ | −53.36 | | | | | | |
| | | $d_{20}=$ | 2.43 | $n_{11}=$ | 1.51454 | $\nu_{11}=$ | 54.6 |
| $r_{21}=$ | −12.42 | | | | | | |
| | | $d_{21}=$ | 0.1 | | | | |
| $r_{22}=$ | 8351.50 | | | | | | |
| | | $d_{22}=$ | 2.28 | $n_{12}=$ | 1.56883 | $\nu_{12}=$ | 56 |
| $r_{23}=$ | −24.61 | | | | | | |

The non-spherical surface provides the fourth surface of the divergent optical group.

The non-spherical surface provides the fifth surface of the divergent optical system.

Factors of Non-sphericity $K = 1.0$
$C_2 = 0.0$
$C_4 = 0.1153770 \times 10^{-5}$
$C_6 = -0.1033107 \times 10^{-9}$
$C_8 = -0.1064602 \times 10^{-19}$
$C_{10} = -0.4520970 \times 10^{-17}$ Factors of Non-sphericity $K = 1.0$
$C_2 = 0.0$
$C_4 = 0.7058626 \times 10^{-5}$
$C_6 = 0.1038001 \times 10^{-8}$
$C_8 = 0.4697824 \times 10^{-21}$
$C_{10} = 0.7558945 \times 10^{-13}$

Example 7
The fifth lens surface has been made non-spherical. $f=18.4$ mm; $F/3.5$; Angle of view 100(; $B.f.=41.878$ mm.

Example 8
The seventh lens surface has been made non-spherical. $f=18.4$ mm; $F/3.5$; Angle of view 100°; $B.f.=42.136$ mm.

| | | | | | | | |
|---|---|---|---|---|---|---|---|
| $r_1=$ | 37.26 | | | | | | |
| | | $d_1=$ | 2.00 | $n_1=$ | 1.713 | $\nu_1=$ | 53.9 |
| $r_2=$ | 27.38 | | | | | | |
| | | $d_2=$ | 6.42 | | | | |
| $r_3=$ | 44.55 | | | | | | |
| | | $d_3=$ | 5.23 | $n_2=$ | 1.6425 | $\nu_2=$ | 58.1 |
| $r_4=$ | 106.61 | | | | | | |
| | | $d_4=$ | 0.10 (non spherical) | | | | |
| $r_5=$ | 24.72 | | | | | | |
| | | $d_5=$ | 1.00 | $n_3=$ | 1.713 | $\nu_3=$ | 53.9 |
| $r_6=$ | 14.85 | | | | | | |
| | | $d_6=$ | 4.10 | | | | |
| $r_7=$ | 24.10 | | | | | | |
| | | $d_7=$ | 0.99 | $n_4=$ | 1.717 | $\nu_4=$ | 48.0 |
| $r_8=$ | 15.60 | | | | | | |
| | | $d_8=$ | 5.91 | | | | |
| $r_9=$ | −72.25 | | | | | | |
| | | $d_9=$ | 3.88 | $n_5=$ | 1.77279 | $\nu_5=$ | 49.5 |
| $r_{10}=$ | 15.92 | | | | | | |
| | | $d_{10}=$ | 15.23 | $n_6=$ | 1.56013 | $\nu_6=$ | 47.0 |
| $r_{11}=$ | −27.78 | | | | | | |
| | | $d_{11}=$ | 0.1 | | | | |
| $r_{12}=$ | 23.68 | | | | | | |
| | | $d_{12}=$ | 0.98 | $n_7=$ | 1.67025 | $\nu_7=$ | 57.5 |
| $r_{13}=$ | 9.96 | | | | | | |
| | | $d_{13}=$ | 2.31 | | | | |
| $r_{14}=$ | 14.85 | | | | | | |
| | | $d_{14}=$ | 11.42 | $n_8=$ | 1.58065 | $\nu_8=$ | 37.1 |
| $r_{15}$ | $\infty$ | | | | | | |
| | | $d_{15}=$ | 1.02 | | | | |
| $r_{16}$ | $\infty$ | | | | | | |
| | | $d_{16}=$ | 2.46 | $n_9=$ | 1.58065 | $\nu_9=$ | 37.1 |
| $r_{17}=$ | −14.71 | | | | | | |
| | | $d_{17}=$ | 3.26 | | | | |
| $r_{18}=$ | −14.99 | | | | | | |
| | | $d_{18}=$ | 2.90 | $n_{10}=$ | 1.86074 | $\nu_{10}=$ | 23.1 |
| $r_{19}=$ | 59.08 | | | | | | |
| | | $d_{19}=$ | 0.57 | | | | |
| $r_{20}=$ | −57.34 | | | | | | |
| | | $d_{20}=$ | 2.37 | $n_{11}=$ | 1.51454 | $\nu_{11}=$ | 54.6 |
| $r_{21}=$ | −12.42 | | | | | | |
| | | $d_{21}=$ | 0.1 | | | | |
| $r_{22}=$ | −662.47 | | | | | | |
| | | $d_{22}=$ | 5.41 | $n_{12}=$ | 1.56883 | $\nu_{12}=$ | 56.0 |
| $r_{23}=$ | −24.62 | | | | | | |

| | | | | | | | | |
|---|---|---|---|---|---|---|---|---|
| $r_1 =$ | 37.16 | | | | | | | |
| | | $d_1 =$ | 2.00 | $n_1 =$ | 1.713 | $\nu_1 =$ | 53.9 | |
| $r_2 =$ | 27.23 | | | | | | | |
| | | $d_2 =$ | 6.42 | | | | | |
| $r_3 =$ | 44.55 | | | | | | | |
| | | $d_3 =$ | 5.22 | $n_2 =$ | 1.6425 | $\nu_2 =$ | 58.1 | |
| $r_4 =$ | 109.02 | | | | | | | |
| | | $d_4 =$ | 0.10 | | | | | |
| $r_5 =$ | 23.73 | | | | | | | |
| | | $d_5 =$ | 1.00 | $n_3 =$ | 1.713 | $\nu_3 =$ | 53.9 | |
| $r_6 =$ | 14.92 | | | | | | | |
| | | $d_6 =$ | 3.79 non-spherical | | | | | |
| $r_7 =$ | 25.33 | | | | | | | |
| | | $d_7 =$ | 0.97 | $n_4 =$ | 1.717 | $\nu_4 =$ | 48.0 | |
| $r_8 =$ | 16.08 | | | | | | | |
| | | $d_8 =$ | 5.91 | | | | | |
| $r_9 =$ | −72.25 | | | | | | | |
| | | $d_9 =$ | 4.99 | $n_5 =$ | 1.77279 | $\nu_5 =$ | 49.5 | |
| $r_{10}=$ | 15.30 | | | | | | | |
| | | $d_{10}=$ | 15.62 | $n_6 =$ | 1.56013 | $\nu_6 =$ | 47.0 | |
| $r_{11}=$ | −27.78 | | | | | | | |
| | | $d_{11}=$ | 0.10 | | | | | |
| $r_{12}=$ | 24.03 | | | | | | | |
| | | $d_{12}=$ | 0.96 | $n_7 =$ | 1.67025 | $\nu_7 =$ | 57.5 | |
| $r_{13}=$ | 9.96 | | | | | | | |
| | | $d_{13}=$ | 2.31 | | | | | |
| $r_{14}=$ | 14.69 | | | | | | | |
| | | $d_{14}=$ | 11.87 | $n_8 =$ | 1.58065 | $\nu_8 =$ | 37.1 | |
| $r_{15}=$ | ∞ | | | | | | | |
| | | $d_{15}=$ | 1.0 | | | | | |
| $r_{16}=$ | ∞ | | | | | | | |
| | | $d_{16}=$ | 2.07 | $n_9 =$ | 1.58065 | $\nu_9 =$ | 37.1 | |
| | | $d_{17}=$ | 3.38 | | | | | |
| $r_{17}=$ | −14.99 | | | | | | | |
| | | $d_{18}=$ | 2.90 | $n_{10}=$ | 1.86074 | $\nu_{10}=$ | 23.1 | |
| $r_{18}=$ | 59.08 | | | | | | | |
| | | $d_{19}=$ | 0.57 | | | | | |
| $r_{20}=$ | −55.81 | | | | | | | |
| | | $d_{20}=$ | 2.76 | $n_{11}=$ | 1.51454 | $\nu_{11}=$ | 54.6 | |
| $r_{21}=$ | −12.42 | | | | | | | |
| | | $d_{21}=$ | 0.10 | | | | | |
| $r_{22}=$ | −599.43 | | | | | | | |
| | | $d_{22}=$ | 3.65 | $n_{12}=$ | 1.56883 | $\nu_{12}=$ | 56.0 | |
| $r_{23}=$ | −24.92 | | | | | | | |

The non-spherical surface provides the seventh surface of the divergent optical system.

Factors of Non-sphericity

$K = 1.0$
$C_2 = 0.0$
$C_4 = 0.1218404 \times 10^{-4}$
$C_6 = -0.2683242 \times 10^{-12}$
$C_8 = -0.3127555 \times 10^{-18}$
$C_{10} = 0.1992141 \times 10^{-12}$ Example 9

The eighth lens surface has been made non-spherical. $f$=18.4 mm; $F$/3.5; Angle of view 100°; $Bf$=41,834.

| | | | | | | | | |
|---|---|---|---|---|---|---|---|---|
| $r_1$ | = | 36.78 | | | | | | |
| | | | $d_1$ | = | 2.00 | $n_1$ | = | 1.713 | $\nu_1$ | = | 53.9 |
| $r_2$ | = | 27.51 | | | | | | |
| | | | $d_2$ | = | 6.42 | | | |
| $r_3$ | = | 44.55 | | | | | | |
| | | | $d_3$ | = | 7.39 | $n_2$ | = | 1.6425 | $\nu_2$ | = | 58.1 |
| $r_4$ | = | 117.59 | | | | | | |
| | | | $d_4$ | = | 0.10 | | | |
| $r_5$ | = | 26.21 | | | | | | |
| | | | $d_5$ | = | 1.00 | $n_3$ | = | 1.713 | $\nu_3$ | = | 53.9 |
| $r_6$ | = | 16.30 | | | | | | |
| | | | $d_6$ | = | 3.09 | | | |
| $r_7$ | = | 25.65 | | | | | | |
| | | | $d_7$ | = | 1.00 non-spherical | $n_4$ | = | 1.717 | $\nu_4$ | = | 48.0 |
| $r_8$ | = | 13.92 | | | | | | |
| | | | $d_8$ | = | 5.91 | | | |
| $r_9$ | = | −72.25 | | | | | | |
| | | | $d_9$ | = | 4.18 | $n_5$ | = | 1.77279 | $\nu_5$ | = | 49.5 |
| $r_{10}$ | = | 17.08 | | | | | | |
| | | | $d_{10}$ | = | 15.28 | $n_6$ | = | 1.56013 | $\nu_6$ | = | 47.0 |
| $r_{11}$ | = | −27.78 | | | | | | |
| | | | $d_{11}$ | = | 0.10 | | | |
| $r_{12}$ | = | 23.34 | | | | | | |
| | | | $d_{12}$ | = | 0.93 | $n_7$ | = | 1.67025 | $\nu_7$ | = | 57.5 |
| $r_{13}$ | = | 9.96 | | | | | | |
| | | | $d_{13}$ | = | 2.31 | | | |
| $r_{14}$ | = | 14.64 | | | | | | |
| | | | $d_{14}$ | = | 12.22 | $n_8$ | = | 1.58065 | $\nu_8$ | = | 37.1 |
| $r_{15}$ | = | ∞ | | | | | | |
| | | | $d_{15}$ | = | 1.00 | | | |

Example 9—Continued

| | | | | | | | |
|---|---|---|---|---|---|---|---|
| $r_{16}$ | = | ∞ | | | | | |
| | | | $d_{16}$ = 2.43 | $n_9$ = 1.58065 | $\nu_9$ = 37.1 | | |
| $r_{17}$ | = | −15.07 | | | | | |
| | | | $d_{17}$ = 3.51 | | | | |
| $r_{18}$ | = | −14.99 | | | | | |
| | | | $d_{18}$ = 2.90 | $n_{10}$ = 1.86074 | $\nu_{10}$ = 23.1 | | |
| $r_{19}$ | = | 59.08 | | | | | |
| | | | $d_{19}$ = 0.57 | | | | |
| $r_{20}$ | = | −60.15 | | | | | |
| | | | $d_{20}$ = 2.59 | $n_{11}$ = 1.51454 | $\nu_{11}$ = 54.6 | | |
| $r_{21}$ | = | −12.42 | | | | | |
| | | | $d_{21}$ = 0.10 | | | | |
| $r_{22}$ | = | −740.83 | | | | | |
| | | | $d_{22}$ = 3.35 | $n_{12}$ = 1.56883 | $\nu_{12}$ = 56.0 | | |
| $r_{23}$ | = | −24.98 | | | | | |

The non-spherical surface provides the eighth surface of the divergent optical system.

Factors of Non-sphericity $K = 1.0$
$C_2 = 0.0$
$C_4 = -0.1648184 \times 10^{-4}$
$C_6 = 0.2809641 \times 10^{-8}$
$C_8 = 0.7622571 \times 10^{-21}$
$C_{10} = -0.2215386 \times 10^{-11}$ Spherical Optical System (for comparison) $f=18.4$ mm; $F/3.5$; Angle of view 100°; $B.f.=38.27$ mm.

has a focal length 18.5 mm, a relative aperture $F/4$ and an angle of view 100°. In this lens system, first and second negative meniscus lenses L1 and L2, a third positive meniscus lens L3 and a fourth negative meniscus lens L4 together constitute a forward divergent group S1; a fifth cemented composite positive lens L5, a sixth negative meniscus lens L6 and a seventh positive lens L7 together constitute a forward convergent group S2 preceding a diaphragm; and a rearward convergent group S3 succeeding the diaphragm is provided by an eighth positive lens L8, a ninth negative lens L9, and tenth and eleventh positive lenses L10 and L11.

Figure 15:
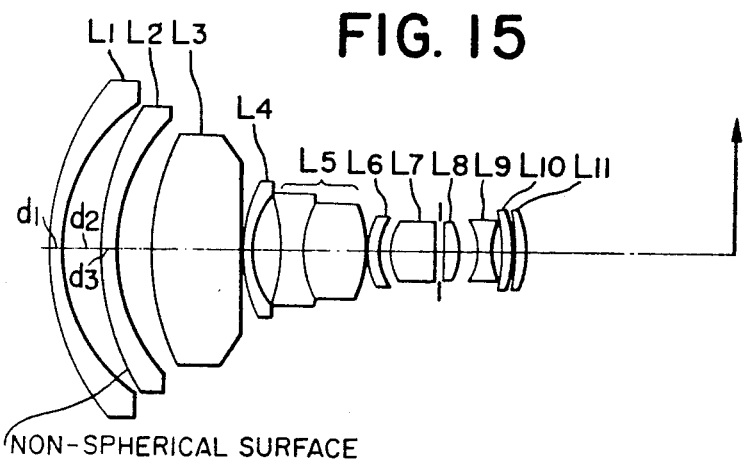
FIG. 15 is a longitudinal section of the lens arrangement according to Example 11, of the present invention.
Figure 16A:
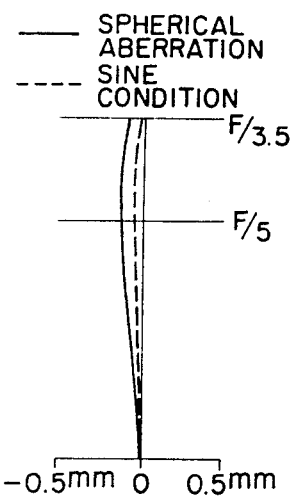
FIGS. 16A, 16B, 16C and 16D show graphs of aberrations therein.
Figure 16B:
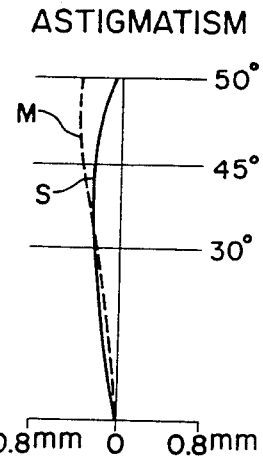
Figure 16C:
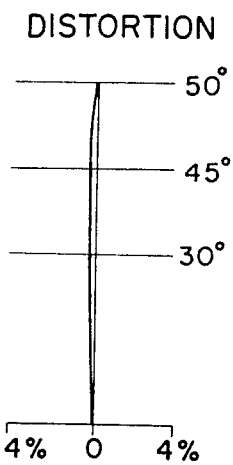
Figure 16D:
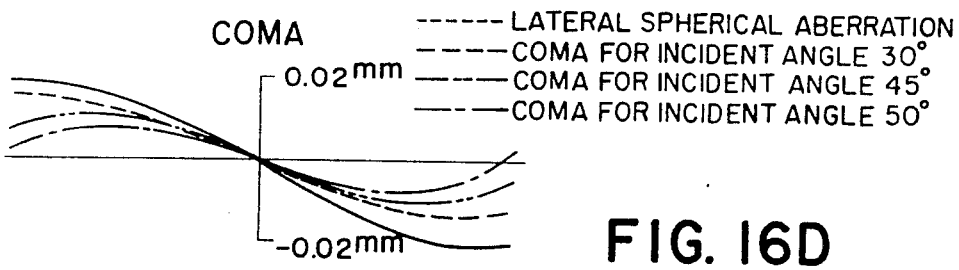
Figure 17:
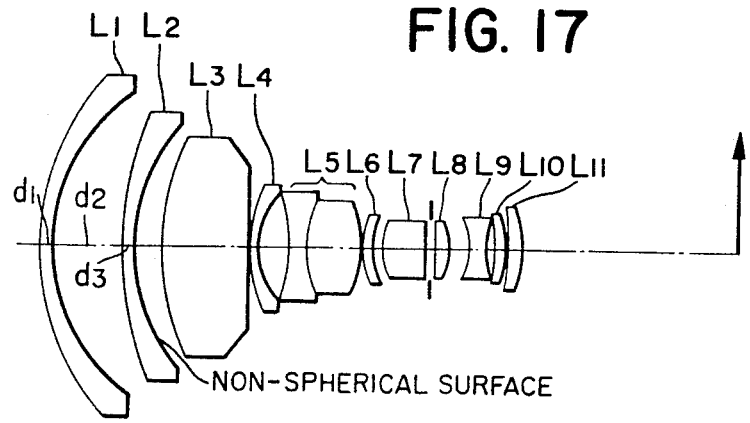
FIG. 17 is a longitudinal sectional view of the lens arrangement according to Example 12 of the present invention.
Figure 18A:
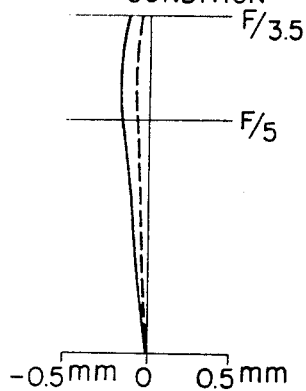
FIGS. 18A, 18B, 18C and 18D are graphical representations of aberrations thereon.
Figure 18B:
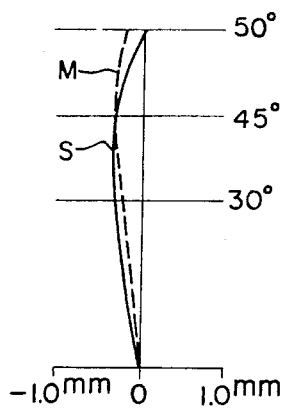
Figure 18C:
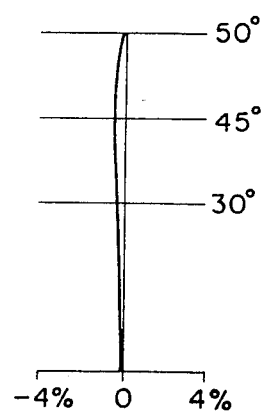
Figure 18D:
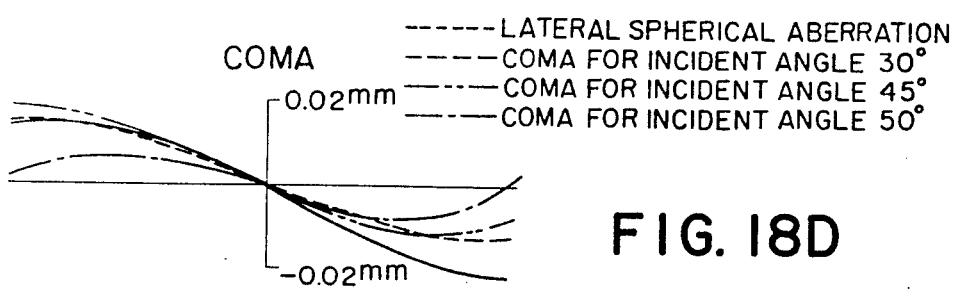

FIG. 15, Example 11, is similar in type to the arrangement of Example 10 except that the third lens surface

| | | | | | | | |
|---|---|---|---|---|---|---|---|
| $r_1$ | = | 38.8 | | | | | |
| | | | $d_1$ = 2.1 | $n_1$ = 1.71300 | $\nu_1$ = 53.9 | | |
| $r_2$ | = | 23.6 | | | | | |
| | | | $d_2$ = 5.6 | | | | |
| $r_3$ | = | 36.8 | | | | | |
| | | | $d_3$ = 5.4 | $n_2$ = 1.64006 | $\nu_2$ = 60.0 | | |
| $r_4$ | = | 121.0 | | | | | |
| | | | $d_4$ = 0.1 | | | | |
| $r_5$ | = | 23.2 | | | | | |
| | | | $d_5$ = 0.9 | $n_3$ = 1.71700 | $\nu_3$ = 48.0 | | |
| $r_6$ | = | 14.76 | | | | | |
| | | | $d_6$ = 4.1 | | | | |
| $r_7$ | = | 21.65 | | | | | |
| | | | $d_7$ = 0.9 | $n_4$ = 1.71700 | $\nu_4$ = 48.0 | | |
| $r_8$ | = | 13.90 | | | | | |
| | | | $d_8$ = 5.0 | | | | |
| $r_9$ | = | −112.00 | | | | | |
| | | | $d_9$ = 3.2 | $n_5$ = 1.77279 | $\nu_5$ = 49.5 | | |
| $r_{10}$ | = | 14.76 | | | | | |
| | | | $d_{10}$ = 12.7 | $n_6$ = 1.55690 | $\nu_6$ = 48.5 | | |
| $r_{11}$ | = | −26.556 | | | | | |
| | | | $d_{11}$ = 0.1 | | | | |
| $r_{12}$ | = | 21.1 | | | | | |
| | | | $d_{12}$ = 0.9 | $n_7$ = 1.67025 | $\nu_7$ = 57.5 | | |
| $r_{13}$ | = | 9.7 | | | | | |
| | | | $d_{13}$ = 2.4 | | | | |
| $r_{14}$ | = | 14.8 | | | | | |
| | | | $d_{14}$ = 6.1 | $n_8$ = 1.58065 | $\nu_8$ = 37.1 | | |
| $r_{15}$ | = | ∞ | | | | | |
| | | | $d_{15}$ = 1.5 | | | | |
| $r_{16}$ | = | ∞ | | | | | |
| | | | $d_{16}$ = 3.3 | $n_9$ = 1.58065 | $\nu_9$ = 37.1 | | |
| $r_{17}$ | = | −14.4 | | | | | |
| | | | $d_{17}$ = 3.8 | | | | |
| $r_{18}$ | = | −14.3 | | | | | |
| | | | $d_{18}$ = 3.6 | $n_{10}$ = 1.86074 | $\nu_{10}$ = 23.1 | | |
| $r_{19}$ | = | 55.6 | | | | | |
| | | | $d_{19}$ = 0.7 | | | | |
| $r_{20}$ | = | −69.0 | | | | | |
| | | | $d_{20}$ = 2.8 | $n_{11}$ = 1.51454 | $\nu_{11}$ = 54.6 | | |
| $r_{21}$ | = | −11.7 | | | | | |
| | | | $d_{21}$ = 0.05 | | | | |
| $r_{22}$ | = | −300.0 | | | | | |
| | | | $d_{22}$ = 2.2 | $n_{12}$ = 1.61720 | $\nu_{12}$ = 54.0 | | |
| $r_{23}$ | = | −27.15 | | | | | |

Figure 20:
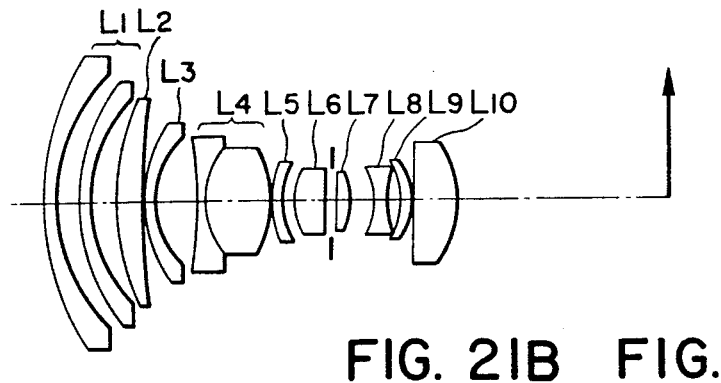
FIGS. 20, and 21A, 21B, 21C and 21D, respectively, show a longitudinal section of the spherical optical system and graphs of aberrations therein.
Figure 21A:
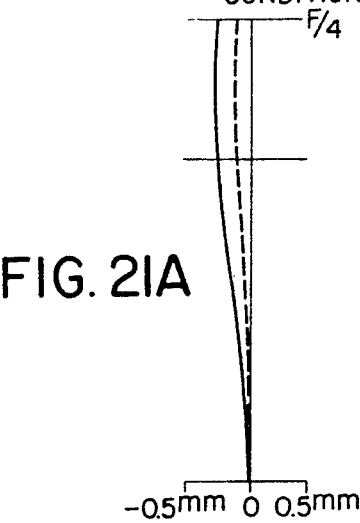
Figure 21B:
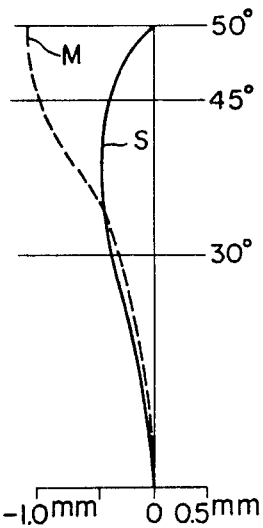
Figure 21C:
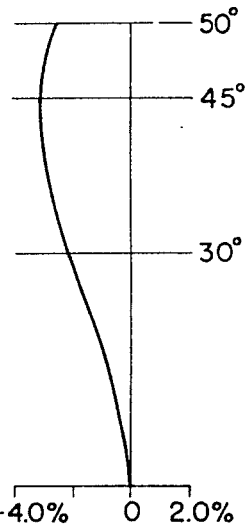
Figure 21D:
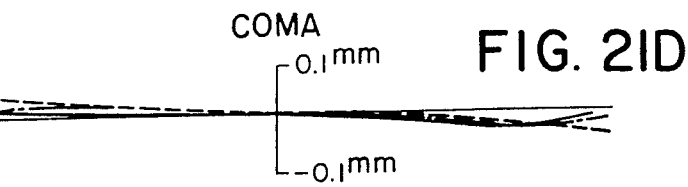

FIG. 13 illustrates an embodiment of the present telephoto-type lens system in which the first lens surface of the forward divergent group is non-spherical and which of the forward divergent group is non-spherical. FIGS. 18 A–D and 19 A–D show the aberrations in Examples 12 and 13 in which the fourth and the fifth lens surface are non-spherical, respectively. FIG. 20 illustrates the lens arrangement in the spherical optical system of that type and the aberrations therein (see FIGS. 21A–D).

In Examples 10 to 14, distortion is substantially eliminated and spherical aberration, coma and astigmatism are greatly corrected. Moreover, the back-focus is sufficiently longer than that in the spherical optical system of the same type. Usually, an attempt to eliminate distortion by applying a non-spherical surface to the forward divergent group causes an increase in astigmatism. This will be apparent when the Seidel coefficients of Example 10 are compared with those of a spherical optical system. For example, the first lens surface of the spherical optical system has specific Seidel coefficients, i.e., 0.008 for astigmatism and 0.089 for distortion. On the other hand, the first lens surface using the non-spherical surface of Example 10 has specific Seidel coefficients 0.077 for astigmatism and −0.057 for distortion. This negative value of distortion is necessary to approximate the distortion of the final Seidel coefficient to zero, but such a negative distortion causes the astigmatism to be as great as 0.077.

Such a property appearing in the Seidel coefficient of the cubic term also holds true of wide angle lenses to some extent. More specifically, an attempt to eliminate distortion by the application of a non-spherical surface will again increase the intermediate area of the view field to cause curvature of the meridional plane, as described previously.

Figure 22A:
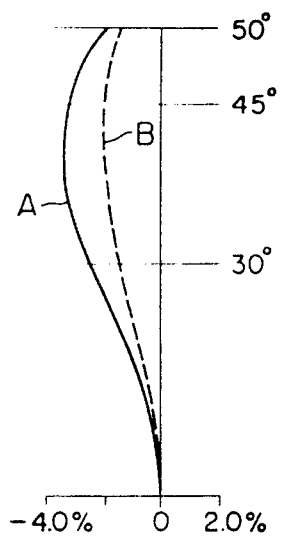
FIGS. 22A and 22B 23A and 23B are graphs showing the results of the experiments effected on the relation between distortion and astigmatism.
Figure 22B:
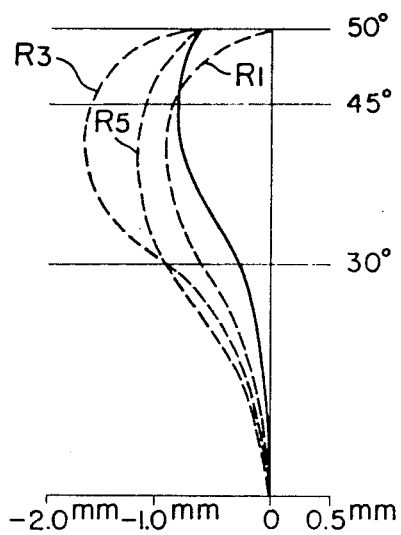
Figure 23A:
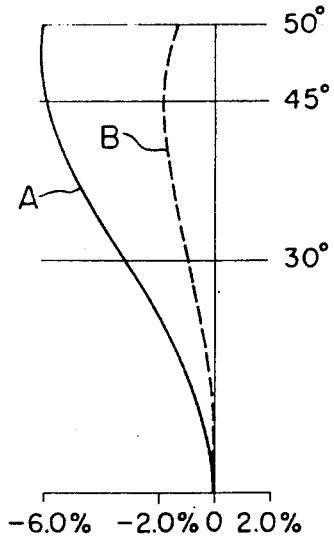
Figure 23B:
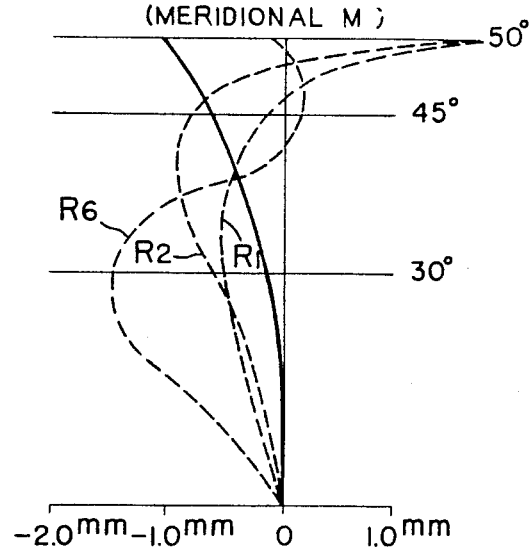

FIGS. 22A and 22B illustrate the results of the experiments effected on the above-described relationship between distortion and astigmatism. It shows how the astigmatism (i.e., meridional plane) is curved when distortion is corrected to some extent by making one surface non-spherical and by varying the other spherical surfaces and the intervertex distances to some extent. FIGS. 23A and 23B illustrate the results of other similar experiments carried out to correct the distortion along by making one lens surface non-spherical with the inter-vertex distances and curvature of the spherical optical system fixed invariably and to minimize the curvature of astigmatism (i.e., meridional plane). In this case, however, the inter-vertex distances $d_5$, $d_9+_{10}$ and $d_{14}$ are invariable. As will be seen from FIGS. 22A, 22B, 23A and 23B, the curvature of astigmatism is unavoidable for the correction of distortion.

The reason why the elimination of distortion by the use of a non-spherical surface accompanies an increase in astigmatism has been noted above, but such an increase in astigmatism may be overcome by providing the following condition:

$$3.7f > d_5 + d_9+_{10} + d_{14} > 1.5f$$

This condition is useful to increase the thicknesses of the forward lenses L3, L5 and L7 and accordingly, increase the length of the optical path, thus contributing to the correction of the curvature of astigmatism and to the flattening of the image plane. Thus, the increased thicknesses of the lenses L3, L5 and L7 are highly effective to provide good flatness of the image plane. Instead of the convex lenses L3, L5 and L7, the negative meniscus lenses L1, L2 and L3 may be increased in thickness, but this would be less successful. It has never been thought before that the thicknesses of the convex lenses L3, L5 and L7 can be so greatly increased.

Incidentally, the numerical values for condition (VI) in Examples 10 to 13 and the numerical data of the spherical system will be given below for comparison.

| Example | 10 | 11 | 12 | 13 | Spherical system |
|---|---|---|---|---|---|
| $d_5$ | 14.86 | 16.58 | 15.50 | 17.83 | 5.0 |
| $d_{9+10}$ | 14.41 | 15.21 | 15.36 | 15.83 | 14.0 |
| $d_{14}$ | 7.83 | 7.86 | 8.16 | 8.68 | 5.95 |
| $d_5 + d_{9+10} + d_{14}$ | 37.10 | 39.65 | 39.02 | 42.34 | 24.95 |
| $(d_5+d_{9+10}+d_{14})/f$ | 2.005 | 2.143 | 2.109 | 2.289 | 1.356 |

Example 10

The first lens surface has been made non-spherical. $f=18.5$ mm; Relative aperture F/4.0; Angle of view 100°; B.f.=37.986 mm.

| | | | | | | | | |
|---|---|---|---|---|---|---|---|---|
| $r_1$ | = | 41.7 non-spherical | | | | | | |
| $r_2$ | = | 27.90 | $d_1$ | = | 2.00 | $n_1$ = 1.69680 | $\nu_1$ = | 55.6 |
| $r_3$ | = | 71.15 | $d_2$ | = | 10.02 | | | |
| $r_4$ | = | 26.71 | $d_3$ | = | 1.80 | $n_2$ = 1.69680 | $\nu_2$ = | 55.6 |
| $r_5$ | = | 40.00 | $d_4$ | = | 3.38 | | | |
| $r_6$ | = | 332.22 | $d_5$ | = | 14.86 | $n_3$ = 1.62041 | $\nu_3$ = | 60.3 |
| $r_7$ | = | 23.04 | $d_6$ | = | 0.10 | | | |
| $r_8$ | = | 12.40 | $d_7$ | = | 1.00 | $n_4$ = 1.69680 | $\nu_4$ = | 55.6 |
| $r_9$ | = | −63.51 | $d_8$ | = | 4.90 | | | |
| $r_{10}$ | = | 20.60 | $d_9$ | = | 3.85 | $n_5$ = 1.77279 | $\nu_5$ = | 49.5 |
| $r_{11}$ | = | −28.00 | $d_{10}$ | = | 10.56 | $n_6$ = 1.58900 | $\nu_6$ = | 48.6 |
| $r_{12}$ | = | 19.10 | $d_{11}$ | = | 0.10 | | | |

Example 10—Continued

| | | | | | | | | |
|---|---|---|---|---|---|---|---|---|
| $r_{13}$ | = | 10.10 | $d_{12}$ | = | 1.00 | $n_7$ | = | 1.67025 | $\nu_7$ | = | 57.5 |
| $r_{14}$ | = | 13.07 | $d_{13}$ | = | 1.80 | | | | | | |
| $r_{15}$ | = | ∞ | $d_{14}$ | = | 7.83 | $n_8$ | = | 1.58065 | $\nu_8$ | = | 37.1 |
| $r_{16}$ | = | ∞ | $d_{15}$ | = | 1.37 | | | | | | |
| $r_{17}$ | = | −16.27 | $d_{16}$ | = | 2.03 | $n_9$ | = | 1.58065 | $\nu_9$ | = | 37.1 |
| $r_{18}$ | = | −14.60 | $d_{17}$ | = | 3.25 | | | | | | |
| $r_{19}$ | = | 50.70 | $d_{18}$ | = | 3.10 | $n_{10}$ | = | 1.86074 | $\nu_{10}$ | = | 23.1 |
| $r_{20}$ | = | −36.74 | $d_{19}$ | = | 0.90 | | | | | | |
| $r_{21}$ | = | −11.80 | $d_{20}$ | = | 2.14 | $n_{11}$ | = | 1.51823 | $\nu_{11}$ | = | 59.0 |
| $r_{22}$ | = | −144.81 | $d_{21}$ | = | 0.10 | | | | | | |
| $r_{23}$ | = | −19.33 | $d_{22}$ | = | 2.32 | $n_{12}$ | = | 1.55671 | $\nu_{12}$ | = | 58.5 |

The non-Spherical surface provides the first surface of the divergent optical system.

Factors of Non-sphericity $K = 1.0$
$C_2 = 0.0$
$C_4 = 0.1604024 \times 10^{-5}$
$C_6 = 0.5181636 \times 10^{-9}$
$C_8 = -0.3102939 \times 10^{-19}$
$C_{10} = 0.4921401 \times 10^{-15}$ The above factors are those related to the aforesaid equation (IV) representing the non-spherical surface.

Seidel Coefficients

| | I | II | III | IV | V |
|---|---|---|---|---|---|
| $r_1$ | 0.038 | −0.038 | 0.077 | 0.091 | 0.057 |
| $r_2$ | −0.077 | 0.020 | −0.005 | −0.136 | 0.036 |
| $r_3$ | 0.014 | 0.018 | 0.022 | 0.053 | 0.093 |
| $r_4$ | −0.359 | 0.064 | −0.011 | −0.142 | 0.027 |
| $r_5$ | 0.228 | 0.015 | 0.001 | 0.088 | 0.005 |
| $r_6$ | −0.004 | −0.013 | −0.038 | −0.010 | −0.145 |
| $r_7$ | 0.277 | 0.073 | 0.019 | 0.164 | 0.049 |
| $r_8$ | −3.449 | 0.349 | −0.035 | −0.306 | 0.034 |
| $r_9$ | 0.031 | 0.059 | 0.111 | 0.063 | 0.089 |
| $r_{10}$ | −1.632 | 0.044 | −0.001 | −0.029 | 0.000 |
| $r_{11}$ | −0.009 | 0.007 | −0.005 | 0.122 | −0.087 |
| $r_{12}$ | 4.774 | 0.520 | 0.056 | 0.194 | 0.027 |
| $r_{13}$ | −51.403 | −0.468 | −0.004 | −0.367 | −0.003 |
| $r_{14}$ | 38.464 | 1.409 | 0.051 | 0.260 | 0.011 |
| $r_{15}$ | 0.000 | −0.002 | 0.013 | 0.000 | −0.068 |
| $r_{16}$ | −0.000 | 0.002 | −0.013 | 0.000 | 0.068 |
| $r_{17}$ | 21.781 | −2.117 | 0.205 | 0.208 | −0.040 |
| $r_{18}$ | −20.970 | 1.482 | −0.104 | −0.293 | 0.028 |
| $r_{19}$ | −2.872 | −1.149 | −0.459 | −0.084 | −0.217 |
| $r_{20}$ | 0.007 | 0.029 | 0.113 | 0.085 | 0.104 |
| $r_{21}$ | 8.146 | −0.129 | 0.002 | 0.267 | −0.004 |
| $r_{22}$ | −0.009 | 0.012 | −0.018 | −0.022 | 0.058 |
| $r_{23}$ | 9.373 | −0.090 | 0.000 | 0.171 | −0.001 |
| Σ | 2.350 | 0.098 | −0.021 | 0.080 | 0.010 |

Example 11

The third lens surface has been made non-spherical.

$f=18.5$ mm; $F/4$; Angle of view 100°; $B.f.=36.924$ mm.

| | | | | | | | | |
|---|---|---|---|---|---|---|---|---|
| $r_1$ | = | 41.69 | $d_1$ | = | 2.00 | $n_1$ | = | 1.69680 | $\nu_1$ | = | 55.6 |
| $r_2$ | = | 29.78 | $d_2$ | = | 7.47 | | | | | | |
| $r_3$ | = | 60.40 non-spherical | $d_3$ | = | 1.80 | $n_2$ | = | 1.69680 | $\nu_2$ | = | 55.6 |
| $r_4$ | = | 26.71 | $d_4$ | = | 5.90 | | | | | | |
| $r_5$ | = | 40.52 | $d_5$ | = | 16.58 | $n_3$ | = | 1.62041 | $\nu_3$ | = | 60.3 |
| $r_6$ | = | 929.09 | $d_6$ | = | 0.10 | | | | | | |
| $r_7$ | = | 23.04 | $d_7$ | = | 0.99 | $n_4$ | = | 1.69680 | $\nu_4$ | = | 55.6 |
| $r_8$ | = | 12.07 | $d_8$ | = | 5.62 | | | | | | |
| $r_9$ | = | −55.56 | $d_9$ | = | 3.85 | $n_5$ | = | 1.77279 | $\nu_5$ | = | 49.5 |
| $r_{10}$ | = | 20.60 | $d_{10}$ | = | 11.36 | $n_6$ | = | 1.58900 | $\nu_6$ | = | 48.6 |
| $r_{11}$ | = | −24.12 | $d_{11}$ | = | 0.10 | | | | | | |
| $r_{12}$ | = | 19.10 | $d_{12}$ | = | 0.98 | $n_7$ | = | 1.67025 | $\nu_7$ | = | 57.5 |
| $r_{13}$ | = | 9.96 | $d_{13}$ | = | 2.46 | | | | | | |
| $r_{14}$ | = | 13.61 | $d_{14}$ | = | 7.86 | $n_8$ | = | 1.58065 | $\nu_8$ | = | 37.1 |
| $r_{15}$ | = | ∞ | $d_{15}$ | = | 1.09 | | | | | | |
| $r_{16}$ | = | ∞ | $d_{16}$ | = | 2.03 | $n_9$ | = | 1.58065 | $\nu_9$ | = | 37.1 |
| $r_{17}$ | = | −16.27 | | | | | | | | | |

Example 11 – Continued

| | | | | | | | |
|---|---|---|---|---|---|---|---|
| | | $d_{17}$ | = | 3.47 | | | |
| $r_{18}$ | = | 14.11 | | | | | |
| | | $d_{18}$ | = | 3.10 | $n_{10}$ = 1.86074 | $\nu_{10}$ = 23.1 |
| $r_{19}$ | = | 46.95 | | | | | |
| | | $d_{19}$ | = | 0.90 | | | |
| $r_{20}$ | = | 36.74 | | | | | |
| | | $d_{20}$ | = | 2.32 | $n_{11}$ = 1.51823 | $\nu_{11}$ = 59.0 |
| $r_{21}$ | = | 11.42 | | | | | |
| | | $d_{21}$ | = | 0.10 | | | |
| $r_{22}$ | = | −112.00 | | | | | |
| | | $d_{22}$ | = | 1.58 | $n_{12}$ = 1.55671 | $\nu_{12}$ = 58.5 |
| $r_{23}$ | = | −19.33 | | | | | |

The non-spherical surface provides the third surface of the divergent optical system.

Factors of Non-sphericity $K$ = 1.0
$C_2$ = 0.0
$C_4$ = $0.2064252 \times 10^{-5}$
$C_6$ = $-0.1522384 \times 10^{-8}$
$C_8$ = $-0.3320771 \times 10^{-19}$
$C_{10}$ = $0.1717369 \times 10^{-15}$ The non-spherical surface provides the fourth surface of the divergent optical system.

Factors of Non-sphericity $K$ = 1.0
$C_2$ = 0.0
$C_4$ = $-0.3798663 \times 10^{-5}$
$C_6$ = $-0.2689868 \times 10^{-9}$
$C_8$ = $-0.7954513 \times 10^{-18}$
$C_{10}$ = $-0.5880235 \times 10^{-14}$ Example 12

The fourth lens surface has been made non-spherical. $f$=18.5 mm; $F/4$; Angle of view 100°; $B.f.$=37.672 mm.

Example 13

The fifth lens surface has been made non-spherical. $f$=18.5 mm; $F/4$; Angle of view 100°; $B.f.$=38.622 mm.

| | | | | | | | |
|---|---|---|---|---|---|---|---|
| $r_1$ | = | 41.69 | | | | | |
| | | $d_1$ | = | 2.00 | $n_1$ = 1.69680 | $\nu_1$ = 55.6 |
| $r_2$ | = | 28.69 | | | | | |
| | | $d_2$ | = | 12.13 | | | |
| $r_3$ | = | 62.50 | | | | | |
| | | $d_3$ | = | 1.80 | $n_2$ = 1.69680 | $\nu_2$ = 55.6 |
| $r_4$ | = | 26.71 non-spherical | | | | | |
| | | $d_4$ | = | 4.82 | | | |
| $r_5$ | = | 39.64 | | | | | |
| | | $d_5$ | = | 15.50 | $n_3$ = 1.62041 | $\nu_3$ = 60.3 |
| $r_6$ | = | 819.42 | | | | | |
| | | $d_6$ | = | 0.10 | | | |
| $r_7$ | = | 23.04 | | | | | |
| | | $d_7$ | = | 0.99 | $n_4$ = 1.69680 | $\nu_4$ = 55.6 |
| $r_8$ | = | 12.12 | | | | | |
| | | $d_8$ | = | 5.23 | | | |
| $r_9$ | = | −58.27 | | | | | |
| | | $d_9$ | = | 3.85 | $n_5$ = 1.77279 | $\nu_5$ = 49.5 |
| $r_{10}$ | = | 20.60 | | | | | |
| | | $d_{10}$ | = | 11.51 | $n_6$ = 1.58900 | $\nu_6$ = 48.6 |
| $r_{11}$ | = | −26.86 | | | | | |
| | | $d_{11}$ | = | 0.10 | | | |
| $r_{12}$ | = | 19.10 | | | | | |
| | | $d_{12}$ | = | 0.96 | $n_7$ = 1.67025 | $\nu_7$ = 57.5 |
| $r_{13}$ | = | 10.00 | | | | | |
| | | $d_{13}$ | = | 2.11 | | | |
| $r_{14}$ | = | 13.24 | | | | | |
| | | $d_{14}$ | = | 8.16 | $n_8$ = 1.58065 | $\nu_8$ = 37.1 |
| $r_{15}$ | = | ∞ | | | | | |
| | | $d_{15}$ | = | 1.05 | | | |
| $r_{16}$ | = | ∞ | | | | | |
| | | $d_{16}$ | = | 2.03 | $n_9$ = 1.58065 | $\nu_9$ = 37.1 |
| $r_{17}$ | = | −16.27 | | | | | |
| | | $d_{17}$ | = | 3.78 | | | |
| $r_{18}$ | = | −14.23 | | | | | |
| | | $d_{18}$ | = | 3.10 | $n_{10}$ = 1.86074 | $\nu_{10}$ = 23.1 |
| $r_{19}$ | = | 48.77 | | | | | |
| | | $d_{19}$ | = | 0.90 | | | |
| $r_{20}$ | = | −36.74 | | | | | |
| | | $d_{20}$ | = | 2.21 | $n_{11}$ = 1.51823 | $\nu_{11}$ = 59.0 |
| $r_{21}$ | = | −11.75 | | | | | |
| | | $d_{21}$ | = | 0.10 | | | |
| $r_{22}$ | = | −131.01 | | | | | |
| | | $d_{22}$ | = | 2.29 | $n_{12}$ = 1.55671 | $\nu_{12}$ = 58.5 |
| $r_{23}$ | = | −19.33 | | | | | |

| | | | | | | | | | | |
|---|---|---|---|---|---|---|---|---|---|---|
| $r_1$ | = | 41.69 | | | | | | | | |
| | | | $d_1$ | = | 2.00 | $n_1$ | = | 1.69680 | $\nu_1$ | = 55.6 |
| $r_2$ | = | 29.15 | | | | | | | | |
| | | | $d_2$ | = | 11.45 | | | | | |
| $r_3$ | = | 64.09 | | | | | | | | |
| | | | $d_3$ | = | 1.80 | $n_2$ | = | 1.69680 | $\nu_2$ | = 55.6 |
| $r_4$ | = | 26.71 | | | | | | | | |
| | | | $d_4$ | = | 2.80 | | | | | |
| $r_5$ | = | 39.26 non-spherical | | | | | | | | |
| | | | $d_5$ | = | 17.83 | $n_3$ | = | 1.62041 | $\nu_3$ | = 60.3 |
| $r_6$ | = | 292.59 | | | | | | | | |
| | | | $d_6$ | = | 0.1 | | | | | |
| $r_7$ | = | 23.04 | | | | | | | | |
| | | | $d_7$ | = | 0.99 | $n_4$ | = | 1.69680 | $\nu_4$ | = 55.6 |
| $r_8$ | = | 12.48 | | | | | | | | |
| | | | $d_8$ | = | 5.55 | | | | | |
| $r_9$ | = | −52.15 | | | | | | | | |
| | | | $d_9$ | = | 3.85 | $n_5$ | = | 1.77279 | $\nu_5$ | = 49.5 |
| $r_{10}$ | = | 20.60 | | | | | | | | |
| | | | $d_{10}$ | = | 11.98 | $n_6$ | = | 1.58900 | $\nu_6$ | = 48.6 |
| $r_{11}$ | = | −25.79 | | | | | | | | |
| | | | $d_{11}$ | = | 0.10 | | | | | |
| $r_{12}$ | = | 19.10 | | | | | | | | |
| | | | $d_{12}$ | = | 0.97 | $n_7$ | = | 1.67025 | $\nu_7$ | = 57.5 |
| $r_{13}$ | = | 9.93 | | | | | | | | |
| | | | $d_{13}$ | = | 2.29 | | | | | |
| $r_{14}$ | = | 13.27 | | | | | | | | |
| | | | $d_{14}$ | = | 8.68 | $n_8$ | = | 1.58065 | $\nu_8$ | = 37.1 |
| $r_{15}$ | = | ∞ | | | | | | | | |
| | | | $d_{15}$ | = | 1.09 | | | | | |
| $r_{16}$ | = | ∞ | | | | | | | | |
| | | | $d_{16}$ | = | 2.03 | $n_9$ | = | 1.58065 | $\nu_9$ | = 37.1 |
| $r_{17}$ | = | −16.27 | | | | | | | | |
| | | | $d_{17}$ | = | 3.19 | | | | | |
| $r_{18}$ | = | −14.20 | | | | | | | | |
| | | | $d_{18}$ | = | 3.10 | $n_{10}$ | = | 1.86074 | $\nu_{10}$ | = 23.1 |
| $r_{19}$ | = | 49.12 | | | | | | | | |
| | | | $d_{19}$ | = | 0.9 | | | | | |
| $r_{20}$ | = | −36.74 | | | | | | | | |
| | | | $d_{20}$ | = | 2.13 | $n_{11}$ | = | 1.51823 | $\nu_{11}$ | = 59.0 |
| $r_{21}$ | = | −11.71 | | | | | | | | |
| | | | $d_{21}$ | = | 0.10 | | | | | |
| $r_{22}$ | = | −130.69 | | | | | | | | |
| | | | $d_{22}$ | = | 2.16 | $n_{12}$ | = | 1.55671 | $\nu_{12}$ | = 58.5 |
| $r_{23}$ | = | −19.33 | | | | | | | | |

The non-spherical surface provides the fifth surface of the divergent optical system.

$C_4$ = 0.5134818 × 10$^{-5}$
$C_6$ = −0.3265215 × 10$^{-9}$
$C_8$ = 0.2642397 × 10$^{-19}$
$C_{10}$ = 0.3510403 × 10$^{-14}$

Factors of Non-sphericity

$K$ = 1.0
$C_2$ = 0.0

The Spherical Optical System (for comparison)
$f$=18.4 mm; F/4; Angle of view 100°; B.f.=37.52 mm.

| | | | | | | | | | | |
|---|---|---|---|---|---|---|---|---|---|---|
| $r_1$ | = | 42.0 | | | | | | | | |
| | | | $d_1$ | = | 2.0 | $n_1$ | = | 1.69680 | $\nu_1$ | = 55.6 |
| $r_2$ | = | 27.9 | | | | | | | | |
| | | | $d_2$ | = | 4.5 | | | | | |
| $r_3$ | = | 37.8 | | | | | | | | |
| | | | $d_3$ | = | 1.8 | $n_2$ | = | 1.69680 | $\nu_2$ | = 55.6 |
| $r_4$ | = | 25.5 | | | | | | | | |
| | | | $d_4$ | = | 4.5 | | | | | |
| $r_5$ | = | 40.0 | | | | | | | | |
| | | | $d_5$ | = | 5.0 | $n_3$ | = | 1.62041 | $\nu_3$ | = 60.3 |
| $r_6$ | = | 250.00 | | | | | | | | |
| | | | $d_6$ | = | 0.1 | | | | | |
| $r_7$ | = | 24.6 | | | | | | | | |
| | | | $d_7$ | = | 1.0 | $n_4$ | = | 1.69680 | $\nu_4$ | = 55.6 |
| $r_8$ | = | 12.4 | | | | | | | | |
| | | | $d_8$ | = | 7.0 | | | | | |
| $r_9$ | = | −200.0 | | | | | | | | |
| | | | $d_9$ | = | 2.0 | $n_5$ | = | 1.77279 | $\nu_5$ | = 49.5 |
| $r_{10}$ | = | 12.3 | | | | | | | | |
| | | | $d_{10}$ | = | 12.0 | $n_6$ | = | 1.58900 | $\nu_6$ | = 48.6 |
| $r_{11}$ | = | −28.0 | | | | | | | | |
| | | | $d_{11}$ | = | 0.1 | | | | | |
| $r_{12}$ | = | 23.8 | | | | | | | | |
| | | | $d_{12}$ | = | 1.0 | $n_7$ | = | 1.67025 | $\nu_7$ | = 57.5 |
| $r_{13}$ | = | 10.1 | | | | | | | | |
| | | | $d_{13}$ | = | 2.6 | | | | | |
| $r_{14}$ | = | 16.3 | | | | | | | | |
| | | | $d_{14}$ | = | 5.95 | $n_8$ | = | 1.58065 | $\nu_8$ | = 37.1 |
| $r_{15}$ | = | ∞ | | | | | | | | |
| | | | $d_{15}$ | = | 1.5 | | | | | |
| $r_{16}$ | = | ∞ | | | | | | | | |
| | | | $d_{16}$ | = | 2.0 | $n_9$ | = | 1.58065 | $\nu_9$ | = 37.1 |
| $r_{17}$ | = | −14.3 | | | | | | | | |

—Continued

| | | | | | | |
|---|---|---|---|---|---|---|
| $r_{18}=$ | -14.6 | $d_{17}=$ | 4.6 | | | |
| $r_{19}=$ | 50.7 | $d_{18}=$ | 3.1 | $n_{10}=$ 1.86074 | $\nu_{10}=$ | 23.1 |
| $r_{20}=$ | -38.5 | $d_{19}=$ | 0.9 | | | |
| $r_{21}=$ | -11.8 | $d_{20}=$ | 2.5 | $n_{11}=$ 1.51823 | $\nu_{11}=$ | 59.0 |
| $r_{22}=$ | -550.0 | $d_{21}=$ | 0.1 | | | |
| $r_{23}=$ | -19.337 | $d_{22}=$ | 8.5 | $n_{12}=$ 1.55671 | $\nu_{12}=$ | 58.5 |

Seidel Coefficients

| | | | | | |
|---|---|---|---|---|---|
| $r_1$ | 0.010 | 0.009 | 0.008 | 0.089 | 0.089 |
| $r_2$ | -0.077 | 0.001 | -0.000 | -0.135 | 0.002 |
| $r_3$ | 0.044 | 0.021 | 0.010 | 0.099 | 0.052 |
| $r_4$ | -0.200 | 0.007 | -0.000 | -0.148 | 0.005 |
| $r_5$ | 0.106 | 0.039 | 0.014 | 0.088 | 0.038 |
| $r_6$ | -0.000 | -0.002 | -0.018 | -0.014 | -0.218 |
| $r_7$ | 0.088 | 0.040 | 0.018 | 0.153 | 0.077 |
| $r_8$ | -1.889 | 0.317 | -0.053 | -0.304 | 0.060 |
| $r_9$ | 0.051 | 0.069 | 0.093 | 0.020 | 0.098 |
| $r_{10}$ | -2.292 | 0.250 | -0.027 | -0.048 | 0.008 |
| $r_{11}$ | 0.027 | -0.023 | 0.019 | 0.121 | -0.117 |
| $r_{12}$ | 1.441 | 0.319 | 0.070 | 0.155 | 0.049 |
| $r_{13}$ | -34.441 | -0.745 | -0.016 | -0.365 | -0.008 |
| $r_{14}$ | 20.419 | 1.562 | 0.119 | 0.207 | 0.025 |
| $r_{15}$ | -0.014 | -0.024 | -0.042 | 0.000 | -0.072 |
| $r_{16}$ | 0.014 | 0.025 | 0.043 | 0.000 | 0.073 |
| $r_{17}$ | 21.462 | -2.034 | 0.192 | 0.236 | -0.040 |
| $r_{18}$ | -14.997 | 1.000 | -0.066 | -0.291 | 0.023 |
| $r_{19}$ | -3.212 | -1.363 | -0.578 | -0.083 | -0.281 |
| $r_{20}$ | 0.045 | 0.083 | 0.152 | -0.081 | 0.129 |
| $r_{21}$ | 6.605 | 0.038 | 0.000 | 0.266 | 0.001 |
| $r_{22}$ | 0.000 | -0.000 | -0.002 | -0.005 | 0.072 |
| $r_{23}$ | 9.108 | 0.661 | 0.048 | 0.170 | 0.015 |
| $\Sigma$ | 2.299 | 0.253 | -0.010 | 0.088 | 0.087 |

Figure 24:
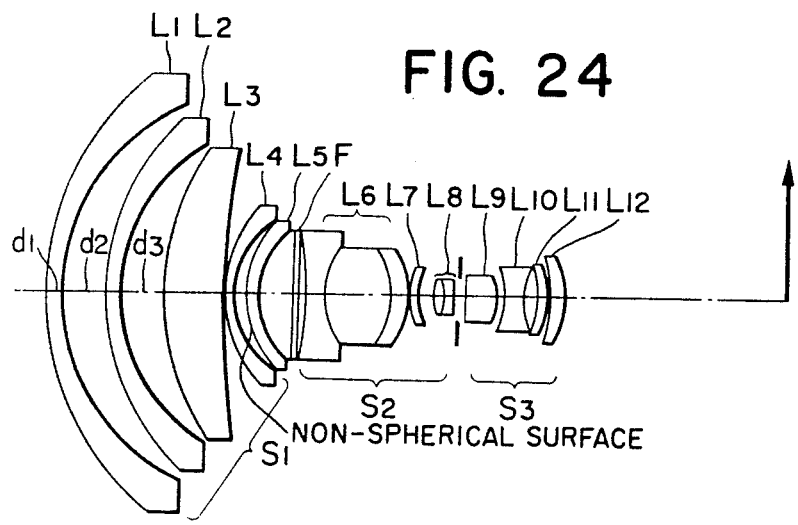
FIG. 24 is a longitudinal section of the lens arrangement according to Example 14 of the present invention.
Figure 25A:
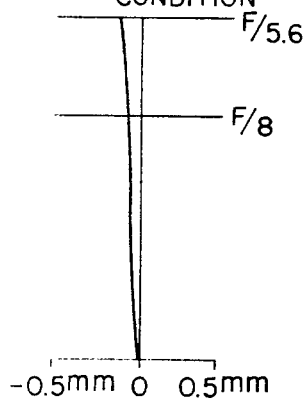
FIGS. 25A, 25B, 25C and 25D graphically illustrate aberrations therein.
Figure 25B:
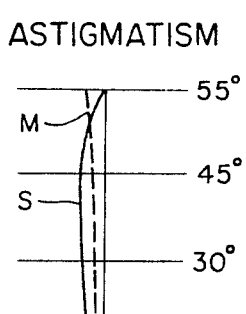
Figure 25C:
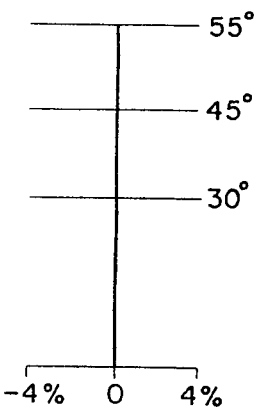
Figure 25D:
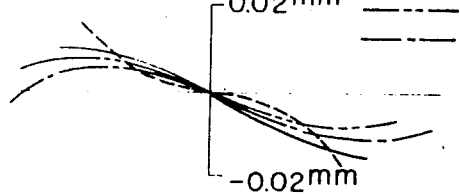

FIG. 24 shows an embodiment of the inverted telephototype lens system in which the first lens surface of the forward divergent group is non-spherical and which has a focal length 15.3 mm, a relative aperture F/5.6 and an angle of view 110°. In this lens system, first and second negative meniscus lenses L1 and L2, third positive meniscus lens L3, and fourth and fifth negative meniscus lenses L4 and L5 together constitute a forward divergent group S1; sixth cemented composite positive lens L6, seventh negative meniscus lens L7 and eighth positive lens L8 together constitute a forward convergent group S2 preceding the diaphragm; and a rearward convergent group S3 succeeding the diphragm is constituted by a ninth positive lens L9, a tenth negative lens L10, and eleventh and twelfth positive lenses L11 and L12.

Again in this embodiment, distortion is almost fully eliminated and spherical aberration, coma and astigmatism are also well corrected (see FIGS. 25 A-D). Moreover, the back-focus is sufficiently longer than in the spherical optical system of the same type.

The elimination of distortion by the use of a non-spherical surface usually accompanies an increase in astigmatism as described above, but this may be avoided by adopting the following condition in the present embodiment.

$$4.0f > d_5 \; 30 \; d_{13+14+15} + d_{19+20} > 1.8f \qquad (VII)$$

where $d_5$, $d_{13+14+15}$ and $d_{19+20}$ represent the center thicknesses of the lens L3, L6 and L8, and $f$ represents the total focal length.

This condition is useful to increase the thicknesses of the lenses L3, L6 and L8 positioned forwardly of the diaphragm and accordingly, increase the length of the optical path, thereby correcting the curvature of astigmatism and flatten the image plane. Such an increase in the thickness of the lenses L3, L6, L8 is highly effective to provide an improved flatness of the image plane. Instead of the positive lenses L3, L6 and L8, the negative meniscus lenses L1, L2, L4 and L5 may be increased in thickness, but with a less successful result. It has never been thought before that the thicknesses of the positive lenses L3, L6 and L8 can be greatly increased as by the condition (VII).

Incidentally, the numerical values for the condition (VII) in the above-described embodiment and the numerical data of the spherical system are given below for comparison.

| Example | 14 | Spherical system |
|---|---|---|
| $d_5$ | 11.46 | 8.2 |
| $d_{13+14+15}$ | 18.50 | 12.8 |
| $d_{19+20}$ | 4.14 | 4.4 |
| $d_5 + d_{13+14+15} + d_{19+20}$ | | |
| $(d_5 + d_{13+14+15} + d_{19+20})/f$ | 2.225 | 1.660 |

Example 14

$f$=15.3 mm; F/5.6; Angle of view 110°; B.F.=38.24 mm.

| | | | | | | |
|---|---|---|---|---|---|---|
| $r_1 =$ | 47.21 | $d_1 =$ | 3.10 | $n_1 =$ 1.77279 | $\nu_1 =$ | 49.5 |
| $r_2 =$ | 32.00 | $d_2 =$ | 7.57 | | | |
| $r_3 =$ | 40.24 | $d_3 =$ | 2.40 | $n_2 =$ 1.69680 | $\nu_2 =$ | 55.6 |
| $r_4 =$ | 29.04 | $d_4 =$ | 6.95 | | | |
| $r_5 =$ | 44.00 | $d_5 =$ | 11.46 | $n_3 =$ 1.69350 | $\nu_3 =$ | 53.5 |
| $r_6 =$ | 219.20 | $d_6 =$ | 0.10 | | | |
| $r_7 =$ | 22.11 | $d_7 =$ | 1.10 | $n_4 =$ 1.78798 | $\nu_4 =$ | 47.5 |
| $r_8 =$ | 14.46 | $d_8 =$ | 2.79 non-spherical | | | |
| $r_9 =$ | 19.78 | $d_9 =$ | 1.00 | $n_5 =$ 1.713 | $\nu_5 =$ | 53.9 |

Example 14—Continued

| | | | | | | | |
|---|---|---|---|---|---|---|---|
| $r_{10}=$ | 13.79 | | | | | | |
| | | $d_{10}=$ | 6.04 | | | | |
| $r_{11}=$ | ∞ | | | | | | |
| | | $d_{11}=$ | 1.20 | $n_6=$ | 1.51743 | $\nu_6=$ | filter |
| $r_{12}=$ | ∞ | | | | | | |
| | | $d_{12}=$ | 0.60 | | | | |
| $r_{13}=$ | −217.70 | | | | | | |
| | | $d_{13}=$ | 3.32 | $n_7=$ | 1.84110 | $\nu_7=$ | 43.3 |
| $r_{14}=$ | 13.78 | | | | | | |
| | | $d_{14}=$ | 11.48 | $n_8=$ | 1.54814 | $\nu_8=$ | 45.9 |
| $r_{15}=$ | −11.32 | | | | | | |
| | | $d_{15}=$ | 3.69 | $n_9=$ | 1.53996 | $\nu_9=$ | 59.7 |
| $r_{16}=$ | −19.76 | | | | | | |
| | | $d_{16}=$ | 0.10 | | | | |
| $r_{17}=$ | 19.09 | | | | | | |
| | | $d_{17}=$ | 0.99 | $n_{10}=$ | 1.69680 | $\nu_{10}=$ | 55.6 |
| $r_{18}=$ | 8.54 | | | | | | |
| | | $d_{18}=$ | 2.65 | | | | |
| $r_{19}=$ | 13.34 | | | | | | |
| | | $d_{19}=$ | 2.16 | $n_{11}=$ | 1.59507 | $\nu_{11}=$ | 35.6 |
| $r_{20}=$ | −7.32 | | | | | | |
| | | $d_{20}=$ | 1.98 | $n_{12}=$ | 1.59181 | $\nu_{12}=$ | 58.2 |
| $r_{21}=$ | ∞ | | | | | | |
| | | $d_{21}=$ | 0.73 | | | | |
| $r_{22}=$ | ∞ | | | | | | |
| | | $d_{22}=$ | 6.29 | $n_{13}=$ | 1.59551 | $\nu_{13}=$ | 39.2 |
| $r_{23}=$ | −12.25 | | | | | | |
| | | $d_{23}=$ | 1.09 | | | | |
| $r_{24}=$ | −13.71 | | | | | | |
| | | $d_{24}=$ | 4.85 | $n_{14}=$ | 1.86074 | $\nu_{14}=$ | 23.1 |
| $r_{25}=$ | 38.51 | | | | | | |
| | | $d_{25}=$ | 0.70 | | | | |
| $r_{26}=$ | −35.32 | | | | | | |
| | | $d_{26}=$ | 2.41 | $n_{15}=$ | 1.4645 | $\nu_{15}=$ | 65.8 |
| $r_{27}=$ | −10.99 | | | | | | |
| | | $d_{27}=$ | 0.10 | | | | |
| $r_{28}=$ | 375.00 | | | | | | |
| | | $d_{28}=$ | 2.60 | $n_{16}=$ | 1.51835 | $\nu_{16}=$ | 60.3 |
| $r_{29}=$ | −21.32 | | | | | | |

The non-spherical surface provides the ninth surface.

Factors of Non-sphericity

$K = 1.0$
$C_2 = 0.0$
$C_4 = 0.1558281 \times 10^{-4}$
$C_6 = -0.5578871 \times 10^{-7}$
$C_8 = 0.4223284 \times 10^{-9}$
$C_{10} = -0.4447351 \times 10^{-14}$ The above factors are those related to the equation (IV) representing the non-spherical surface.

The Spherical System (for comparison)

$f=15.3$ mm; $F/5.6$; Angle of view 110°; $B.f.=39.87$ mm.

| | | | | | | | |
|---|---|---|---|---|---|---|---|
| $r_1=$ | 46.90 | | | | | | |
| | | $d_1=$ | 3.10 | $n_1=$ | 1.77279 | $\nu_1=$ | 49.5 |
| $r_2=$ | 32.00 | | | | | | |
| | | $d_2=$ | 8.00 | | | | |
| $r_3=$ | 40.72 | | | | | | |
| | | $d_3=$ | 2.40 | $n_2=$ | 1.69680 | $\nu_2=$ | 55.6 |
| $r_4=$ | 29.04 | | | | | | |
| | | $d_4=$ | 6.50 | | | | |
| $r_5=$ | 44.00 | | | | | | |
| | | $d_5=$ | 8.20 | $n_3=$ | 1.69350 | $\nu_3=$ | 53.5 |
| $r_6=$ | 330.00 | | | | | | |
| | | $d_6=$ | 0.10 | | | | |
| $r_7=$ | 23.50 | | | | | | |
| | | $d_7=$ | 1.10 | $n_4=$ | 1.78798 | $\nu_4=$ | 47.5 |
| $r_8=$ | 14.46 | | | | | | |
| | | $d_8=$ | 3.00 | | | | |
| $r_9=$ | 19.10 | | | | | | |
| | | $d_9=$ | 1.00 | $n_5=$ | 1.71300 | $\nu_5=$ | 53.9 |
| $r_{10}=$ | 12.80 | | | | | | |
| | | $d_{10}=$ | 6.50 | | | | |
| $r_{11}=$ | ∞ | | | | | | |
| | | $d_{11}=$ | 1.20 | $n_6=$ | 1.51743 | $\nu_6=$ | filter |
| $r_{12}=$ | ∞ | | | | | | |
| | | $d_{12}=$ | 0.70 | | | | |
| $r_{13}=$ | −195.00 | | | | | | |
| | | $d_{13}=$ | 0.80 | $n_7=$ | 1.84110 | $\nu_7=$ | 43.3 |
| $r_{14}=$ | 13.10 | | | | | | |
| | | $d_{14}=$ | 10.00 | $n_8=$ | 1.54814 | $\nu_8=$ | 45.9 |
| $r_{15}=$ | −12.50 | | | | | | |
| | | $d_{15}=$ | 2.00 | $n_9=$ | 1.53996 | $\nu_9=$ | 59.7 |
| $r_{16}=$ | −18.70 | | | | | | |
| | | $d_{16}=$ | 0.10 | | | | |
| $r_{17}=$ | 20.40 | | | | | | |
| | | $d_{17}=$ | 0.80 | $n_{10}=$ | 1.69680 | $\nu_{10}=$ | 55.6 |
| $r_{18}=$ | 8.83 | | | | | | |
| | | $d_{18}=$ | 2.50 | | | | |
| $r_{19}=$ | 13.25 | | | | | | |
| | | $d_{19}=$ | 2.30 | $n_{11}=$ | 1.59507 | $\nu_{11}=$ | 35.6 |

−Continued

| | | | | | | | |
|---|---|---|---|---|---|---|---|
| $r_{20}=$ | −12.50 | | | | | | |
| | | $d_{20}=$ | 2.10 | $n_{12}=$ | 1.59181 | $\nu_{12}=$ | 58.2 |
| $r_{21}=$ | ∞ | | | | | | |
| | | $d_{21}=$ | 1.60 | | | | |
| $r_{22}=$ | ∞ | | | | | | |
| | | $d_{22}=$ | 5.70 | $n_{13}=$ | 1.59551 | $\nu_{13}=$ | 39.2 |
| $r_{23}=$ | −11.96 | | | | | | |
| | | $d_{23}=$ | 1.00 | | | | |
| $r_{24}=$ | −13.23 | | | | | | |
| | | $d_{24}=$ | 1.80 | $n_{14}=$ | 1.86074 | $\nu_{14}=$ | 23.1 |
| $r_{25}=$ | 35.70 | | | | | | |
| | | $d_{25}=$ | 0.70 | | | | |
| $r_{26}=$ | −62.80 | | | | | | |
| | | $d_{26}=$ | 2.70 | $n_{15}=$ | 1.46450 | $\nu_{15}=$ | 65.8 |
| $r_{27}=$ | −10.81 | | | | | | |
| | | $d_{27}=$ | 0.10 | | | | |
| $r_{28}=$ | 375.00 | | | | | | |
| | | $d_{28}=$ | 5.70 | $n_{16}=$ | 1.51835 | $\nu_{16}=$ | 60.3 |
| $r_{29}=$ | −22.11 | | | | | | |

Figure 26:
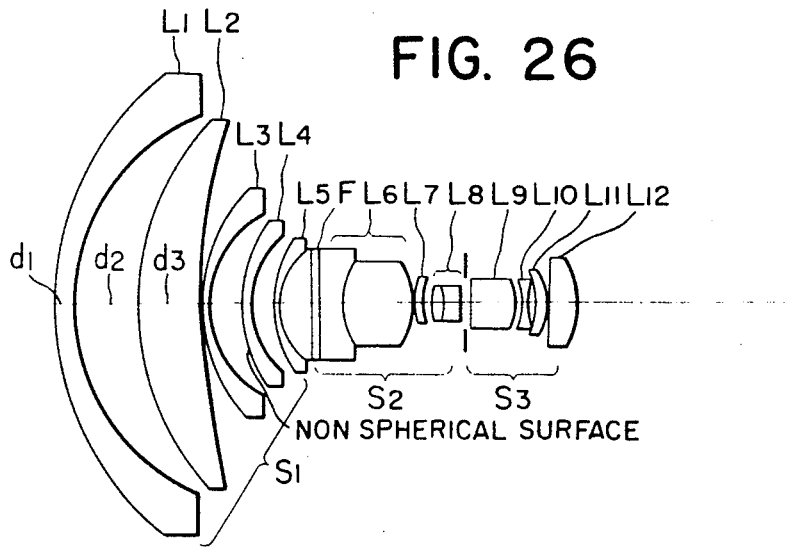
FIG. 26 is a longitudinal section of the lens arrangement according to Example 15 of the present invention.
Figure 27A:
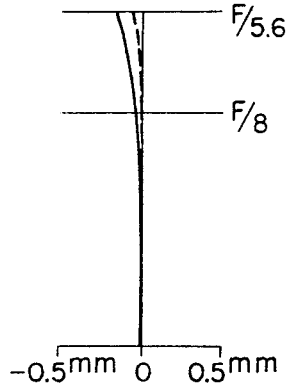
FIGS. 27A, 27B, 27C and 27D show graphs of aberrations therein.
Figure 27B:
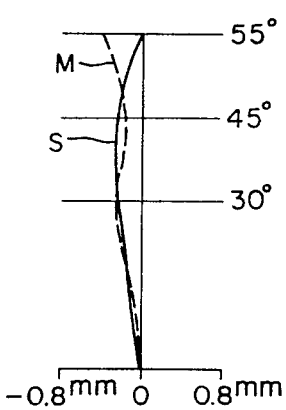
Figure 27C:
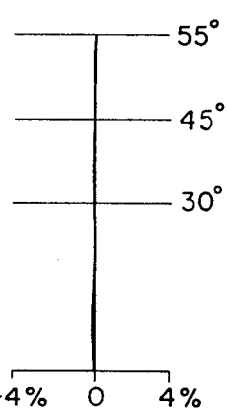
Figure 27D:
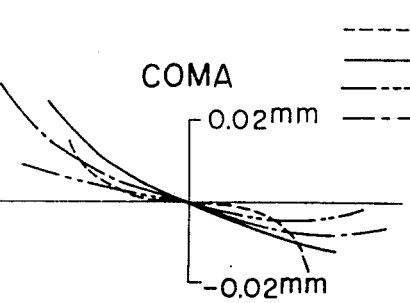

FIG. 26 shows an embodiment of the inverted telephoto-type lens system in which the seventh lens surface of the forward divergent group is non-spherical and which has a focal length 15.3 mm, a relative aperture F/5.6, an angle of view 110° and B.f.=38.33 mm. In this lens system, a first negative meniscus lens L1, a second positive meniscus lens L2, third, fourth and fifth negative meniscus lenses L3, L4 and L5 together constitute a forward divergent group S1; a sixth cemented composite positive lens L6, a seventh negative meniscus lens L7, and an eighth positive lens L8 together constitute a forward convergent group S2 preceding the diaphragm; and a ninth positive lens L9, a tenth negative lens L10, and eleventh and twelfth positive lens L11 and L12 together constitute a rearward convergent group S3 succeeding the diaphragm.

For the embodiment shown in FIG. 26, the following condition is provided:

$$4.1f > d_3 + d_{13+14} + d_{18+19} > 1.9f \quad \text{(VIII)}$$

where $d_3$, $d_{13+14}$ and $d_{18+19}$ represent the center thicknesses of the lenses L2, L6 and L8, and $f$ represents the total focal length.

Condition (VIII) is useful to increase the thicknesses of the lenses L2, L6 and L8 positioned forwardly of the diaphragm and accordingly, increase the length of the optical path, thereby correcting the curvature of astigmatism and flatten the image plane.

Such an increase in the thickness of the lens L2, L6 and L8 is highly effective to improve the flatness of the image plane. Instead of the positive lenses L2, L6 and L8, the negative meniscus lenses L1, L3, L4 and L5 may be increased in thickness, but with a less successful result. It has never been though before that the thickness of the convex lenses L2, L6 and L8 can be so much increased, and this makes the feature of the present invention.

The numerical values for condition (VIII) in the above-described embodiment and the numerical data of the spherical system are given below for comparison.

| Example | 15 | Spherical system |
|---|---|---|
| $d_3$ | 11.05 | 9.5 |
| $d_{13} + d_{14}$ | 17.61 | 12.8 |
| $d_{18} + d_{19}$ | 5.70 | 4.1 |
| $d_3 + d_{13+14} + d_{18+19}$ | 34.36 | 26.4 |
| $(d_3 + d_{13+14} + d_{18+19})/f$ | 2.242 | 1.726 |

The numerical values for the above example are shown below.

Example 15

$f$=15.3 mm; $f$/5.6; Angle of view 110°; $Bf$=38.83.

| | | | | | | | | | |
|---|---|---|---|---|---|---|---|---|---|
| $r_1$ | = | 48.15 | | | | | | | |
| | | | $d_1$ | = | 3.10 | $n_1$ | = 1.78764 | $\nu_1$ | = 47.5 |
| $r_2$ | = | 35.38 | | | | | | | |
| | | | $d_2$ | = | 11.98 | | | | |
| $r_3$ | = | 46.24 | | | | | | | |
| | | | $d_3$ | = | 11.05 | $n_2$ | = 1.71341 | $\nu_2$ | = 53.9 |
| $r_4$ | = | 95.20 | | | | | | | |
| | | | $d_4$ | = | 0.10 | | | | |
| $r_5$ | = | 28.00 | | | | | | | |
| | | | $d_5$ | = | 1.00 | $n_3$ | = 1.69320 | $\nu_3$ | = 53.5 |
| $r_6$ | = | 17.03 | | | | | | | |
| | | | $d_6$ | = | 6.86 | | | | |
| $r_7$ | = | 23.47 non-spherical | | | | | | | |
| | | | $d_7$ | = | 1.00 | $n_4$ | = 1.69320 | $\nu_4$ | = 53.5 |
| $r_8$ | = | 15.36 | | | | | | | |
| | | | $d_8$ | = | 4.35 | | | | |
| $r_9$ | = | 19.61 | | | | | | | |
| | | | $d_9$ | = | 1.00 | $n_5$ | = 1.69684 | $\nu_5$ | = 55.6 |
| $r_{10}$ | = | 10.88 | | | | | | | |
| | | | $d_{10}$ | = | 5.20 | | | | |
| $r_{11}$ | = | ∞ | | | | | | | |
| | | | $d_{11}$ | = | 1.20 | $n_6$ | = 1.51743 | $\nu_6$ | = filter |
| $r_{12}$ | = | ∞ | | | | | | | |
| | | | $d_{12}$ | = | 0.28 | | | | |
| $r_{13}$ | = | 146.11 | | | | | | | |
| | | | $d_{13}$ | = | 4.09 | $n_7$ | = 1.84131 | $\nu_7$ | = 43.3 |

Example 15 — Continued

| | | | | | | | | | |
|---|---|---|---|---|---|---|---|---|---|
| $r_{14}$ | = | 15.14 | $d_{14}$ | = | 13.52 | $n_8$ | = | 1.54800 | $\nu_8$ = 45.9 |
| $r_{15}$ | = | −16.21 | $d_{15}$ | = | 0.10 | | | | |
| $r_{16}$ | = | 21.40 | $d_{16}$ | = | 1.00 | $n_9$ | = | 1.69684 | $\nu_9$ = 55.6 |
| $r_{17}$ | = | 8.64 | $d_{17}$ | = | 1.79 | | | | |
| $r_{18}$ | = | 13.21 | $d_{18}$ | = | 2.64 | $n_{10}$ | = | 1.59483 | $\nu_{10}$ = 35.6 |
| $r_{19}$ | = | −4.60 | $d_{19}$ | = | 3.06 | $n_{11}$ | = | 1.59160 | $\nu_{11}$ = 58.2 |
| $r_{20}$ | = | ∞ | $d_{20}$ | = | 0.48 | | | | |
| $r_{21}$ | = | ∞ | $d_{21}$ | = | 8.88 | $n_{12}$ | = | 1.59508 | $\nu_{12}$ = 35.6 |
| $r_{22}$ | = | −11.38 | $d_{22}$ | = | 1.03 | | | | |
| $r_{23}$ | = | −13.34 | $d_{23}$ | = | 0.89 | $n_{13}$ | = | 1.86142 | $\nu_{13}$ = 23.1 |
| $r_{24}$ | = | 37.64 | $d_{24}$ | = | 0.60 | | | | |
| $r_{25}$ | = | −45.14 | $d_{25}$ | = | 2.56 | $n_{14}$ | = | 1.44772 | $\nu_{14}$ = 67.2 |
| $r_{26}$ | = | −10.86 | $d_{26}$ | = | 0.10 | | | | |
| $r_{27}$ | = | 1684.83 | $d_{27}$ | = | 5.62 | $n_{15}$ | = | 1.50976 | $\nu_{15}$ = 63.4 |
| $r_{28}$ | = | −22.85 | | | | | | | |

The non-spherical surface provides the seventh surface.

Factors of Non-sphericity $K = 1.0$
$C_2 = 0.0$
$C_4 = 0.8959432 \times 10^{-5}$
$C_6 = -0.1565319 \times 10^{-8}$
$C_8 = 0.8809370 \times 10^{-11}$
$C_{10} = -0.7151907 \times 10^{-16}$ These factors are those related to the equation (IV) representing the non-spherical surface.

Spherical Optical System (for comparison)

$f = 15.3$ mm; $F/5.6$; Angle of view 110°; $B.f. = 38.77$ mm.

| | | | | | | | | | |
|---|---|---|---|---|---|---|---|---|---|
| $r_1$ | = | 48.15 | $d_1$ | = | 3.10 | $n_1$ | = | 1.78764 | $\nu_1$ = 47.5 |
| $r_2$ | = | 32.80 | $d_2$ | = | 10.30 | | | | |
| $r_3$ | = | 46.24 | $d_3$ | = | 9.50 | $n_2$ | = | 1.71341 | $\nu_2$ = 53.9 |
| $r_4$ | = | 138.86 | $d_4$ | = | 0.10 | | | | |
| $r_5$ | = | 28.00 | $d_5$ | = | 1.00 | $n_3$ | = | 1.69320 | $\nu_3$ = 53.5 |
| $r_6$ | = | 17.30 | $d_6$ | = | 4.40 | | | | |
| $r_7$ | = | 22.90 | $d_7$ | = | 1.00 | $n_4$ | = | 1.69320 | $\nu_4$ = 53.5 |
| $r_8$ | = | 14.29 | $d_8$ | = | 3.20 | | | | |
| $r_9$ | = | 18.70 | $d_9$ | = | 1.00 | $n_5$ | = | 1.69684 | $\nu_5$ = 55.6 |
| $r_{10}$ | = | 12.87 | $d_{10}$ | = | 6.30 | | | | |
| $r_{11}$ | = | 28 | $d_{11}$ | = | 1.20 | $n_6$ | = | 1.51743 | $\nu_6$ = filter |
| $r_{12}$ | = | ∞ | $d_{12}$ | = | 0.70 | | | | |
| $r_{13}$ | = | −449.32 | $d_{13}$ | = | 0.80 | $n_7$ | = | 1.84131 | $\nu_7$ = 43.3 |
| $r_{14}$ | = | 13.67 | $d_{14}$ | = | 12.00 | $n_8$ | = | 1.54800 | $\nu_8$ = 45.9 |
| $r_{15}$ | = | −19.10 | $d_{15}$ | = | 0.10 | | | | |
| $r_{16}$ | = | 20.31 | $d_{16}$ | = | 0.80 | $n_9$ | = | 1.69684 | $\nu_9$ = 55.6 |
| $r_{17}$ | = | 8.88 | $d_{17}$ | = | 2.50 | | | | |
| $r_{18}$ | = | 13.40 | $d_{18}$ | = | 2.80 | $n_{10}$ | = | 1.59483 | $\nu_{10}$ = 35.6 |
| $r_{19}$ | = | −12.50 | $d_{19}$ | = | 1.30 | $n_{11}$ | = | 1.59160 | $\nu_{11}$ = 58.2 |
| $r_{20}$ | = | ∞ | $d_{20}$ | = | 1.60 | | | | |
| $r_{21}$ | = | ∞ | $d_{21}$ | = | 6.10 | $n_{12}$ | = | 1.59508 | $\nu_{12}$ = 35.6 |
| $r_{22}$ | = | −11.96 | $d_{22}$ | = | 0.90 | | | | |
| $r_{23}$ | = | 13.40 | $d_{23}$ | = | 1.80 | $n_{13}$ | = | 1.86142 | $\nu_{13}$ = 23.1 |
| $r_{24}$ | = | 34.50 | | | | | | | |

-Continued

| | | | | | | | | |
|---|---|---|---|---|---|---|---|---|
| $r_{25}$ | = | -190.05 | | | | | | |
| | | | $d_{25}$ | = | 2.50 | $n_{14}$ = 1.44772 | $\nu_{14}$ | = 67.2 |
| $r_{26}$ | = | -10.86 | | | | | | |
| | | | $d_{26}$ | = | 0.10 | | | |
| $r_{27}$ | = | 315.50 | | | | | | |
| | | | $d_{27}$ | = | 5.70 | $n_{15}$ = 1.50976 | $\nu_{15}$ | = 63.4 |
| $r_{28}$ | = | -23.86 | | | | | | |

Figure 28:
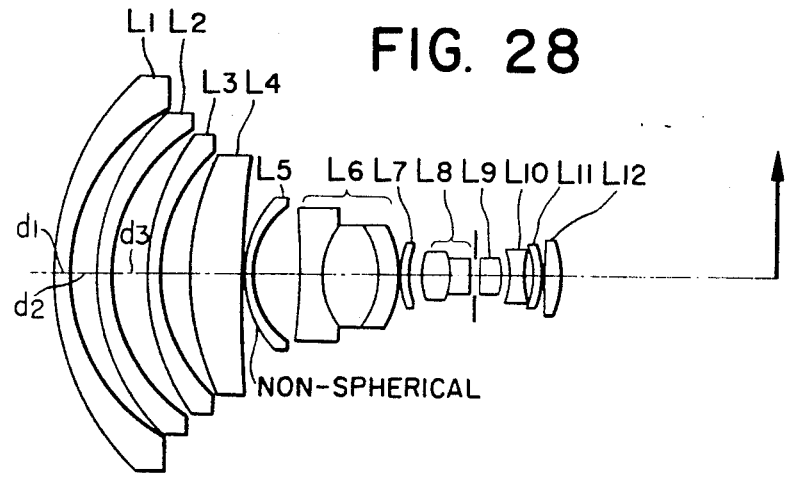
FIG. 28 is a longitudinal section of the lens arrangement according to Example 16 of the present invention.
Figure 29A:
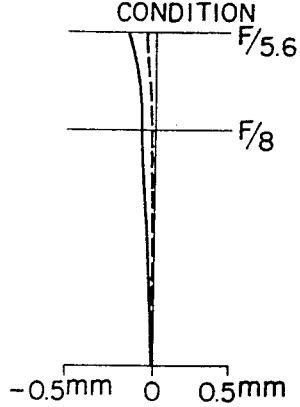
FIGS. 29A, 29B, 29C and 29D graphically illustrate aberrations therein.
Figure 29B:
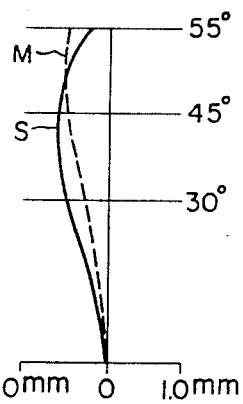
Figure 29C:
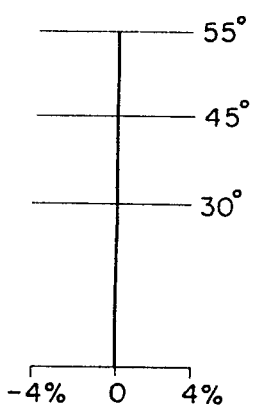
Figure 29D:
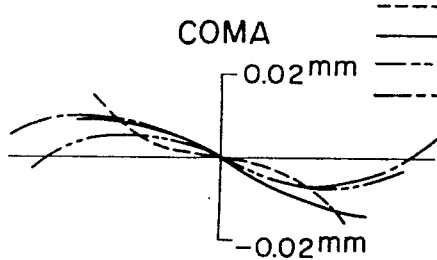

FIG. 28 shows an embodiment of the inverted telephoto-type lens system in which the ninth surface of the forward divergent group is non-spherical and which has a focal length 15.3 mm, a relative aperture F/5.6, an angle of view 110° and a back-focus of 38.058 mm. In the present system, first, second and third negative meniscus lenses L1, L2 and L3, a fourth positive meniscus lens L4 and a fifth negative meniscus lens L5 together constitute a forward divergent group S1; a sixth cemented composite positive lens L6, a seventh negative meniscus lens L7 and an eighth positive lens L8 together constitute a forward convergent group s2 preceding the diaphragm; and a ninth positive lens L9, a tenth negative lens L10, and eleventh and twelfth positive lenses L11 and L12 together constitute a rearward convergent group S3 succeeding the diaphragm (see FIGS. 29A–D).

For this embodiment, the following condition is provided to eliminate the curvature of astigmatism.

$$4.2f > d_7 + d_{11+12+13} + d_{17+18} > 2.0f$$

where $d_7$, $d_{11 + 12 + 13}$ and $d_{17 + 18}$ represent the center thicknesses of the lenses L4, L6 and L8, and $f$ represents the total focal length.

Condition (IX) serves to increase the thicknesses of the lenses L4, L6 and L8 positioned forwardly of the diaphragm and accordingly, increase the length of the optical path, thus correcting the curvature of astigmatism and flattening the image plane.

Such an increase in the thickness of the lenses L4, L6, L8 is highly effective to improve the flatness of the image plane.

Instead of the positive lenses L4, L6 and L8, the negative meniscus lenses L1, L2 and L3 may be increased in thickness, but with a less successful result. Such a great increase in the thickness of the lens L4, L6, L8, as provided by condition (IX), has never been conceivable heretofore.

The numerical values for condition (IX) in Example 16 are shown below.

| Example | 16 |
|---|---|
| $d_7$ | 9.36 |
| $d_{11+12+13}$ | 18.68 |
| $d_{17+18}$ | 8.51 |
| $d_7 + d_{11+12+13} + d_{17+18}$ | 36.55 |
| $(d_7 + d_{11+12+13} + d_{17+18})/f$ | 2.390 |

Various specific numerical values are given below:

Example 16

$f$=15.3 mm; F/5.6; Angle of view 110°; B.f.=38.058 mm.

| | | | | | | | | | | |
|---|---|---|---|---|---|---|---|---|---|---|
| $r_1$ | = | 47.21 | | | | | | | | |
| | | | $d_1$ | = | 3.10 | $n_1$ | = | 1.77279 | $\nu_1$ | = 49.5 |
| $r_2$ | = | 32.00 | | | | | | | | |
| | | | $d_2$ | = | 4.80 | | | | | |
| $r_3$ | = | 37.80 | | | | | | | | |
| | | | $d_3$ | = | 2.40 | $n_2$ | = | 1.69680 | $\nu_2$ | = 55.6 |
| $r_4$ | = | 29.04 | | | | | | | | |
| | | | $d_4$ | = | 6.59 | | | | | |
| $r_5$ | = | 44.00 | | | | | | | | |
| | | | $d_5$ | = | 2.00 | $n_3$ | = | 1.6935 | $\nu_3$ | = 53.5 |
| $r_6$ | = | 30.00 | | | | | | | | |
| | | | $d_6$ | = | 5.38 | | | | | |
| $r_7$ | = | 55.00 | | | | | | | | |
| | | | $d_7$ | = | 9.36 | $n_4$ | = | 1.6935 | $\nu_4$ | = 53.5 |
| $r_8$ | = | 372.31 | | | | | | | | |
| | | | $d_8$ | = | 0.10 | | | | | |
| $r_9$ | = | 20.99 non-spherical | | | | | | | | |
| | | | $d_9$ | = | 1.00 | $n_5$ | = | 1.713 | $\nu_5$ | = 53.9 |
| $r_{10}$ | = | 13.79 | | | | | | | | |
| | | | $d_{10}$ | = | 8.49 | | | | | |
| $r_{11}$ | = | -151.20 | | | | | | | | |
| | | | $d_{11}$ | = | 4.42 | $n_6$ | = | 1.8411 | $\nu_6$ | = 43.3 |
| $r_{12}$ | = | 15.61 | | | | | | | | |
| | | | $d_{12}$ | = | 10.58 | $n_7$ | = | 1.54814 | $\nu_7$ | = 45.9 |
| $r_{13}$ | = | -11.32 | | | | | | | | |
| | | | $d_{13}$ | = | 3.69 | $n_8$ | = | 1.53996 | $\nu_8$ | = 59.7 |
| $r_{14}$ | = | -22.89 | | | | | | | | |
| | | | $d_{14}$ | = | 0.10 | | | | | |
| $r_{15}$ | = | 19.09 | | | | | | | | |
| | | | $d_{15}$ | = | 0.99 | $n_9$ | = | 1.6968 | $\nu_9$ | = 55.6 |
| $r_{16}$ | = | 8.54 | | | | | | | | |
| | | | $d_{16}$ | = | 2.65 | | | | | |
| $r_{17}$ | = | 13.66 | | | | | | | | |
| | | | $d_{17}$ | = | 5.18 | $n_{10}$ | = | 1.59507 | $\nu_{10}$ | = 35.6 |
| $r_{18}$ | = | -7.32 | | | | | | | | |
| | | | $d_{18}$ | = | 3.33 | $n_{11}$ | = | 1.59181 | $\nu_{11}$ | = 58.2 |
| $r_{19}$ | = | ∞ | | | | | | | | |
| | | | $d_{19}$ | = | 0.66 | | | | | |
| $r_{20}$ | = | ∞ | | | | | | | | |
| | | | $d_{20}$ | = | 5.02 | $n_{12}$ | = | 1.59551 | $\nu_{12}$ | = 39.2 |
| $r_{21}$ | = | -12.27 | | | | | | | | |
| | | | $d_{21}$ | = | 1.09 | | | | | |
| $r_{22}$ | = | -13.71 | | | | | | | | |
| | | | $d_{22}$ | = | 3.24 | $n_{13}$ | = | 1.86074 | $\nu_{13}$ | = 23.1 |

Example 16—Continued

| | | | | | | | |
|---|---|---|---|---|---|---|---|
| $r_{23}$ | = | 38.51 | | | | | |
| | | | $d_{23}$ | = | 0.70 | | |
| $r_{24}$ | = | −41.90 | | | | | |
| | | | $d_{24}$ | = | 2.26 | $n_{14}$ = 1.4645 | $\nu_{14}$ = 65.8 |
| $r_{25}$ | = | −10.76 | | | | | |
| | | | $d_{25}$ | = | 0.10 | | |
| $r_{26}$ | = | 375.00 | | | | | |
| | | | $d_{26}$ | = | 2.20 | $n_{15}$ = 1.51835 | $\nu_{15}$ = 60.3 |
| $r_{27}$ | = | −21.95 | | | | | |

The non-spherical surface provides the ninth surface.

| Factors of Non-sphericity | | |
|---|---|---|
| $K$ | = | 1.0 |
| $C_2$ | = | 0.0 |
| $C_4$ | = | $0.2064063 \times 10^{-4}$ |
| $C_6$ | = | $-0.4449466 \times 10^{-7}$ |
| $C_8$ | = | $0.3840304 \times 10^{-9}$ |
| $C_{10}$ | = | $0.6807959 \times 10^{-14}$ |

These factors are those related to equation (IV) representing the non-spherical surface.

Figure 30:
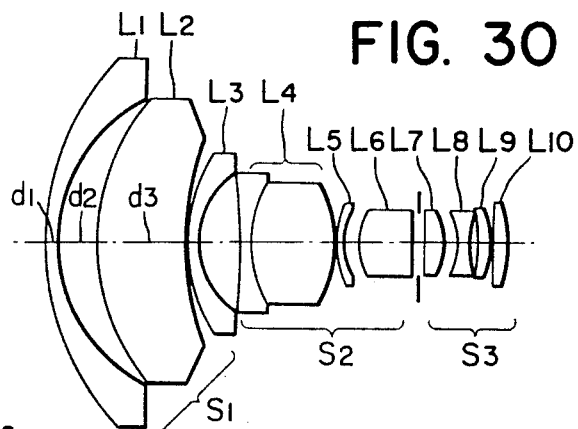
FIG. 30 shows, in longitudinal section, the lens arrangement according to Example 17 of the present invention.
Figure 31A:
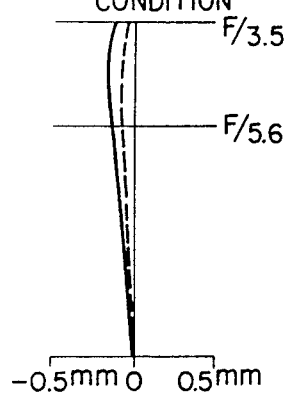
FIGS. 31A, 31B, 31C and 31D graphically illustrate aberrations therein.
Figure 31B:
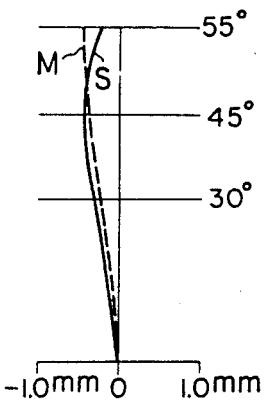
Figure 31C:
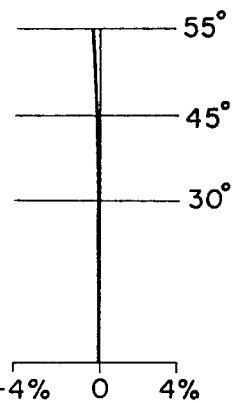
Figure 31D:
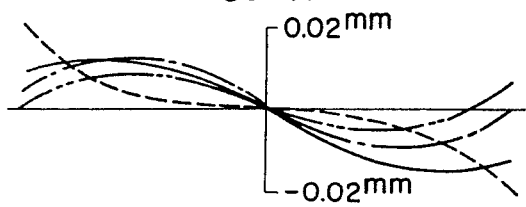

FIG. 30 shows an embodiment of the inverted telephoto-type lens system in which the third surface of the forward divergent group is non-spherical and which has a focal length 18.4 mm, a relative aperture F/3.5 and an angle of view 100°. In this lens system, a negative meniscus lens L1, a positive meniscus lens L2 and a negative meniscus lens L3 together constitute a forward divergent group S1; a cemented composite positive lens L4, a negative meniscus lens L5 and a positive lens L6 together constitute a forward convergent group S2 preceding the diaphragm; and a positive lens L7, a negative lens L8, a positive lens L9 and a positive lens L10 together constitute a rearward convergent group S3 succeeding the diaphragm. Distortion is substantially fully eliminated and spherical aberration, coma and astigmatism are sufficiently corrected (see FIGS. 31A–D).

For this embodiment, the following condition is provided to overcome the curvature of astigmatism.

$$4.1f > d_3 + d_{7+8} + d_{12} > 1.9f \qquad (X)$$

where $d_3$, $d_{7+8}$ and $d_{12}$ represent the center thicknesses of the lenses L2, L4 and L6, and $f$ represents the total focal length.

This condition is useful to increase the thicknesses of the lenses L2, L4 and L6 and accordingly, increase the length of the optical path, thereby correcting the curvature of astigmatism and flatten the image plane. Such an increased thickness of the positive lens L2, L4, L6, as provided by condition (X), has never been conceivable heretofore.

The numerical values for condition (X) in Example 17 are given below.

| Example | 17 |
|---|---|
| $d_3$ | 15.53 |
| $d_{7+8}$ | 17.33 |
| $d_{12}$ | 10.09 |
| $d_3 + d_{7+8} + d_{12}$ | 42.95 |
| $(d_3 + d_{7+8} + d_{12})/f$ | 2.334 |

Various specific numerical values are given below.

Example 17

$f$=18.4 mm; F/5.6; Angle of view 100°; B.f.32 39,805 mm.

| | | | | | | | |
|---|---|---|---|---|---|---|---|
| $r_1$ = | 46.77 | | | | | | |
| | | $d_1$ = | 2.00 | $n_1$ = | 1.713 | $\nu_1$ = | 53.9 |
| $r_2$ = | 27.79 | | | | | | |
| | | $d_2$ = | 6.50 non-spherical | | | | |
| $r_3$ = | 44.09 | | | | | | |
| | | $d_3$ = | 15.53 | $n_2$ = | 1.6425 | $\nu_2$ = | 58.1 |
| $r_4$ = | 58.81 | | | | | | |
| | | $d_4$ = | 0.10 | | | | |
| $r_5$ = | 28.14 | | | | | | |
| | | $d_5$ = | 1.69 | $n_3$ = | 1.713 | $\nu_3$ = | 53.9 |
| $r_6$ = | 14.26 | | | | | | |
| | | $d_6$ = | 8.31 | | | | |
| $r_7$ = | −67.60 | | | | | | |
| | | $d_7$ = | 2.38 | $n_4$ = | 1.77279 | $\nu_4$ = | 49.5 |
| $r_8$ = | 25.88 | | | | | | |
| | | $d_8$ = | 14.95 | $n_5$ = | 1.56013 | $\nu_5$ = | 47.0 |
| $r_9$ = | −30.28 | | | | | | |
| | | $d_9$ = | 0.10 | | | | |
| $r_{10}$= | 21.69 | | | | | | |
| | | $d_{10}$= | 1.00 | $n_6$ = | 1.67025 | $\nu_6$ = | 57.5 |
| $r_{11}$= | 9.79 | | | | | | |
| | | $d_{11}$= | 3.01 | | | | |
| $r_{12}$= | 15.10 | | | | | | |
| | | $d_{12}$= | 10.09 | $n_7$ = | 1.58065 | $\nu_7$ = | 37.1 |
| $r_{13}$= | ∞ | | | | | | |
| | | $d_{13}$= | 1.76 | | | | |
| $r_{14}$= | ∞ | | | | | | |
| | | $d_{14}$= | 2.17 | $n_8$ = | 1.58065 | $\nu_8$ = | 37.1 |
| $r_{15}$= | −15.23 | | | | | | |
| | | $d_{15}$= | 2.52 | | | | |
| $r_{16}$= | −14.56 | | | | | | |
| | | $d_{16}$= | 2.90 | $n_9$ = | 1.86074 | $\nu_9$ = | 23.1 |
| $r_{17}$= | 58.52 | | | | | | |
| | | $d_{17}$= | 0.57 | | | | |
| $r_{18}$= | −72.86 | | | | | | |
| | | $d_{18}$= | 2.35 | $n_{10}$= | 1.51454 | $\nu_{10}$= | 54.6 |
| $r_{19}$= | −12.15 | | | | | | |
| | | $d_{19}$= | 0.10 | | | | |
| $r_{20}$= | −573.40 | | | | | | |
| | | $d_{20}$= | 2.58 | $n_{11}$= | 1.56883 | $\nu_{11}$= | 56.0 |
| $r_{21}$= | −24.50 | | | | | | |

The non-spherical surface provides the third surfaces.

Factors of Non-sphericity

| | |
|---|---|
| $K$ | $= 1.0$ |
| $C_2$ | $= 0.0$ |
| $C_4$ | $= 0.4037876 \times 10^{-5}$ |
| $C_6$ | $= 0.3999550 \times 10^{-9}$ |
| $C_8$ | $= -0.4765369 \times 10^{-13}$ |
| $C_{10}$ | $= 0.3492820 \times 10^{-14}$ |

These factors are those related to equation (IV) representing the non-spherical surface.

I believe that the construction and arrangement of my novel lens system will now be understood, and that its several advantages will be fully appreciated by those persons skilled in the art.

I claim:

1. In a wide angle, substantially distortion free, inverted telephoto lens system consisting of a front diverging lens group and a rear converging lens group, said front diverging lens group comprising at least two negative single meniscus lenses and a positive single meniscus lens disposed between said negative meniscus lenses, said rear converging lens group comprising a positive cemented compound lens, a negative meniscus single lens, two positive lenses having a stop disposed therebetween, a negative biconcave lens, and two positive lenses, the improvement which comprises at least one concave surface of said front divergent lens group in the direction toward the stop being non-spherical for correcting distortion while some of the lenses are of a thickness to provide optical paths of a length to eliminate astigmatism.

2. A lens system according to claim 1, in which the lens system satisfies the following data:
Total focal length $f$=18.4mm
Relative aperture $F$/3.5
Angle of view 100°
Back-Focus $B.F.$=41.962mm

| | | | | | | | |
|---|---|---|---|---|---|---|---|
| $r_1 =$ | 40.14 | | non-spherical | | | | |
| | | $d_1 =$ | 2.2 | $n_1 =$ | 1.713 | $\nu_1 =$ | 53.9 |
| $r_2 =$ | 26.4 | | | | | | |
| | | $d_2 =$ | 6 | | | | |
| $r_3 =$ | 44.2 | | | | | | |
| | | $d_3 =$ | 4.8 | $n_2 =$ | 1.64006 | $\nu_2 =$ | 60.0 |
| $r_4 =$ | 114.6 | | | | | | |
| | | $d_4 =$ | 0.1 | | | | |
| $r_5 =$ | 23.55 | | | | | | |
| | | $d_5 =$ | 1.0 | $n_3 =$ | 1.713 | $\nu_3 =$ | 53.9 |
| $r_6 =$ | 14.53 | | | | | | |
| | | $d_6 =$ | 2.7 | | | | |
| $r_7 =$ | 19.8 | | | | | | |
| | | $d_7 =$ | 1.0 | $n_4 =$ | 1.713 | $\nu_4 =$ | 53.9 |
| $r_8 =$ | 13.845 | | | | | | |
| | | $d_8 =$ | 6.2 | | | | |
| $r_9 =$ | −74.4 | | | | | | |
| | | $d_9 =$ | 2.2 | $n_5 =$ | 1.77279 | $\nu_5 =$ | 49.5 |
| $r_{10}=$ | 16.12 | | | | | | |
| | | $d_{10}=$ | 14.1 | $n_6 =$ | 1.56013 | $\nu_6 =$ | 47.0 |
| $r_{11}=$ | −27.169 | | | | | | |
| | | $d_{11}=$ | 0.1 | | | | |
| $r_{12}=$ | 24.6 | | | | | | |
| | | $d_{12}=$ | 0.9 | $n_7 =$ | 1.67025 | $\nu_7 =$ | 57.5 |
| $r_{13}=$ | 9.976 | | | | | | |
| | | $d_{13}=$ | 2.3 | | | | |
| $r_{14}=$ | 14.67 | | | | | | |
| | | $d_{14}=$ | 8.8 | $n_8 =$ | 1.58065 | $\nu_8 =$ | 37.1 |
| $r_{15}=$ | ∞ | | | | | | |
| | | $d_{15}=$ | 1.7 | | | | |
| $r_{16}=$ | ∞ | | | | | | |
| | | $d_{16}=$ | 2.7 | $n_9 =$ | 1.58065 | $\nu_9 =$ | 37.1 |
| $r_{17}=$ | −14.949 | | | | | | |
| | | $d_{17}=$ | 3.1 | | | | |
| $r_{18}=$ | −14.925 | | | | | | |
| | | $d_{18}=$ | 3.5 | $n_{10}=$ | 1.86074 | $\nu_{10}=$ | 23.1 |
| $r_{19}=$ | 59.3 | | | | | | |
| | | $d_{19}=$ | 0.7 | | | | |
| $r_{20}=$ | −82 | | | | | | |
| | | $d_{20}=$ | 2.6 | $n_{11}=$ | 1.51118 | $\nu_{11}=$ | 50.9 |
| $r_{21}=$ | −12.4 | | | | | | |
| | | $d_{21}=0.1$ | | | | | |
| $r_{22}=$ | −500 | | | | | | |
| | | $d_{22}=$ | 2.7 | $n_{12}=$ | 1.56965 | $\nu_{12}=$ | 49.5 |
| $r_{23}=$ | 25.322 | | | | | | |

Non-spherical Shape

| | |
|---|---|
| $y_0 = 0.0$ | $z_0 = 0.0$ |
| $y_1 = 5.0$ | $z_1 = 0.00126$ |
| $y_2 = 10.0$ | $z_2 = 0.01997$ |
| $y_3 = 15.0$ | $z_3 = 0.09939$ |
| $y_4 = 20.0$ | $z_4 = 0.30664$ |
| $y_5 = 25.0$ | $z_5 = 0.72512$ | where $r$ represents curvature radii of lens surfaces (mm); $d$ lens thickness or air spaces between adjacent lenses; $n$ refractive indices of optical materials; $\nu$ Abbe numbers of optical material; $y$ distance from the optical axis (mm); and $z$ amount of deviation from the approximately spherical surface.

3. A lens system according to claim 1, in which the lens system satisfies the following data:
Total focal length $f$=18.4mm
Relative aperture $F$/3.5
Angle of view 100°
Back Focus $B.F.$=41.904mm

| | | | | | | | | |
|---|---|---|---|---|---|---|---|---|
| $r_1$ | = | 37.14 | (non-spherical) | | | | | |
| | | | $d_1$ | = | 2.0 | $n_1 = 1.713$ | $\nu_1$ | = 53.9 |
| $r_2$ | = | 25.96 | | | | | | |
| | | | $d_2$ | = | 6.42 | | | |
| $r_3$ | = | 44.55 | | | | | | |
| | | | $d_3$ | = | 4.51 | $n_2 = 1.6425$ | $\nu_2$ | = 58.1 |
| $r_4$ | = | 101.26 | | | | | | |
| | | | $d_4$ | = | 0.1 | | | |
| $r_5$ | = | 24.21 | | | | | | |
| | | | $d_5$ | = | 1.0 | $n_3 = 1.713$ | $\nu_3$ | = 53.9 |
| $r_6$ | = | 13.93 | | | | | | |
| | | | $d_6$ | = | 2.97 | | | |
| $r_7$ | = | 19.47 | | | | | | |
| | | | $d_7$ | = | 0.87 | $n_4 = 1.717$ | $\nu_4$ | = 48.0 |
| $r_8$ | = | 14.55 | | | | | | |
| | | | $d_8$ | = | 5.91 | | | |
| $r_9$ | = | −72.25 | | | | | | |
| | | | $d_9$ | = | 3.55 | $n_5 = 1.77279$ | $\nu_5$ | = 49.5 |
| $r_{10}$ | = | 17.11 | | | | | | |
| | | | $d_{10}$ | = | 14.74 | $n_6 = 1.56013$ | $\nu_6$ | = 47.0 |
| $r_{11}$ | = | −27.78 | | | | | | |
| | | | $d_{11}$ | = | 0.1 | | | |
| $r_{12}$ | = | 23.93 | | | | | | |
| | | | $d_{12}$ | = | 0.92 | $n_7 = 1.67025$ | $\nu_7$ | = 57.5 |
| $r_{13}$ | = | 9.96 | | | | | | |
| | | | $d_{13}$ | = | 2.31 | | | |
| $r_{14}$ | = | 14.81 | | | | | | |
| | | | $d_{14}$ | = | 10.70 | $n_8 = 1.58065$ | $\nu_8$ | = 37.1 |
| $r_{15}$ | = | ∞ | | | | | | |
| | | | $d_{15}$ | = | 1.09 | | | |
| $r_{16}$ | = | ∞ | | | | | | |
| | | | $d_{16}$ | = | 2.51 | $n_9 = 1.58065$ | $\nu_9$ | = 37.1 |
| $r_{17}$ | = | −14.67 | | | | | | |
| | | | $d_{17}$ | = | 3.04 | | | |
| $r_{18}$ | = | −14.99 | | | | | | |
| | | | $d_{18}$ | = | 2.9 | $n_{10} = 1.86074$ | $\nu_{10}$ | = 23.1 |
| $r_{19}$ | = | 59.08 | | | | | | |
| | | | $d_{19}$ | = | 0.57 | | | |
| $r_{20}$ | = | −65.90 | | | | | | |
| | | | $d_{20}$ | = | 2.39 | $n_{11} = 1.51454$ | $\nu_{11}$ | = 54.6 |
| $r_{21}$ | = | −12.42 | | | | | | |
| | | | $d_{21}$ | = | 0.1 | | | |
| $r_{22}$ | = | −492.23 | | | | | | |
| | | | $d_{22}$ | = | 4.81 | $n_{12} = 1.56883$ | $\nu_{12}$ | = 56.0 |
| $r_{23}$ | = | −25.062 | | | | | | |

Non-spherical Shape

| | |
|---|---|
| $y_0 = 0.0$ | $z_0 = 0.0$ |
| $y_1 = 5.0$ | $z_1 = 0.00151$ |
| $y_2 = 10.0$ | $z_2 = 0.02423$ |
| $y_3 = 15.0$ | $z_3 = 0.12319$ |
| $y_4 = 20.0$ | $z_4 = 0.39784$ |
| $y_5 = 25.0$ | $z_5 = 1.04193$ | where $r$ represents curvature radii of lens surfaces (mm); $d$ lens thickness or air spaces between adjacent lenses; $n$ refractive indices of optical materials; $\nu$ Abbe numbers of optical material; $y$ distance from the optical axis (mm); and $z$ amount of deviation from the approximately spherical surface.

4. A lens system according to claim 1, in which the lens system satisfies the following data:
Total focal length $f$=18.4mm
Relative aperture $F$/3.5
Angle of view 100°
Back Focus $B.F.$=42.255mm

| | | | | | | | | |
|---|---|---|---|---|---|---|---|---|
| $r_1$ | ≈ | 39.71 | (non-spherical) | | | | | |
| | | | $d_1$ | = | 2.20 | $n_1 = 1.713$ | $\nu_1$ | = 53.9 |
| $r_2$ | = | 26.42 | | | | | | |
| | | | $d_2$ | = | 5.47 | | | |
| $r_3$ | = | 43.67 | | | | | | |
| | | | $d_3$ | = | 4.69 | $n_2 = 1.6425$ | $\nu_2$ | = 58.1 |
| $r_4$ | = | 116.49 | | | | | | |
| | | | $d_4$ | = | 0.10 | | | |
| $r_5$ | = | 22.83 | | | | | | |
| | | | $d_5$ | = | 0.94 | $n_3 = 1.713$ | $\nu_3$ | = 53.9 |
| $r_6$ | = | 14.54 | | | | | | |
| | | | $d_6$ | = | 2.60 | | | |
| $r_7$ | = | 21.00 | | | | | | |
| | | | $d_7$ | = | 1.00 | $n_4 = 1.717$ | $\nu_4$ | = 48.0 |
| $r_8$ | = | 13.87 | | | | | | |
| | | | $d_8$ | = | 5.91 | | | |
| $r_9$ | = | −80.46 | | | | | | |
| | | | $d_9$ | = | 2.80 | $n_5 = 1.77279$ | $\nu_5$ | = 49.5 |
| $r_{10}$ | = | 16.13 | | | | | | |
| | | | $d_{10}$ | = | 14.31 | $n_6 = 1.56013$ | $\nu_6$ | = 47.0 |
| $r_{11}$ | = | −27.35 | | | | | | |
| | | | $d_{11}$ | = | 0.1 | | | |
| $r_{12}$ | = | 25.10 | | | | | | |
| | | | $d_{12}$ | = | 0.95 | $n_7 = 1.67025$ | $\nu_7$ | = 57.5 |
| $r_{13}$ | = | 9.96 | | | | | | |
| | | | $d_{13}$ | = | 2.31 | | | |
| $r_{14}$ | = | 14.71 | | | | | | |
| | | | $d_{14}$ | = | 9.58 | $n_8 = 1.58065$ | $\nu_8$ | = 37.1 |
| $r_{15}$ | = | ∞ | | | | | | |
| | | | $d_{15}$ | = | 1.35 | | | |

| | | | | | | | |
|---|---|---|---|---|---|---|---|
| $r_{16}$ | = | ∞ | | | | | |
| | | | $d_{16}$ | = | 2.41 | $n_9$ = 1.58065 | $\nu_9$ = 37.1 |
| $r_{17}$ | = | −14.92 | | | | | |
| | | | $d_{17}$ | = | 3.10 | | |
| $r_{18}$ | = | −14.98 | | | | | |
| | | | $d_{18}$ | = | 3.18 | $n_{10}$ = 1.86074 | $\nu_{10}$ = 23.1 |
| $r_{19}$ | = | 57.98 | | | | | |
| | | | $d_{19}$ | = | 0.41 | | |
| $r_{20}$ | = | −83.91 | | | | | |
| | | | $d_{20}$ | = | 3.07 | $n_{11}$ = 1.51454 | $\nu_{11}$ = 54.6 |
| $r_{21}$ | = | −12.36 | | | | | |
| | | | $d_{21}$ | = | 0.1 | | |
| $r_{22}$ | = | −436.16 | | | | | |
| | | | $d_{22}$ | = | 4.17 | $n_{12}$ = 1.56883 | $\nu_{12}$ = 56.0 |
| $r_{23}$ | = | −25.54 | | | | | |

Non-spherical Shape

| | |
|---|---|
| $y_0$ = 0.0 | $z_0$ = 0.0 |
| $y_1$ = 5.0 | $z_1$ = 0.00117 |
| $y_2$ = 10.0 | $z_2$ = 0.01835 |
| $y_3$ = 15.0 | $z_3$ = 0.08998 |
| $y_4$ = 20.0 | $z_4$ = 0.27153 |
| $y_5$ = 25.0 | $z_5$ = 0.62258 | where $r$ represents curvature radii of lens surfaces (mm); $d$ lens thickness or air spaces between adjacent lenses; $n$ refractive indices of optical materials; $\nu$ Abbe numbers of optical materials; $y$ distance from the optical axis (mm); and $z$ amount of deviation from the approximately spherical surface.

5. A lens system according to claim 1, in which the lens system satisfies the following data:
Total focal length $f$=18.4mm
Relative aperture $F/3.5$
Angle of view 100°
Back-Focus $B.F.$=41.895mm

| | | | | | | | |
|---|---|---|---|---|---|---|---|
| $r_1$ | = | 37.47 (non-spherical) | | | | | |
| | | | $d_1$ | = | 2.00 | $n_1$ = 1.71300 | $\nu_1$ = 53.9 |
| $r_2$ | = | 26.07 | | | | | |
| | | | $d_2$ | = | 6.42 | | |
| $r_3$ | = | 44.55 | | | | | |
| | | | $d_3$ | = | 4.62 | $n_2$ = 1.6425 | $\nu_2$ = 58.1 |
| $r_4$ | = | 100.82 | | | | | |
| | | | $d_4$ | = | 0.10 | | |
| $r_5$ | = | 24.20 | | | | | |
| | | | $d_5$ | = | 1.00 | $n_3$ = 1.71300 | $\nu_3$ = 53.9 |
| $r_6$ | = | 13.93 | | | | | |
| | | | $d_6$ | = | 3.25 | | |
| $r_7$ | = | 19.43 | | | | | |
| | | | $d_7$ | = | 0.95 | $n_4$ = 1.71700 | $\nu_4$ = 48.0 |
| $r_8$ | = | 14.67 | | | | | |
| | | | $d_8$ | = | 5.91 | | |
| $r_9$ | = | −72.25 | | | | | |
| | | | $d_9$ | = | 3.63 | $n_5$ = 1.77279 | $\nu_5$ = 49.5 |
| $r_{10}$ | = | 17.06 | | | | | |
| | | | $d_{10}$ | = | 14.77 | $n_6$ = 1.56013 | $\nu_6$ = 47.0 |
| $r_{11}$ | = | −27.78 | | | | | |
| | | | $d_{11}$ | = | 0.10 | | |
| $r_{12}$ | = | 23.97 | | | | | |
| | | | $d_{12}$ | = | 0.93 | $n_7$ = 1.67025 | $\nu_7$ = 57.5 |
| $r_{13}$ | = | 9.96 | | | | | |
| | | | $d_{13}$ | = | 2.31 | | |
| $r_{14}$ | = | 14.80 | | | | | |
| | | | $d_{14}$ | = | 10.65 | $n_8$ = 1.58065 | $\nu_8$ = 37.1 |
| $r_{15}$ | = | ∞ | | | | | |
| | | | $d_{15}$ | = | 1.08 | | |
| $r_{16}$ | = | ∞ | | | | | |
| | | | $d_{16}$ | = | 2.40 | $n_9$ = 1.58065 | $\nu_9$ = 37.1 |
| $r_{17}$ | = | −14.65 | | | | | |
| | | | $d_{17}$ | = | 3.01 | | |
| $r_{18}$ | = | −14.99 | | | | | |
| | | | $d_{18}$ | = | 2.00 | $n_{10}$ = 1.86074 | $\nu_{10}$ = 23.1 |
| $r_{19}$ | = | 59.08 | | | | | |
| | | | $d_{19}$ | = | 0.57 | | |
| $r_{20}$ | = | −64.54 | | | | | |
| | | | $d_{20}$ | = | 2.40 | $n_{11}$ = 1.51454 | $\nu_{11}$ = 54.6 |
| $r_{21}$ | = | −12.42 | | | | | |
| | | | $d_{21}$ | = | 0.10 | | |
| $r_{22}$ | = | −489.25 | | | | | |
| | | | $d_{22}$ | = | 5.25 | $n_{12}$ = 1.56883 | $\nu_{12}$ = 56.0 |
| $r_{23}$ | = | −25.06 | | | | | | where $r$ represents curvature radii of lens surfaces (mm); $d$ lens thickness of air spaces between adjacent lenses; $n$ refractive indices of optical materials; $\nu$ Abbe numbers of optical material; and further, the first surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C(=r_1)$ the curvature radius of the tangential spherical plane; and further

| | | |
|---|---|---|
| $K$ | = | 1.0 |
| $C_2$ | = | 0.0 |
| $C_4$ | = | $0.2407028 \times 10^{-5}$ |
| $C_6$ | = | $0.1303520 \times 10^{-11}$ |
| $C_8$ | = | $-0.1680348 \times 10^{-17}$ |
| $C_{10}$ | = | $0.1925956 \times 10^{-14}$ |

6. A lens system according to claim 1, in which the lens system satisfies the following data:
Total focal length $f$=18.4mm
Relative aperture $F/3.5$
Angle of view 100°
Back-focus $B.F.$=39.497mm

| | | | | | | | | |
|---|---|---|---|---|---|---|---|---|
| $r_1$ | = | 47.42 | | | | | | |
| | | | $d_1$ | = | 2.00 | $n_1$ = 1.713 | $\nu_1$ | = 53.9 |
| $r_2$ | = | 27.53 | $d_2$ | = | 6.42 | | | |
| $r_3$ | ≈ | 44.55 (non-spherical) | | | | | | |
| | | | $d_3$ | = | 17.14 | $n_2$ = 1.6425 | $\nu_2$ | = 58.1 |
| $r_4$ | = | 62.82 | $d_4$ | = | 0.1 | | | |
| $r_5$ | = | 26.51 | $d_5$ | = | 1.0 | $n_3$ = 1.713 | $\nu_3$ | = 53.9 |
| $r_6$ | = | 15.88 | $d_6$ | = | 1.34 | | | |
| $r_7$ | = | 19.56 | $d_7$ | = | 0.97 | $n_4$ = 1.719 | $\nu_4$ | = 48.0 |
| $r_8$ | = | 14.01 | $d_8$ | = | 5.91 | | | |
| $r_9$ | = | −72.25 | $d_9$ | = | 3.35 | $n_5$ = 1.77279 | $\nu_5$ | = 49.5 |
| $r_{10}$ | = | 24.30 | $d_{10}$ | = | 14.87 | $n_6$ = 1.56013 | $\nu_6$ | = 47.0 |
| $r_{11}$ | = | −27.78 | $d_{11}$ | = | 0.1 | | | |
| $r_{12}$ | = | 21.88 | $d_{12}$ | = | 0.58 | $n_7$ = 1.67025 | $\nu_7$ | = 57.5 |
| $r_{13}$ | = | 9.96 | $d_{13}$ | = | 2.31 | | | |
| $r_{14}$ | = | 14.54 | $d_{14}$ | = | 9.72 | $n_8$ = 1.58065 | $\nu_8$ | = 37.1 |
| $r_{15}$ | = | ∞ | $d_{15}$ | = | 0.92 | | | |
| $r_{16}$ | = | ∞ | $d_{16}$ | = | 2.71 | $n_9$ = 1.58065 | $\nu_9$ | = 37.1 |
| $r_{17}$ | = | −15.14 | $d_{17}$ | = | 3.57 | | | |
| $r_{18}$ | = | −14.99 | $d_{18}$ | = | 2.90 | $n_{10}$ = 1.86074 | $\nu_{10}$ | = 23.1 |
| $r_{19}$ | = | 59.08 | $d_{19}$ | = | 0.57 | | | |
| $r_{20}$ | = | −54.08 | $d_{20}$ | = | 2.45 | $n_{11}$ = 1.51454 | $\nu_{11}$ | = 54.6 |
| $r_{21}$ | = | −12.42 | $d_{21}$ | = | 0.1 | | | |
| $r_{22}$ | = | −775.62 | $d_{22}$ | = | 1.91 | $n_{12}$ = 1.56883 | $\nu_{12}$ | = 56.0 |
| $r_{23}$ | = | −24.71 | | | | | | | where $r$ represents curvature radii of lens surfaces (mm); $d$ lens thickness of air spaces between adjacent lenses; $n$ refractive indices of optical materials; $\nu$ Abbe nubers of optical material; and further, the third surface of the divergent lens group satisfies the following condition:

$$X = CY^2/1 + \sqrt{1-K(CY)^2} + C_2 Y^2 + C_4 Y^4 + C_6 Y^6 + C_8 Y^8 + C_{10} Y^{10}$$

where Y represents the distance from the optical axis; X the distance from the tangential plane; $1/C(=r3)$ the curvature radius of the tangential spherical plane; and further $K = 1.0$
$C_2 = 0.0$
$C_4 = 0.3363777 \times 10^{-5}$
$C_6 = 0.2252592 \times 10^{-9}$
$C_8 = 0.1041002 \times 10^{-12}$
$C_{10} = 0.1925956 \times 10^{-14}$ 7. A lens system according to claim 1, in which the lens system satisfies the following data:
Total focal length $f = 18.4$ mm
Relative aperture $F/3.5$
Angle of view $100°$
Back-focus $B.F. = 37.904$ mm

| | | | | | | | | |
|---|---|---|---|---|---|---|---|---|
| $r_1$ | = | 35.87 | | | | | | |
| | | | $d_1$ | = | 2.00 | $n_1 = 1.713$ | $\nu_1$ | = 53.9 |
| $r_2$ | = | 29.05 | $d_2$ | = | 6.42 | | | |
| $r_3$ | = | 44.55 | $d_3$ | = | 6.43 (non-spherical) | $n_2 = 1.6425$ | $\nu_2$ | = 58.1 |
| $r_4$ | ≈ | 151.55 | $d_4$ | = | 0.1 | | | |
| $r_5$ | = | 25.14 | $d_5$ | = | 1.0 | $n_3 = 1.713$ | $\nu_3$ | = 53.9 |
| $r_6$ | = | 14.45 | $d_6$ | = | 4.71 | | | |
| $r_7$ | = | 27.15 | $d_7$ | = | 0.96 | $n_4 = 1.717$ | $\nu_4$ | = 48.0 |
| $r_8$ | = | 14.29 | $d_8$ | = | 5.91 | | | |
| $r_9$ | = | −72.25 | $d_9$ | = | 3.28 | $n_5 = 1.77279$ | $\nu_5$ | = 49.5 |
| $r_{10}$ | = | 25.79 | $d_{10}$ | = | 14.88 | $n_6 = 1.56013$ | $\nu_6$ | = 47.0 |
| $r_{11}$ | = | −27.78 | $d_{11}$ | = | 0.1 | | | |
| $r_{12}$ | = | 22.13 | $d_{12}$ | = | 0.94 | $n_7 = 1.67025$ | $\nu_7$ | = 57.5 |
| $r_{13}$ | = | 9.96 | $d_{13}$ | = | 2.31 | | | |
| $r_{14}$ | = | 14.42 | $d_{14}$ | = | 9.96 | $n_8 = 1.58065$ | $\nu_8$ | = 37.1 |

| | | | | | | |
|---|---|---|---|---|---|---|
| $r_{15}$ | = | ∞ | | | | |
| | | | $d_{15}$ | = | 1.00 | |
| $r_{16}$ | = | ∞ | | | | |
| | | | $d_{16}$ | = | 3.10 | $n_9 = 1.58065$ $\nu_9 = 37.1$ |
| $r_{17}$ | = | −15.27 | | | | |
| | | | $d_{17}$ | = | 3.77 | |
| $r_{18}$ | = | −14.99 | | | | |
| | | | $d_{18}$ | = | 2.9 | $n_{10} = 1.86074$ $\nu_{10} = 23.1$ |
| $r_{19}$ | = | 59.08 | | | | |
| | | | $d_{19}$ | = | 0.57 | |
| $r_{20}$ | = | −53.36 | | | | |
| | | | $d_{20}$ | = | 2.43 | $n_{11} = 1.51454$ $\nu_{11} = 54.6$ |
| $r_{21}$ | = | −12.42 | | | | |
| | | | $d_{21}$ | = | 0.1 | |
| $r_{22}$ | = | 8351.50 | | | | |
| | | | $d_{22}$ | = | 2.28 | $n_{12} = 1.56883$ $\nu_{12} = 56$ |
| $r_{23}$ | = | −24.61 | | | | | where $r$ represents curvature radii of lens surfaces(mm); $d$ lens thickness of air spaces between adjacent lenses; $n$ refractive indices of optical materials; $\nu$ Abbe numbers of optical material; and further, the fourth surface of the divergent lens group satisfies the following condition:

$$X = CY^2/1 + \sqrt{1 - K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C(=r_4)$ the curvature radius of the tangential spherical plane; and further $K = 1.0$
$C_2 = 0.0$
$C_4 = 0.1153770 \times 10^{-5}$
$C_6 = -0.1033107 \times 10^{-9}$
$C_8 = -1064602 \times 10^{-19}$
$C_{10} = -0.4520970 \times 10^{-17}$ 8. A lens system according to claim 1, in which the lens system satisfies the following data:
Total focal length $f=18.4$mm
Relative aperture $F/3.5$
Angle of view 100°
Back-Focus $B.F.=41.878$mm

| | | | | | | | | |
|---|---|---|---|---|---|---|---|---|
| $r_1$ | = | 37.26 | | | | | | |
| | | | $d_1$ | = | 2.00 | $n_1 =$ | 1.713 | $\nu_1 =$ 53.9 |
| $r_2$ | = | 27.38 | | | | | | |
| | | | $d_2$ | = | 6.42 | | | |
| $r_3$ | = | 44.55 | | | | | | |
| | | | $d_3$ | = | 5.23 | $n_2 =$ | 1.6425 | $\nu_2 =$ 58.1 |
| $r_4$ | = | 106.61 | | | | | | |
| | | | $d_4$ | = | 0.10 (non-spherical) | | | |
| $r_5$ | = | 24.72 | | | | | | |
| | | | $d_5$ | = | 1.00 | $n_3 =$ | 1.713 | $\nu_3 =$ 53.9 |
| $r_6$ | = | 14.85 | | | | | | |
| | | | $d_6$ | = | 4.10 | | | |
| $r_7$ | = | 24.10 | | | | | | |
| | | | $d_7$ | = | 0.99 | $n_4 =$ | 1.717 | $\nu_4 =$ 48.0 |
| $r_8$ | = | 15.60 | | | | | | |
| | | | $d_8$ | = | 5.91 | | | |
| $r_9$ | = | −72.25 | | | | | | |
| | | | $d_9$ | = | 3.88 | $n_5 =$ | 1.77279 | $\nu_5 =$ 49.5 |
| $r_{10}$ | = | 15.92 | | | | | | |
| | | | $d_{10}$ | = | 15.23 | $n_6 =$ | 1.56013 | $\nu_6 =$ 47.0 |
| $r_{11}$ | = | −27.78 | | | | | | |
| | | | $d_{11}$ | = | 0.1 | | | |
| $r_{12}$ | = | 23.68 | | | | | | |
| | | | $d_{12}$ | = | 0.98 | $n_7 =$ | 1.67025 | $\nu_7 =$ 57.5 |
| $r_{13}$ | = | 9.96 | | | | | | |
| | | | $d_{13}$ | = | 2.31 | | | |
| $r_{14}$ | = | 14.85 | | | | | | |
| | | | $d_{14}$ | = | 11.42 | $n_8 =$ | 1.58065 | $\nu_8 =$ 37.1 |
| $r_{15}$ | = | ∞ | | | | | | |
| | | | $d_{15}$ | = | 1.02 | | | |
| $r_{16}$ | = | ∞ | | | | | | |
| | | | $d_{16}$ | = | 2.46 | $n_9 =$ | 1.58065 | $\nu_9 =$ 37.1 |
| $r_{17}$ | = | −14.71 | | | | | | |
| | | | $d_{17}$ | = | 3.26 | | | |
| $r_{18}$ | = | −14.99 | | | | | | |
| | | | $d_{18}$ | = | 2.90 | $n_{10} =$ | 1.86074 | $\nu_{10} =$ 23.1 |
| $r_{19}$ | = | 59.08 | | | | | | |
| | | | $d_{19}$ | = | 0.57 | | | |
| $r_{20}$ | = | −57.34 | | | | | | |
| | | | $d_{20}$ | = | 2.37 | $n_{11} =$ | 1.51454 | $\nu_{11} =$ 54.6 |
| $r_{21}$ | = | −12.42 | | | | | | |
| | | | $d_{21}$ | = | 0.1 | | | |
| $r_{22}$ | = | −662.47 | | | | | | |
| | | | $d_{22}$ | = | 5.41 | $n_{12} =$ | 1.56883 | $\nu_{12} =$ 56.0 |
| $r_{23}$ | = | −24.62 | | | | | | | where r represents curvature radii of lens surfaces (mm); $d$ lens thickness of air spaces between adjacent lenses; $n$ refractive indices of optical materials; $\nu$ Abbe numbers of optical material; and further, the fifth surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C(=r_5)$ the curvature radius of the tangential spherical plane; and further

| | |
|---|---|
| $K$ | $= 1.0$ |
| $C_2$ | $= 0.0$ |
| $C_4$ | $= 0.7058626 \times 10^{-5}$ |
| $C_6$ | $= 0.103800l \times 10^{-8}$ |
| $C_8$ | $= 0.4697824 \times 10^{-21}$ |
| $C_{10}$ | $= 0.7558945 \times 10^{-13}$ |

9. A lens system according to claim 1, in which the lens system satisfies the following data:
Total focal length $f=18.4$mm
Relative aperture $F/3.5$
Angle of view $100°$
Back-Focus $B.F.=42.136$mm

| | | | | | | | |
|---|---|---|---|---|---|---|---|
| $r_1 =$ | 37.16 | $d_1 =$ | 2.00 | $n_1 =$ | 1.713 | $\nu_1 =$ | 53.9 |
| $r_2 =$ | 27.23 | $d_2 =$ | 6.42 | | | | |
| $r_3 =$ | 44.55 | $d_3 =$ | 5.22 | $n_2 =$ | 1.6425 | $\nu_2 =$ | 58.1 |
| $r_4 =$ | 109.02 | $d_4 =$ | 0.10 | | | | |
| $r_5 =$ | 23.73 | $d_5 =$ | 1.00 | $n_3 =$ | 1.713 | $\nu_3 =$ | 53.9 |
| $r_6 =$ | 14.92 | $d_6 =$ | 3.79 (non-spherical) | | | | |
| $r_7 =$ | 25.33 | $d_7 =$ | 0.97 | $n_4 =$ | 1.717 | $\nu_4 =$ | 48.0 |
| $r_8 =$ | 16.08 | $d_8 =$ | 5.91 | | | | |
| $r_9 =$ | −72.25 | $d_9 =$ | 4.99 | $n_5 =$ | 1.77279 | $\nu_5 =$ | 49.5 |
| $r_{10} =$ | 15.30 | $d_{10} =$ | 15.62 | $n_6 =$ | 1.56013 | $\nu_6 =$ | 47.0 |
| $r_{11} =$ | −27.78 | $d_{11} =$ | 0.10 | | | | |
| $r_{12} =$ | 24.03 | $d_{12} =$ | 0.96 | $n_7 =$ | 1.67025 | $\nu_7 =$ | 57.5 |
| $r_{13} =$ | 9.96 | $d_{13} =$ | 2.31 | | | | |
| $r_{14} =$ | 14.69 | $d_{14} =$ | 11.87 | $n_8 =$ | 1.58065 | $\nu_8 =$ | 37.1 |
| $r_{15} =$ | ∞ | $d_{15} =$ | 1.0 | | | | |
| $r_{16} =$ | ∞ | $d_{16} =$ | 2.07 | $n_9 =$ | 1.58065 | $\nu_9 =$ | 37.1 |
| $r_{17} =$ | −14.95 | $d_{17} =$ | 3.38 | | | | |
| $r_{18} =$ | −14.99 | $d_{18} =$ | 2.90 | $n_{10} =$ | 1.86074 | $\nu_{10} =$ | 23.1 |
| $r_{19} =$ | 59.08 | $d_{19} =$ | 0.57 | | | | |
| $r_{20} =$ | −55.81 | $d_{20} =$ | 2.76 | $n_{11} =$ | 1.51454 | $\nu_{11} =$ | 54.6 |
| $r_{21} =$ | −12.42 | $d_{21} =$ | 0.10 | | | | |
| $r_{22} =$ | −599.43 | $d_{22} =$ | 3.65 | $n_{12} =$ | 1.56883 | $\nu_{12} =$ | 56.0 |
| $r_{23} =$ | −24.92 | | | | | | | where $r$ represents curvature radii of lens surfaces (mm); $d$ lens thickness of air spaces between adjacent lenses; $n$ refractive indices of optical materials; $\nu$ Abbe numbers of optical material; and further, the seventh surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C(=r_7)$ the curvature radius of the tangential spherical plane; and further

| | | |
|---|---|---|
| $K$ | $= 1.0$ | |
| $C_2$ | $= 0.0$ | |
| $C_4$ | $= 0.1218404$ | $\times 10^{-4}$ |
| $C_6$ | $= -0.2683242$ | $\times 10^{-12}$ |
| $C_8$ | $= -0.3127555$ | $\times 10^{-18}$ |
| $C_{10}$ | $= 0.1992141$ | $\times 10^{-12}$ |

10. A lens system according to claim 1, in which the lens system satisfies the following data:
Total focal length $f=18.4$mm
Relative aperture $F/3.5$
Angle of view $100°$
Back-Focus $B.F.=41.834$mm

| | | | | | | | |
|---|---|---|---|---|---|---|---|
| $r_1$ | = | 36.78 | $d_1$ | = | 2.00 | $n_1$ = 1.713 | $\nu_1$ = 53.9 |
| $r_2$ | = | 27.51 | $d_2$ | = | 6.42 | | |
| $r_3$ | = | 44.55 | $d_3$ | = | 7.39 | $n_2$ = 1.6425 | $\nu_2$ = 58.1 |
| $r_4$ | = | 117.59 | $d_4$ | = | 0.10 | | |
| $r_5$ | = | 26.21 | $d_5$ | = | 1.00 | $n_3$ = 1.713 | $\nu_3$ = 53.9 |
| $r_6$ | = | 16.30 | $d_6$ | = | 3.09 | | |

| | | | | | | | | |
|---|---|---|---|---|---|---|---|---|
| $r_7$ | = | 25.65 | | | | | | |
| | | | $d_7$ | = | 1.00 | $n_4$ = 1.717 | $\nu_4$ | = 48.0 |
| $r_8$ | = | 13.92 | (non-spherical) | | | | | |
| | | | $d_8$ | = | 5.91 | | | |
| $r_9$ | = | −72.25 | | | | | | |
| | | | $d_9$ | = | 4.18 | $n_5$ = 1.77279 | $\nu_5$ | = 49.5 |
| $r_{10}$ | = | 17.08 | | | | | | |
| | | | $d_{10}$ | = | 15.28 | $n_6$ = 1.56013 | $\nu_6$ | = 47.0 |
| $r_{11}$ | = | −27.78 | | | | | | |
| | | | $d_{11}$ | = | 0.10 | | | |
| $r_{12}$ | = | 23.34 | | | | | | |
| | | | $d_{12}$ | = | 0.93 | $n_7$ = 1.67025 | $\nu_7$ | = 57.5 |
| $r_{13}$ | = | 9.96 | | | | | | |
| | | | $d_{13}$ | = | 2.31 | | | |
| $r_{14}$ | = | 14.64 | | | | | | |
| | | | $d_{14}$ | = | 12.22 | $n_8$ = 1.58065 | $\nu_8$ | = 37.1 |
| $r_{15}$ | = | ∞ | | | | | | |
| | | | $d_{15}$ | = | 1.00 | | | |
| $r_{16}$ | = | ∞ | | | | | | |
| | | | $d_{16}$ | = | 2.43 | $n_9$ = 1.58065 | $\nu_9$ | = 37.1 |
| $r_{17}$ | = | −15.07 | | | | | | |
| | | | $d_{17}$ | = | 3.51 | | | |
| $r_{18}$ | = | −14.99 | | | | | | |
| | | | $d_{18}$ | = | 2.90 | $n_{10}$ = 1.86074 | $\nu_{10}$ | = 23.1 |
| $r_{19}$ | = | 59.08 | | | | | | |
| | | | $d_{19}$ | = | 0.57 | | | |
| $r_{20}$ | = | −60.15 | | | | | | |
| | | | $d_{20}$ | = | 2.59 | $n_{11}$ = 1.51454 | $\nu_{11}$ | = 54.6 |
| $r_{21}$ | = | −12.42 | | | | | | |
| | | | $d_{21}$ | = | 0.10 | | | |
| $r_{22}$ | = | −740.83 | | | | | | |
| | | | $d_{22}$ | = | 3.35 | $n_{12}$ = 1.56883 | $\nu_{12}$ | = 56.0 |
| $r_{23}$ | = | −24.98 | | | | | | | where $r$ represents curvature radii of lens surfaces (mm); $d$ lens thickness of air spaces between adjacent lenses; $n$ refractive indices of optical materials; $\nu$ Abbe numbers of optical material; and further, the eighth surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C$ (=$r_8$) the curvature radius of the tangential spherical plane; and further

| | | |
|---|---|---|
| $K$ | = | 1.0 |
| $C_2$ | = | 0.0 |
| $C_4$ | = | −0.1648184 × 10⁻⁴ |
| $C_6$ | = | 0.2809641 × 10⁻⁸ |
| $C_8$ | = | 0.7622571 × 10⁻²¹ |
| $C_{10}$ | = | −0.2215386 × 10⁻¹¹ |

11. A lens system according to claim 1, in which the lens system satisfies the following data:
Total focal length $f$ = 18.5mm
Relative aperture $F$/4.0
Angle of view 100°
Back-Focus $B.F.$ = 37.986mm

| | | | | | | | | |
|---|---|---|---|---|---|---|---|---|
| $r_1$ | = | 41.70 | (non-spherical) | | | | | |
| | | | $d_1$ | = | 2.00 | $n_1$ = 1.69680 | $\nu_1$ | = 55.6 |
| $r_2$ | = | 27.90 | | | | | | |
| | | | $d_2$ | = | 1.02 | | | |
| $r_3$ | = | 71.15 | | | | | | |
| | | | $d_3$ | = | 1.80 | $n_2$ = 1.69680 | $\nu_2$ | = 55.6 |
| $r_4$ | = | 26.71 | | | | | | |
| | | | $d_4$ | = | 3.38 | | | |
| $r_5$ | = | 40.00 | | | | | | |
| | | | $d_5$ | = | 14.86 | $n_3$ = 1.62041 | $\nu_3$ | = 60.3 |
| $r_6$ | = | 332.22 | | | | | | |
| | | | $d_6$ | = | 0.10 | | | |
| $r_7$ | = | 23.04 | | | | | | |
| | | | $d_7$ | = | 1.00 | $n_4$ = 1.69680 | $\nu_4$ | = 55.6 |
| $r_8$ | = | 12.40 | | | | | | |
| | | | $d_8$ | = | 4.90 | | | |
| $r_9$ | = | −63.51 | | | | | | |
| | | | $d_9$ | = | 3.85 | $n_5$ = 1.77279 | $\nu_5$ | = 49.5 |
| $r_{10}$ | = | 20.60 | | | | | | |
| | | | $d_{10}$ | = | 10.56 | $n_6$ = 1.58900 | $\nu_6$ | = 48.6 |
| $r_{11}$ | = | −28.00 | | | | | | |
| | | | $d_{11}$ | = | 0.10 | | | |
| $r_{12}$ | = | 19.10 | | | | | | |
| | | | $d_{12}$ | = | 1.00 | $n_7$ = 1.67025 | $\nu_7$ | = 57.5 |
| $r_{13}$ | = | 10.10 | | | | | | |
| | | | $d_{13}$ | = | 1.80 | | | |
| $r_{14}$ | = | 13.07 | | | | | | |
| | | | $d_{14}$ | = | 7.83 | $n_8$ = 1.58065 | $\nu_8$ | = 37.1 |
| $r_{15}$ | = | ∞ | | | | | | |
| | | | $d_{15}$ | = | 1.37 | | | |
| $r_{16}$ | = | ∞ | | | | | | |
| | | | $d_{16}$ | = | 2.03 | $n_9$ = 1.58065 | $\nu_9$ | = 37.1 |
| $r_{17}$ | = | −16.27 | | | | | | |
| | | | $d_{17}$ | = | 3.25 | | | |
| $r_{18}$ | = | −14.60 | | | | | | |
| | | | $d_{18}$ | = | 3.10 | $n_{10}$ = 1.86074 | $\nu_{10}$ | = 23.1 |
| $r_{19}$ | = | 50.70 | | | | | | |
| | | | $d_{19}$ | = | 0.90 | | | |
| $r_{20}$ | = | −36.74 | | | | | | |
| | | | $d_{20}$ | = | 2.14 | $n_{11}$ = 1.51823 | $\nu_{11}$ | = 59.0 |

| | | |
|---|---|---|
| $r_{21}$ | = | −11.80 |
| $r_{22}$ | = | −144.81 |
| $r_{23}$ | = | −19.33 |

$d_{21}$ = 0.10
$d_{22}$ = 2.32   $n_{12}$ = 1.55671   $\nu_{12}$ = 58.5 where $r$ represents curvature radii of lens surfaces (mm); $d$ lens thickness of air spaces between adjacent lenses; $n$ refractive indices of optical materials; $\nu$ Abbe numbers of optical material; and further, the first surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from optical axis; $X$ the distance from the tangential plane; $1/C\ (=r_1)$ the curvature radius of the tangential spherical plane; and further $K$ = 1.0
$C_2$ = 0.0
$C_4$ = 0.1604024 × 10$^{-5}$
$C_6$ = 0.5181636 × 10$^{-9}$
$C_8$ = −0.3102939 × 10$^{-19}$
$C_{10}$ = 0.4921401 × 10$^{-15}$ where $r$ represents curvature radii of lens surfaces (mm); $d$ lens thickness of air spaces between adjacent lenses; $n$ refractive indices of optical materials; $\nu$ Abbe numbers of optical material; and further, the third surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C\ (=r_3)$ the curvature radius of the tangential spherical plane; and further $K$ = 1.0
$C_2$ = 0.0
$C_4$ = 0.2064252 × 10$^{-5}$
$C_6$ = −0.1522384 × 10$^{-8}$
$C_8$ = −0.3320771 × 10$^{-10}$
$C_{10}$ = 0.1717369 × 10$^{-15}$ 12. A lens system according to claim 1, in which the lens system satisfies the following data:
Total focal length $f$=18.5mm
Relative aperture $F/4$
Angle of view 100°
Back-Focus $B.F.$=36.924mm

| | | | | | | | | | |
|---|---|---|---|---|---|---|---|---|---|
| $r_1$ | = | 41.69 | | | | | | | |
| $r_2$ | = | 29.78 | $d_1$ | = | 2.00 | $n_1$ | = | 1.69680 | $\nu_1$ = 55.6 |
| $r_3$ | = | 60.4 (non-spherical) | $d_2$ | = | 7.47 | | | | |
| $r_4$ | = | 26.71 | $d_3$ | = | 1.80 | $n_2$ | = | 1.69680 | $\nu_2$ = 55.6 |
| $r_5$ | = | 40.52 | $d_4$ | = | 5.90 | | | | |
| $r_6$ | = | 929.09 | $d_5$ | = | 16.58 | $n_3$ | = | 1.62041 | $\nu_3$ = 60.3 |
| $r_7$ | = | 23.04 | $d_6$ | = | 0.10 | | | | |
| $r_8$ | = | 12.07 | $d_7$ | = | 0.99 | $n_4$ | = | 1.69680 | $\nu_4$ = 55.6 |
| $r_9$ | = | −55.56 | $d_8$ | = | 5.62 | | | | |
| $r_{10}$ | = | 20.60 | $d_9$ | = | 3.85 | $n_5$ | = | 1.77279 | $\nu_5$ = 49.5 |
| $r_{11}$ | = | −24.12 | $d_{10}$ | = | 11.36 | $n_6$ | = | 1.58900 | $\nu_6$ = 48.6 |
| $r_{12}$ | = | 19.10 | $d_{11}$ | = | 0.10 | | | | |
| $r_{13}$ | = | 9.96 | $d_{12}$ | = | 0.98 | $n_7$ | = | 1.67025 | $\nu_7$ = 57.5 |
| $r_{14}$ | = | 13.61 | $d_{13}$ | = | 2.46 | | | | |
| $r_{15}$ | = | ∞ | $d_{14}$ | = | 7.86 | $n_8$ | = | 1.58065 | $\nu_8$ = 37.1 |
| $r_{16}$ | = | ∞ | $d_{15}$ | = | 1.09 | | | | |
| $r_{17}$ | = | −16.27 | $d_{16}$ | = | 2.03 | $n_9$ | = | 1.58065 | $\nu_9$ = 37.1 |
| $r_{18}$ | = | −14.11 | $d_{17}$ | = | 3.47 | | | | |
| $r_{19}$ | = | 46.95 | $d_{18}$ | = | 3.10 | $n_{10}$ | = | 1.86074 | $\nu_{10}$ = 23.1 |
| $r_{20}$ | = | −36.74 | $d_{19}$ | = | 0.90 | | | | |
| $r_{21}$ | = | −11.42 | $d_{20}$ | = | 2.32 | $n_{11}$ | = | 1.51823 | $\nu_{11}$ = 59.0 |
| $r_{22}$ | = | −112.00 | $d_{21}$ | = | 0.10 | | | | |
| $r_{23}$ | = | −19.33 | $d_{22}$ | = | 1.58 | $n_{12}$ | = | 1.55671 | $\nu_{12}$ = 58.5 |

13. A lens system according to claim 1, in which the lens system satisfies the following data:
Total focal length $f$=18.5mm
Relative aperture $F/4$
Angle of view 100°
Back-Focus $B.F.$=37.672mm

| | | | | | | | | | |
|---|---|---|---|---|---|---|---|---|---|
| $r_1$ = | 41.69 | $d_1$ = | 2.00 | $n_1$ = | 1.69680 | $\nu_1$ = | 55.6 |
| $r_2$ = | 28.69 | $d_2$ = | 12.13 | | | | |
| $r_3$ = | 62.50 | $d_3$ = | 1.80 | $n_2$ = | 1.69680 | $\nu_2$ = | 55.6 |

| | | | | | | |
|---|---|---|---|---|---|---|
| $r_4 =$ | 26.71 | (non-spherical) | | | | |
| $r_5 =$ | 39.64 | $d_4 =$ | 4.82 | | | |
| $r_6 =$ | 819.42 | $d_5 =$ | 15.50 | $n_3 =$ 1.62041 | $\nu_3 =$ | 60.3 |
| $r_7 =$ | 23.04 | $d_6 =$ | 0.10 | | | |
| $r_8 =$ | 12.12 | $d_7 =$ | 0.99 | $n_4 =$ 1.69680 | $\nu_4 =$ | 55.6 |
| $r_9 =$ | −58.27 | $d_8 =$ | 5.23 | | | |
| $r_{10} =$ | 20.60 | $d_9 =$ | 3.85 | $n_5 =$ 1.77279 | $\nu_5 =$ | 49.5 |
| $r_{11} =$ | −26.86 | $d_{10} =$ | 11.51 | $n_6 =$ 1.58900 | $\nu_6 =$ | 48.6 |
| $r_{12} =$ | 19.10 | $d_{11} =$ | 0.10 | | | |
| $r_{13} =$ | 10.00 | $d_{12} =$ | 0.96 | $n_7 =$ 1.67025 | $\nu_7 =$ | 57.5 |
| $r_{14} =$ | 13.24 | $d_{13} =$ | 2.11 | | | |
| $r_{15} =$ | ∞ | $d_{14} =$ | 8.16 | $n_8 =$ 1.58065 | $\nu_8 =$ | 37.1 |
| $r_{16} =$ | ∞ | $d_{15} =$ | 1.05 | | | |
| $r_{17} =$ | −16.27 | $d_{16} =$ | 2.03 | $n_9 =$ 1.58065 | $\nu_9 =$ | 37.1 |
| $r_{18} =$ | −14.23 | $d_{17} =$ | 3.78 | | | |
| $r_{19} =$ | 48.77 | $d_{18} =$ | 3.10 | $n_{10} =$ 1.86074 | $\nu_{10} =$ | 23.1 |
| $r_{20} =$ | −36.74 | $d_{19} =$ | 0.90 | | | |
| $r_{21} =$ | −11.75 | $d_{20} =$ | 2.21 | $n_{11} =$ 1.51823 | $\nu_{11} =$ | 59.0 |
| $r_{22} =$ | −131.01 | $d_{21} =$ | 0.10 | | | |
| $r_{23} =$ | −19.33 | $d_{22} =$ | 2.29 | $n_{12} =$ 1.55671 | $\nu_{12} =$ | 58.5 | where $r$ represents curvature radii of lens surfaces (mm); $d$ lens thickness of air spaces between adjacent lenses; $n$ refractive indices of optical materials; $\nu$ Abbe numbers of optical material; and further, the fourth surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C(=r_4)$ the curvature radius of the tangential spherical plane; and further $K = 1.0$
$C_2 = 0.0$
$C_4 = -0.3798663 \times 10^{-5}$
$C_6 = -0.2689868 \times 10^{-9}$
$C_8 = -0.7954513 \times 10^{-18}$
$C_{10} = -0.5880235 \times 10^{-14}$

14. A lens system according to claim 1, in which the lens system satisfies the following data:
Total focal length $f = 18.5$ mm
Relative aperture $F/4$
Angle of view 100°
Back-Focus $B.F. = 38.622$ mm

| | | | | | | |
|---|---|---|---|---|---|---|
| $r_1 =$ | 41.69 | $d_1 =$ | 2.00 | $n_1 =$ 1.69680 | $\nu_1 =$ | 55.6 |
| $r_2 =$ | 29.15 | $d_2 =$ | 11.45 | | | |
| $r_3 =$ | 64.09 | $d_3 =$ | 1.80 | $n_2 =$ 1.69680 | $\nu_2 =$ | 55.6 |
| $r_4 =$ | 26.71 | $d_4 =$ | 2.80 (non-spherical) | | | |
| $r_5 =$ | 39.26 | $d_5 =$ | 17.83 | $n_3 =$ 1.62041 | $\nu_3 =$ | 60.3 |
| $r_6 =$ | 292.59 | $d_6 =$ | 0.1 | | | |
| $r_7 =$ | 23.04 | $d_7 =$ | 0.99 | $n_4 =$ 1.69680 | $\nu_4 =$ | 55.6 |
| $r_8 =$ | 12.48 | $d_8 =$ | 5.55 | | | |
| $r_9 =$ | −52.15 | $d_9 =$ | 3.85 | $n_5 =$ 1.77279 | $\nu_5 =$ | 49.5 |
| $r_{10} =$ | 20.60 | $d_{10} =$ | 11.98 | $n_6 =$ 1.58900 | $\nu_6 =$ | 48.6 |
| $r_{11} =$ | −25.79 | $d_{11} =$ | 0.10 | | | |
| $r_{12} =$ | 19.10 | $d_{12} =$ | 0.97 | $n_7 =$ 1.67025 | $\nu_7 =$ | 57.5 |
| $r_{13} =$ | 9.93 | $d_{13} =$ | 2.29 | | | |
| $r_{14} =$ | 13.27 | $d_{14} =$ | 8.68 | $n_8 =$ 1.58065 | $\nu_8 =$ | 37.1 |
| $r_{15} =$ | ∞ | $d_{15} =$ | 1.09 | | | |
| $r_{16} =$ | ∞ | $d_{16} =$ | 2.03 | $n_9 =$ 1.58065 | $\nu_9 =$ | 37.1 |
| $r_{17} =$ | −16.27 | $d_{17} =$ | 3.19 | | | |

| | | | | | | | |
|---|---|---|---|---|---|---|---|
| $r_{18}$ | = | −14.20 | | | | | |
| $r_{19}$ | = | 49.12 | $d_{18}$ = | 3.10 | $n_{10}$ = | 1.86074 | $\nu_{10}$ = 23.1 |
| $r_{20}$ | = | −36.74 | $d_{19}$ = | 0.9 | | | |
| $r_{21}$ | = | −11.71 | $d_{20}$ = | 2.13 | $n_{11}$ = | 1.51823 | $\nu_{11}$ = 59.0 |
| $r_{22}$ | = | −130.69 | $d_{21}$ = | 0.10 | | | |
| $r_{23}$ | = | −19.33 | $d_{22}$ = | 2.16 | $n_{12}$ = | 1.55671 | $\nu_{12}$ = 58.5 | where $r$ represents curvature radii of lens surfaces (mm); $d$ lens thickness of air spaces between adjacent lenses; $n$ refractive indices of optical materials; $\nu$ Abbe numbers of optical material; and further, the fifth surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C(=r_5)$ the curvature radius of the tangential spherical plane; and further $K$ = 1.0
$C_2$ = 0.0
$C_4$ = 0.5134818 × 10$^{-5}$
$C_6$ = −0.3265215 × 10$^{-9}$
$C_8$ = 0.2642397 × 10$^{-10}$
$C_{10}$ = 0.3510403 × 10$^{-14}$

15. A lens system according to claim 1, in which the lens system satisfies the following data:
Total focal length $f$=15.3mm
Relative aperture $F/5.6$
Angle of view 110°
Back-focus $B.F.$=38.24mm

| | | | | | | | |
|---|---|---|---|---|---|---|---|
| $r_1$ = | 47.21 | | | | | | |
| | | $d_1$ = | 3.10 | $n_1$ = | 1.77279 | $\nu_1$ = | 49.5 |
| $r_2$ = | ∞ | | | | | | |
| | | $d_2$ = | 7.57 | | | | |
| $r_3$ = | 40.24 | | | | | | |
| | | $d_3$ = | 2.40 | $n_2$ = | 1.69680 | $\nu_2$ = | 55.6 |
| $r_4$ = | 29.04 | | | | | | |
| | | $d_4$ = | 6.95 | | | | |
| $r_5$ = | 44.00 | | | | | | |
| | | $d_5$ = | 11.46 | $n_3$ = | 1.69350 | $\nu_3$ = | 53.5 |
| $r_6$ = | 219.20 | | | | | | |
| | | $d_6$ = | 0.10 | | | | |
| $r_7$ = | 22.11 | | | | | | |
| | | $d_7$ = | 1.10 | $n_4$ = | 1.78798 | $\nu_4$ = | 47.5 |
| $r_8$ = | 14.46 | | | | | | |
| | | $d_8$ = | 2.79 | | | | |
| $r_9$ = | 19.78 | | | | | | |
| | | $d_9$ = | 1.00 | $n_5$ = | 1.713 | $\nu_5$ = | 53.9 |
| $r_{10}$ = | 13.79 | | | | | | |
| | | $d_{10}$ = | 6.04 | | | | |
| $r_{11}$ = | ∞ | | | | | | |
| | | $d_{11}$ = | 1.20 | $n_6$ = | 1.51743 | $\nu_6$ = | filter |
| $r_{12}$ = | ∞ | | | | | | |
| | | $d_{12}$ = | 0.60 | | | | |
| $r_{13}$ = | −217.70 | | | | | | |
| | | $d_{13}$ = | 3.32 | $n_7$ = | 1.84110 | $\nu_7$ = | 43.3 |
| $r_{14}$ = | 13.78 | | | | | | |
| | | $d_{14}$ = | 11.48 | $n_8$ = | 1.54814 | $\nu_8$ = | 45.9 |
| $r_{15}$ = | −11.32 | | | | | | |
| | | $d_{15}$ = | 3.69 | $n_9$ = | 1.53996 | $\nu_9$ = | 59.7 |
| $r_{16}$ = | −19.76 | | | | | | |
| | | $d_{16}$ = | 0.10 | | | | |
| $r_{17}$ = | 19.09 | | | | | | |
| | | $d_{17}$ = | 0.99 | $n_{10}$ = | 1.69680 | $\nu_{10}$ = | 55.6 |
| $r_{18}$ = | 8.54 | | | | | | |
| | | $d_{18}$ = | 2.65 | | | | |
| $r_{19}$ = | 13.34 | | | | | | |
| | | $d_{19}$ = | 2.16 | $n_{11}$ = | 1.59507 | $\nu_{11}$ = | 35.6 |
| $r_{20}$ = | −7.32 | | | | | | |
| | | $d_{20}$ = | 1.98 | $n_{12}$ = | 1.59181 | $\nu_{12}$ = | 58.2 |
| $r_{21}$ = | ∞ | | | | | | |
| | | $d_{21}$ = | 0.73 | | | | |
| $r_{22}$ = | ∞ | | | | | | |
| | | $d_{22}$ = | 6.29 | $n_{13}$ = | 1.59551 | $\nu_{13}$ = | 39.2 |
| $r_{23}$ = | −12.25 | | | | | | |
| | | $d_{23}$ = | 1.09 | | | | |
| $r_{24}$ = | −13.71 | | | | | | |
| | | $d_{24}$ = | 4.85 | $n_{14}$ = | 1.86074 | $\nu_{14}$ = | 23.1 |
| $r_{25}$ = | 38.51 | | | | | | |
| | | $d_{25}$ = | 0.70 | | | | |
| $r_{26}$ = | −35.32 | | | | | | |
| | | $d_{26}$ = | 2.41 | $n_{15}$ = | 1.4645 | $\nu_{15}$ = | 65.8 |
| $r_{27}$ = | −10.99 | | | | | | |
| | | $d_{27}$ = | 0.10 | | | | |
| $r_{28}$ = | 375.00 | | | | | | |
| | | $d_{28}$ = | 2.60 | $n_{16}$ = | 1.51835 | $\nu_{16}$ = | 60.3 |
| $r_{29}$ = | −21.32 | | | | | | | where $r$ represents curvature radii of lens surfaces (mm); $d$ lens thickness of air spaces between adjacent lenses; $n$ refractive indices of optical materials; $\nu$ Abbe numbers of optical material; and further, the ninth surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C$ the curvature radius of the tangential spherical plane; and further $K = 1.0$
$C_2 = 0.0$
$C_4 = 0.1558281 \times 10^{-4}$
$C_6 = -0.5578871 \times 10^{-7}$
$C_8 = 0.4223284 \times 10^{-9}$
$C_{10} = -0.4447351 \times 10^{-16}$ 16. A lens system according to claim 1, in which the lens system satisfies the following data:
Total focal length $f=15.3$mm
Relative aperture $F/5.6$
Angle of view $110°$
Back-Focus $B.F.=38.33$mm

| | | | | | | | | |
|---|---|---|---|---|---|---|---|---|
| $r_1$ | = | 48.15 | | | | | | |
| | | | $d_1$ | = | 3.10 | $n_1$ = 1.78764 | $\nu_1$ | = 47.5 |
| $r_2$ | = | 35.38 | $d_2$ | = | 11.98 | | | |
| $r_3$ | = | 46.24 | $d_3$ | = | 11.05 | $n_2$ = 1.71341 | $\nu_2$ | = 53.9 |
| $r_4$ | = | 95.20 | $d_4$ | = | 0.10 | | | |
| $r_5$ | = | 28.00 | $d_5$ | = | 1.00 | $n_3$ = 1.69320 | $\nu_3$ | = 53.5 |
| $r_6$ | = | 17.03 | $d_6$ | = | 6.86 | | | |
| $r_7$ | = | 27.47 (non-spherical) | $d_7$ | = | 1.00 | $n_4$ = 1.69320 | $\nu_4$ | = 53.5 |
| $r_8$ | = | 15.36 | $d_8$ | = | 4.35 | | | |
| $r_9$ | = | 19.61 | $d_9$ | = | 1.00 | $n_5$ = 1.69684 | $\nu_5$ | = 55.6 |
| $r_{10}$ | = | 10.88 | $d_{10}$ | = | 5.20 | | | |
| $r_{11}$ | = | ∞ | $d_{11}$ | = | 1.20 | $n_6$ = 1.51743 | $\nu_6$ | = filter |
| $r_{12}$ | = | ∞ | $d_{12}$ | = | 0.28 | | | |
| $r_{13}$ | = | 146.11 | $d_{13}$ | = | 4.09 | $n_7$ = 1.84131 | $\nu_7$ | = 43.3 |
| $r_{14}$ | = | 15.14 | $d_{14}$ | = | 13.52 | $n_8$ = 1.54800 | $\nu_8$ | = 45.9 |
| $r_{15}$ | = | −16.21 | $d_{15}$ | = | 0.10 | | | |
| $r_{16}$ | = | 21.40 | $d_{16}$ | = | 1.00 | $n_9$ = 1.69684 | $\nu_9$ | = 55.6 |
| $r_{17}$ | = | 8.64 | $d_{17}$ | = | 1.79 | | | |
| $r_{18}$ | = | 13.21 | $d_{18}$ | = | 2.64 | $n_{10}$ = 1.59483 | $\nu_{10}$ | = 35.6 |
| $r_{19}$ | = | −4.60 | $d_{19}$ | = | 3.06 | $n_{11}$ = 1.59160 | $\nu_{11}$ | = 58.2 |
| $r_{20}$ | = | ∞ | $d_{20}$ | = | 0.48 | | | |
| $r_{21}$ | = | ∞ | $d_{21}$ | = | 8.88 | $n_{12}$ = 1.59508 | $\nu_{12}$ | = 35.6 |
| $r_{22}$ | = | −11.38 | $d_{22}$ | = | 1.03 | | | |
| $r_{23}$ | = | −13.34 | $d_{23}$ | = | 0.89 | $n_{13}$ = 1.86142 | $\nu_{13}$ | = 23.1 |
| $r_{24}$ | = | 37.64 | $d_{24}$ | = | 0.60 | | | |
| $r_{25}$ | = | −45.14 | $d_{25}$ | = | 2.56 | $n_{14}$ = 1.44772 | $\nu_{14}$ | = 67.2 |
| $r_{26}$ | = | −10.86 | $d_{26}$ | = | 0.10 | | | |
| $r_{27}$ | = | 1684.83 | $d_{27}$ | = | 5.62 | $n_{15}$ = 1.50976 | $\nu_{15}$ | = 63.4 |
| $r_{28}$ | = | −22.85 | | | | | | | where $r$ represents curvature radii of lens surfaces (mm); $d$ lens thickness of air spaces between adjacent lenses; $n$ refractive indices of optical materials; $\nu$ Abbe numbers of optical material; and further, the seventh surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C$ ($=r_7$) the curvature radius of the tangential spherical plane; and further $K = 1.0$
$C_2 = 0.0$
$C_4 = 0.8959432 \times 10^{-5}$
$C_6 = -0.1565319 \times 10^{-8}$
$C_8 = 0.8809370 \times 10^{-11}$
$C_{10} = -0.7151907 \times 10^{-16}$ 17. A lens system according to claim 1, in which the lens system satisfies the following data:
Total focal length $f=15.3$mm
Relative aperture $F/5.6$
Angle of view $110°$
Back-Focus $B.F.=38.058$mm

| | | | | | | |
|---|---|---|---|---|---|---|
| $r_1$ | = | 47.21 | | | | |
| | | | $d_1$ = 3.10 | $n_1$ = 1.77279 | $\nu_1$ | = 49.5 |
| $r_2$ | = | 32.00 | $d_2$ = 4.80 | | | |
| $r_3$ | = | 37.80 | $d_3$ = 2.40 | $n_2$ = 1.69680 | $\nu_2$ | = 55.6 |

| | | | | | | | |
|---|---|---|---|---|---|---|---|
| $r_1$ | = | 29.04 | $d_1$ | = | 6.59 | | |
| $r_2$ | = | 44.00 | $d_2$ | = | 2.00 | $n_1 = 1.6935$ | $\nu_1 = 53.5$ |
| $r_3$ | = | 30.00 | $d_3$ | = | 5.38 | | |
| $r_4$ | = | 55.00 | $d_4$ | = | 9.36 | $n_2 = 1.6935$ | $\nu_2 = 53.5$ |
| $r_5$ | = | 372.31 | $d_5$ | = | 0.10 | | |
| $r_6$ | = | 20.99 | (non-spherical) | | | | |
| $r_7$ | = | 13.79 | $d_6$ | = | 1.00 | $n_3 = 1.713$ | $\nu_3 = 53.9$ |
| $r_8$ | = | −151.20 | $d_7$ | = | 8.49 | | |
| $r_9$ | = | 15.61 | $d_8$ | = | 4.42 | $n_4 = 1.8411$ | $\nu_4 = 43.3$ |
| $r_{10}$ | = | −11.32 | $d_9$ | = | 10.58 | $n_5 = 1.54814$ | $\nu_5 = 45.9$ |
| $r_{11}$ | = | −22.89 | $d_{10}$ | = | 3.69 | $n_6 = 1.53996$ | $\nu_6 = 59.7$ |
| $r_{12}$ | = | 19.09 | $d_{11}$ | = | 0.10 | | |
| $r_{13}$ | = | 8.54 | $d_{12}$ | = | 0.99 | $n_7 = 1.6968$ | $\nu_7 = 55.6$ |
| $r_{14}$ | = | 13.66 | $d_{13}$ | = | 2.65 | | |
| $r_{15}$ | = | −7.32 | $d_{14}$ | = | 5.18 | $n_8 = 1.59507$ | $\nu_8 = 35.6$ |
| $r_{16}$ | = | ∞ | $d_{15}$ | = | 3.33 | $n_9 = 1.59181$ | $\nu_9 = 58.2$ |
| $r_{17}$ | = | ∞ | $d_{16}$ | = | 0.66 | | |
| $r_{18}$ | = | −12.27 | $d_{17}$ | = | 5.02 | $n_{10} = 1.59551$ | $\nu_{10} = 39.2$ |
| $r_{19}$ | = | −13.71 | $d_{18}$ | = | 1.09 | | |
| $r_{20}$ | = | 38.51 | $d_{19}$ | = | 3.24 | $n_{11} = 1.86074$ | $\nu_{11} = 23.1$ |
| $r_{21}$ | = | −41.90 | $d_{20}$ | = | 0.70 | | |
| $r_{22}$ | = | −10.76 | $d_{21}$ | = | 2.26 | $n_{12} = 1.4645$ | $\nu_{12} = 65.8$ |
| $r_{23}$ | = | 375.00 | $d_{22}$ | = | 0.10 | | |
| $r_{24}$ | = | −21.95 | $d_{23}$ | = | 2.20 | $n_{13} = 1.51835$ | $\nu_{13} = 60.3$ | where $r$ represents curvature radii of lens surfaces (mm); $d$ lens thickness of air spaces between adjacent lenses; $n$ refractive indices of optical materials; $\nu$ Abbe numbers of optical material; and further, the ninth surface of the divergent lens group satisfies the following condition:

$$X = CY^2/1 + \sqrt{1-K(CY)^2} + C_2Y^2 + C_4Y^4 + C_6Y^6 + C_8Y^8 + C_{10}Y^{10}$$

where $Y$ represents the distance from the optical axis; $X$ the distance from the tangential plane; $1/C(=r_9)$ the curvature radius of the tangential spherical plane; and further

| | | |
|---|---|---|
| $K$ | = | 1.0 |
| $C_2$ | = | 0.0 |
| $C_4$ | = | $0.2064063 \times 10^{-4}$ |
| $C_6$ | = | $-0.4449466 \times 10^{-7}$ |
| $C_8$ | = | $0.3840304 \times 10^{-9}$ |
| $C_{10}$ | = | $0.6807959 \times 10^{-14}$ |

18. A lens system according to claim 1, in which the lens system satisfies the following data:
Total focal length $f=18.4$mm
Relative aperture $F/5.6$
Angle of view $100°$
Back-Focus $B.F.=39.805$mm

| | | | | | | | |
|---|---|---|---|---|---|---|---|
| $r_1 =$ | 46.77 | $d_1 =$ | 2.00 | $n_1 =$ | 1.713 | $\nu_1 =$ | 53.9 |
| $r_2 =$ | 27.79 | $d_2 =$ | 6.50 | | | | |
| $r_3 =$ | 44.09 | (non-spherical) | | | | | |
| $r_4 =$ | 58.81 | $d_3 =$ | 15.53 | $n_2 =$ | 1.6425 | $\nu_2 =$ | 58.1 |
| $r_5 =$ | 28.14 | $d_4 =$ | 0.10 | | | | |
| $r_6 =$ | 14.26 | $d_5 =$ | 1.69 | $n_3 =$ | 1.713 | $\nu_3 =$ | 53.9 |
| $r_7 =$ | −67.60 | $d_6 =$ | 8.31 | | | | |
| $r_8 =$ | 25.88 | $d_7 =$ | 2.38 | $n_4 =$ | 1.77279 | $\nu_4 =$ | 49.5 |
| $r_9 =$ | −30.28 | $d_8 =$ | 14.95 | $n_5 =$ | 1.56013 | $\nu_5 =$ | 47.0 |
| $r_{10} =$ | 21.69 | $d_9 =$ | 0.10 | | | | |
| $r_{11} =$ | 9.79 | $d_{10} =$ | 1.00 | $n_6 =$ | 1.67025 | $\nu_6 =$ | 57.5 |
| $r_{12} =$ | 15.10 | $d_{11} =$ | 3.01 | | | | |
| $r_{13} =$ | ∞ | $d_{12} =$ | 10.09 | $n_7 =$ | 1.58065 | $\nu_7 =$ | 37.1 |
| | | $d_{13} =$ | 1.76 | | | | |

| | | | | | | | |
|---|---|---|---|---|---|---|---|
| $r_{14}=$ | ∞ | | | | | | |
| | | $d_{14}=$ | 2.17 | $n_8=$ | 1.58065 | $\nu_8=$ | 37.1 |
| $r_{15}=$ | −15.23 | | | | | | |
| | | $d_{15}=$ | 2.52 | | | | |
| $r_{16}=$ | −14.56 | | | | | | |
| | | $d_{16}=$ | 2.90 | $n_9=$ | 1.86074 | $\nu_9=$ | 23.1 |
| $r_{17}=$ | 58.52 | | | | | | |
| | | $d_{17}=$ | 0.57 | | | | |
| $r_{18}=$ | −72.86 | | | | | | |
| | | $d_{18}=$ | 2.35 | $n_{10}=$ | 1.51454 | $\nu_{10}=$ | 54.6 |
| $r_{19}=$ | −12.15 | | | | | | |
| | | $d_{19}=$ | 0.10 | | | | |
| $r_{20}=$ | −573.40 | | | | | | |
| | | $d_{20}=$ | 2.58 | $n_{11}=$ | 1.56883 | $\nu_{11}=$ | 56.0 |
| $r_{21}=$ | −24.50 | | | | | | | wherein $r$ represents curvature radii of lens surfaces (mm); $d$ lens thickness of air spaces between adjacent lenses; $n$ refractive indices of optical materials; $\nu$ Abbe numbers of optical material; and further, the third surface of the divergent lens group satisfies the following condition:

$$X = CY^2/1 + \sqrt{1-K(CY)^2} + C_2 Y^2 + C_4 Y^4 + C_6 Y^6 + C_8 Y^8 + C_{10} Y^{10}$$

where $Y$ represents the distance from the optical axis; $X$ the distance from the tangential plane; $1/C(=r_3)$ the curvature radius of the tangential spherical plane; and further $$
\begin{aligned}
K &= 1.0 \\
C_2 &= 0.0 \\
C_4 &= 0.4037876 \times 10^{-5} \\
C_6 &= 0.3999550 \times 10^{-9} \\
C_8 &= -0.4765369 \times 10^{-13} \\
C_{10} &= 0.3492820 \times 10^{-14}
\end{aligned}
$$

* * * * *

UNITED STATES PATENT OFFICE
CERTIFICATE OF CORRECTION

Patent No. 3,832,035  Dated August 27, 1974

Inventor(s) TOMOWAKI TAKAHASHI

It is certified that error appears in the above-identified patent and that said Letters Patent are hereby corrected as shown below:

In the Abstract, line 9, change "of" (first occurrence) to -- on --.

Column 3, line 37, change "dis-" to -- dia- --; line 50, change "menisucs" to -- meniscus --.

Column 5, line 54, change "sentions" to -- sentations --; same line, change "thereon" to -- therein --.

Column 7, line 7, change "$0.30f<d_{14}$ ; $<_{1.0}f,$" to read -- $0.30f<d_{14} <1.0f,$ --.

Column 8, line 3, change "faces" to -- face --; line 9, delete "of" (first occurrence).

Column 11, line commencing at "$r_5$", change "$d_5 = 0.04$" to -- $d_5 = 0.94$ --; line commencing at "$r_7$", change "21.0" to -- 21.00 --.

Column 12, line 8, change "surfaces" to -- surface --.

Column 17, line 31, change "100(;" to -- 100°; --.

Column 19, below "$r_{16}$" and above "$r_{18}$", insert -- $r_{17}= -14.95$ --.

Column 24, line 2, change "along" to -- alone --; line 16, after "1.5f", insert -- (VI) --.

Column 25, line 40, change "0.057" to -- -0.057 --.

Column 27, line commencing at "$r_{20}$", change "36.74" to -- -36.74.

Column 32, line 19, change "$4.0f > d_530$" to -- $4.0f > d_5+$ --; between lines 45 and 49, beneath the heading "14", below "4.14" and above "2.225", insert -- 34.10 --; beneath the heading "Spherical system", below "4.4" and above "1.660", insert -- 25.4 --.

Column 37, Example 15, below "$r_{18}$" and above "$r_{20}$", change "$r_{10}$" to -- $r_{19}$ --; line commencing at "$r_{23}$" after "0.89", change "$n_{14}$" to -- $n_{13}$ --.

Column 38, line commencing at "$r_{11}$", change "$r_{11} = 28$" to -- $r_{11} = \infty$ --.

UNITED STATES PATENT OFFICE
CERTIFICATE OF CORRECTION

Page 2

Patent No. 3,832,035                Dated August 27, 1974

Inventor(s) TOMOWAKI TAKAHASHI

It is certified that error appears in the above-identified patent and that said Letters Patent are hereby corrected as shown below:

Column 39, line 20, change "s2" to -- S2 --; line 29, after the equation, insert -- (IX) --.

Column 42, line 38, change "B.f.32 39,805" to -- B.f. = 39,805 --.

Column 49, line 35, change "nubers" to -- numbers --.
Column 50, line commencing at "$r_{10}$" not legible in original patent and should read as follows:

-- $r_{10}$ = 25.79    $d_{10}$ = 14.88   $n_6$ = 1.56013    $\nu_6$ = 47.0 --.

Column 52, line commencing at "$C_8$", change "-1064602" to -- -0.1064602 --; line commencing at "$r_{21}$", change "$d_2$=" to -- $d_{21}$= --.

Column 56, line commencing at "$r_2$", change "$d_2$ = 1.02" to -- $d_2$ = 10.02 --.

Column 62, line commencing at "$r_2$", below "47,21" and above "40.24", insert -- 32.00 --.

Column 65, line commencing at "$r_{16}$", change "$_{16}$" to -- $d_{16}$ --.

Signed and sealed this 4th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,832,035　　　　　　　　　　Dated August 27, 1974

Inventor(s) Tomowaki Takahashi

It is certified that error appears in the above-identified patent and that said Letters Patent are hereby corrected as shown below:

Column 45, line 1, "$r_1 = 37.14$" should read -- $r_1 \doteq 37.14$ --.

Signed and Sealed this eighteenth Day of November 1975

[SEAL]

Attest:

RUTH C. MASON
Attesting Officer

C. MARSHALL DANN
Commissioner of Patents and Trademarks